(12) United States Patent
Boon et al.

(10) Patent No.: US 12,503,516 B2
(45) Date of Patent: Dec. 23, 2025

(54) ANTI-HUMAN HVEM (TNFRSF14) ANTIBODIES AND USES THEREOF

(71) Applicant: JJP Biologics SP. Z O.O., Warsaw (PL)

(72) Inventors: Louis Boon, Badhoevedorp (NL); Petrus Johannes Simons, Hillegom (NL); Marcel Theodorus Den Hartog, Monnickendam (NL)

(73) Assignee: JJP Biologics SP. Z O.O., Warsaw (PL)

( * ) Notice: Subject to any disclaimer, the term of this patent is extended or adjusted under 35 U.S.C. 154(b) by 816 days.

(21) Appl. No.: 17/788,362

(22) PCT Filed: Dec. 24, 2020

(86) PCT No.: PCT/NL2020/050817
§ 371 (c)(1),
(2) Date: Jun. 23, 2022

(87) PCT Pub. No.: WO2021/133170
PCT Pub. Date: Jul. 1, 2021

(65) Prior Publication Data
US 2023/0052646 A1 Feb. 16, 2023

(30) Foreign Application Priority Data
Dec. 24, 2019 (EP) .................................. 19219684

(51) Int. Cl.
*C07K 16/28* (2006.01)
*A61P 35/00* (2006.01)
*A61P 37/02* (2006.01)

(52) U.S. Cl.
CPC .......... *C07K 16/2878* (2013.01); *A61P 35/00* (2018.01); *A61P 37/02* (2018.01); *C07K 2317/33* (2013.01); *C07K 2317/565* (2013.01); *C07K 2317/76* (2013.01)

(58) Field of Classification Search
None
See application file for complete search history.

(56) References Cited

U.S. PATENT DOCUMENTS

| 5,518,889 A * | 5/1996 | Ladner .................. C07K 16/00 435/7.1 |
| 2013/0129744 A1 * | 5/2013 | Yeh ........................... A61P 9/10 424/139.1 |

FOREIGN PATENT DOCUMENTS

| EP | 2985294 A1 * | 2/2016 | ......... C07K 16/2803 |
| EP | 3311832 A1 * | 4/2018 | ............. A61K 35/17 |
| JP | 2016518436 A | 6/2016 | |
| WO | WO-2006090385 A2 * | 8/2006 | ............. A61P 43/00 |
| WO | WO-2007001459 A2 * | 1/2007 | ............. A61P 11/06 |
| WO | 2008146101 A1 | 12/2008 | |
| WO | 2010106051 A1 | 9/2010 | |
| WO | 2014184360 A1 | 11/2014 | |
| WO | WO-2017044699 A1 * | 3/2017 | ....... C07K 14/70596 |
| WO | WO-2020010235 A1 * | 1/2020 | ......... C07K 14/7051 |
| WO | WO-2020095249 A1 * | 5/2020 | ............. A61K 35/17 |
| WO | 2020222235 A1 | 11/2020 | |
| WO | WO-2021067800 A1 * | 4/2021 | ............. A61K 38/00 |

OTHER PUBLICATIONS

Sela-Culang et al. The structural basis of antibody-antigen recognition. Fron. Immuno., vol. 4, Article 302, Oct. 2013. (Year: 2013).*
Koenig. Mutational landscape of antibody variable domains reveals a switch modulating the interdomain conformational dynamics and antigen binding. PNAS, E486-E4995, Jan. 5, 2017. (Year: 2017).*
Herold. Determinants of the assembly and function of antibody variable domains. Nature Scientific Reports, 7:12276, Sep. 25, 2017. (Year: 2017).*
Ward-Kavanagh. The TNF Receptor Superfamily in Co-stimulating and Co-inhibitory Responses. Immunity 44, May 17, 2016. (Year: 2016).*
ACS. Cancer Risk and Prevention. Website saved Mar. 21, 2025. (Year: 2025).*
NCI Dictionary. Immune System Disorder Definition. Saved May 1, 2025. (Year: 2025).*
Merriam-Webster Dictionary. Prevent Definition. Saved Apr. 24, 2025. (Year: 2025).*
Gertner-Dardenne et al. "The co-receptor BTLA negatively regulates human V?9V?2 T-cell proliferation: a potential way of immune escape for lymphoma cells". Blood, Aug. 8, 2013, vol. 122, No. 6. pp. 922-931.
Dondelinger et al. "Understanding the Significance and implications of Antibody Numbering and Antigen-Binding Surface/Residue Definition" Front. Immunol. 9:2278. doi:10.3389/fimmu.2018.02278.
Brunel et al. "HVEM blockade initiates tumor cell death by innate immunity and improves anti-tumor response by human T cells in NSG immuno-compromised mice".
Del Rio et al. "Selective Blockade of Herpesvirus Entry Mediator-B and T Kymphocyte Attenuator Pathway Ameliorates Acute Graft-versus-Host Reaction" The Journal of Immunology, 2012, 188: 4885-4896.

* cited by examiner

*Primary Examiner* — Julie Wu
*Assistant Examiner* — Amy M. Chattin
(74) *Attorney, Agent, or Firm* — Banner & Witcoff, Ltd.

(57) ABSTRACT

The invention discloses an antibody that binds an extracellular part of human HVEM on human HVEM-expressing cells, that prevents binding of BTLA to HVEM when the antibody is bound to said extracellular part of HVEM, wherein said antibody displaces BTLA bound to said extracellular part of HVEM. The invention also discloses the use of such an antibody in combating certain diseases.

17 Claims, 19 Drawing Sheets
Specification includes a Sequence Listing.

Figure 3A
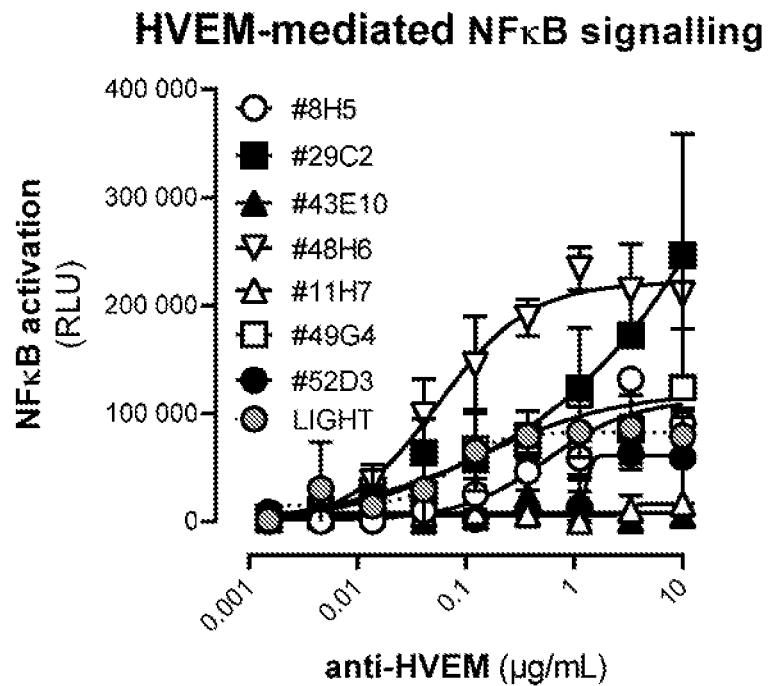
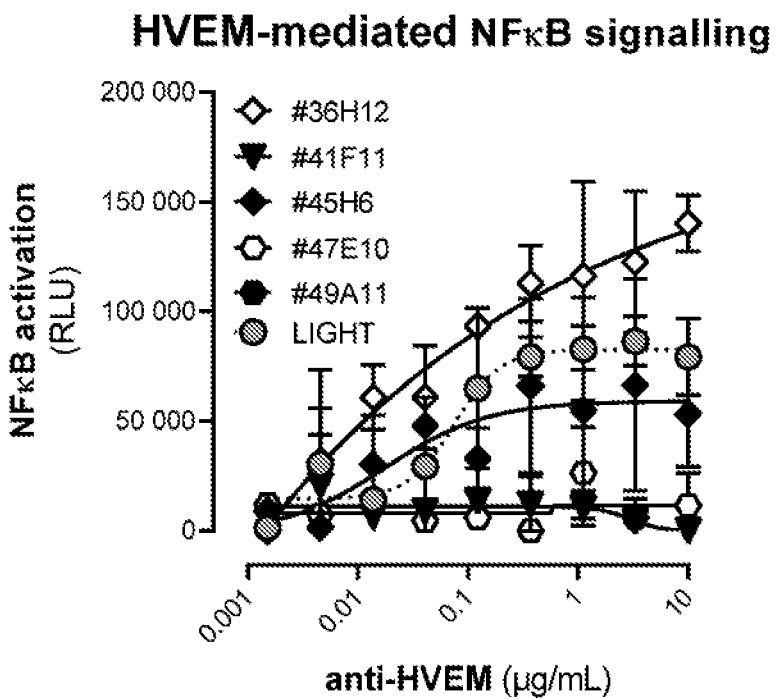

Figure 4B
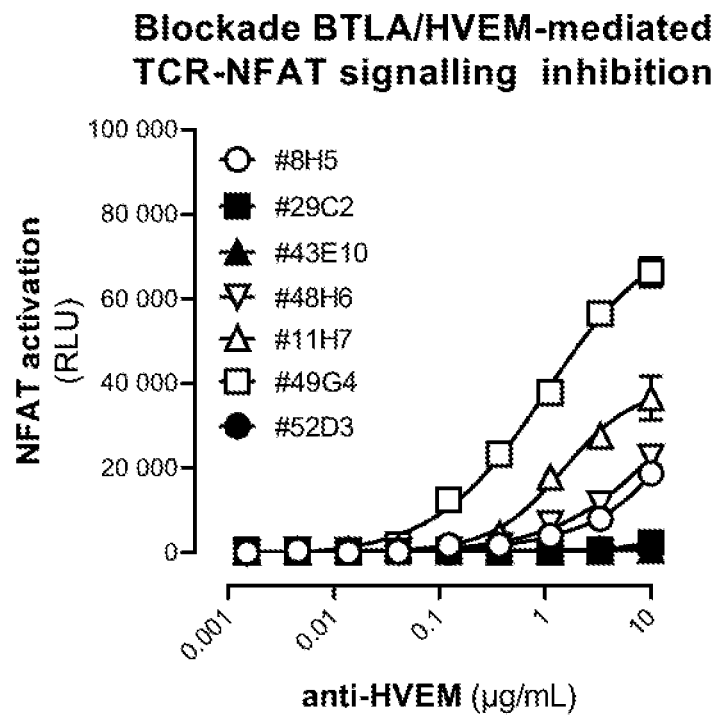
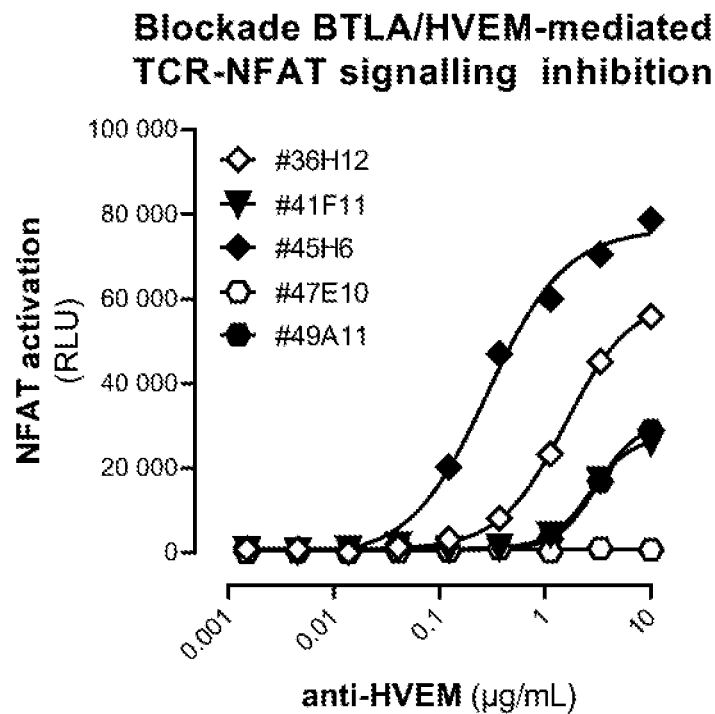

Figure 6
A
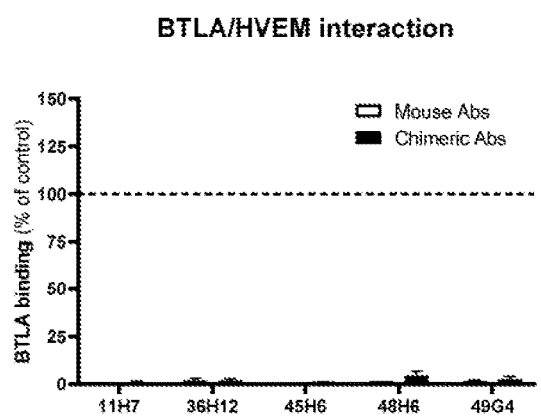
B
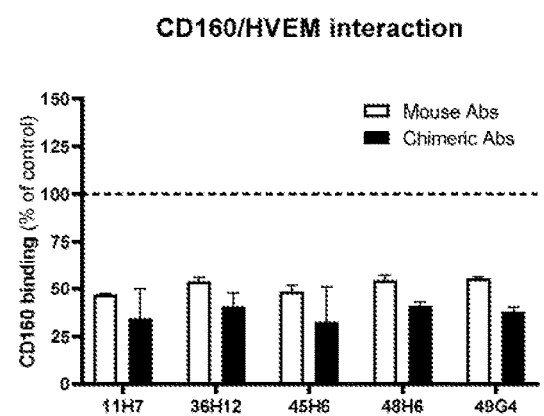
C
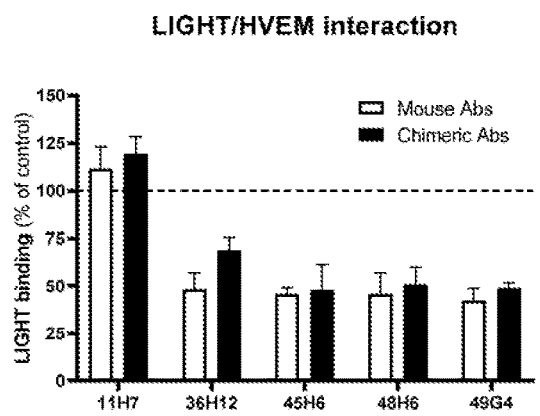
D
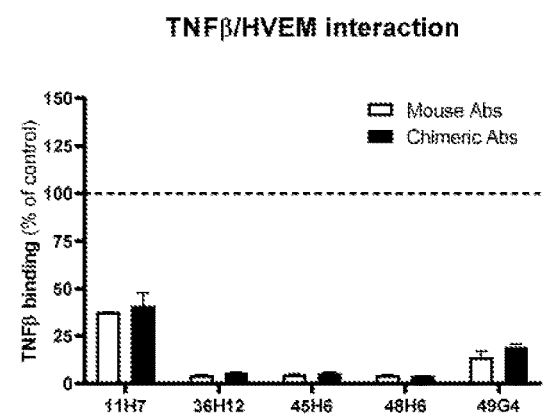

Figure 7
A
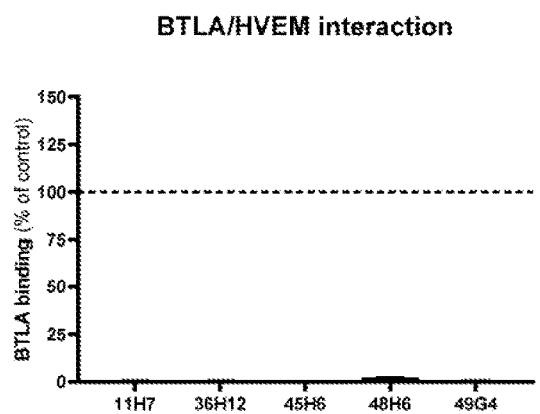
B
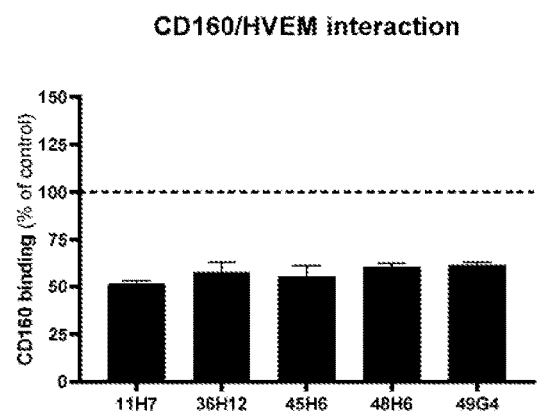
C
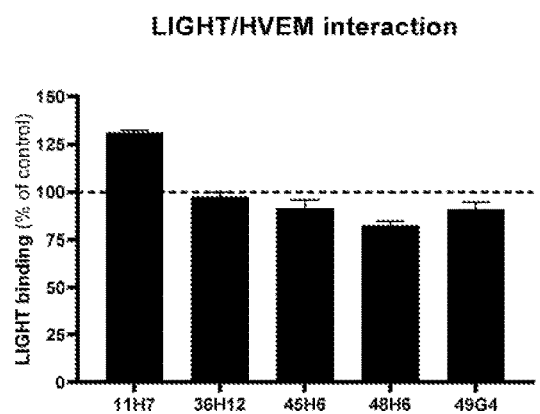
D
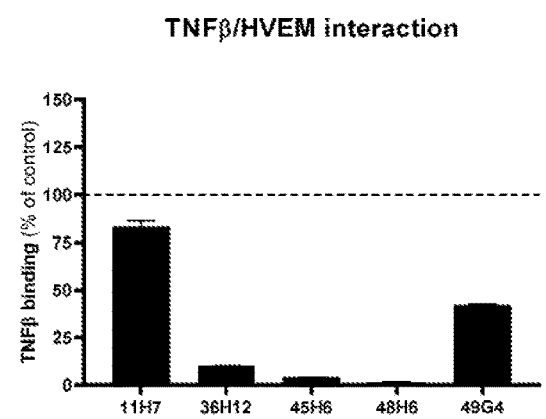

Figure 8A (Experiment 1 & 2)
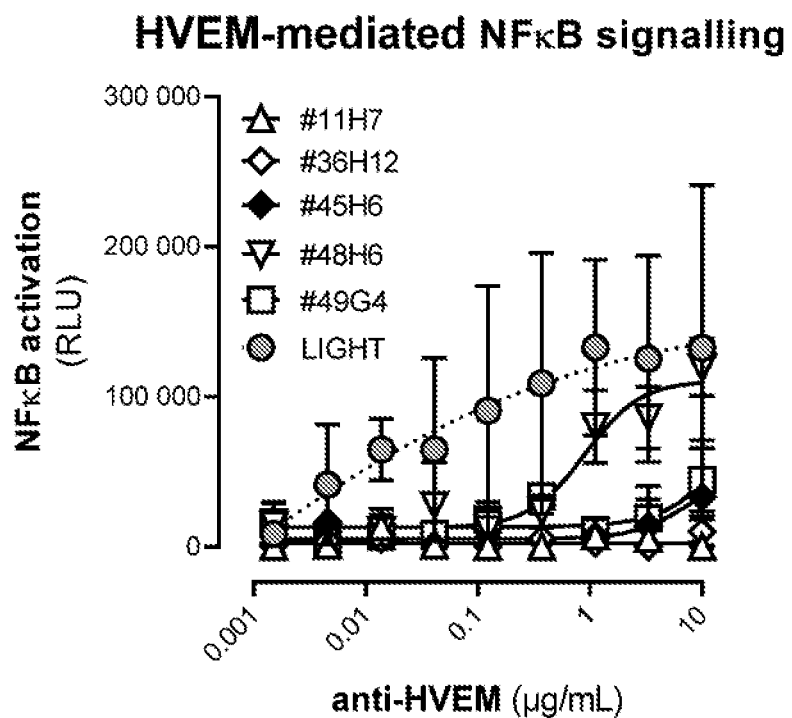
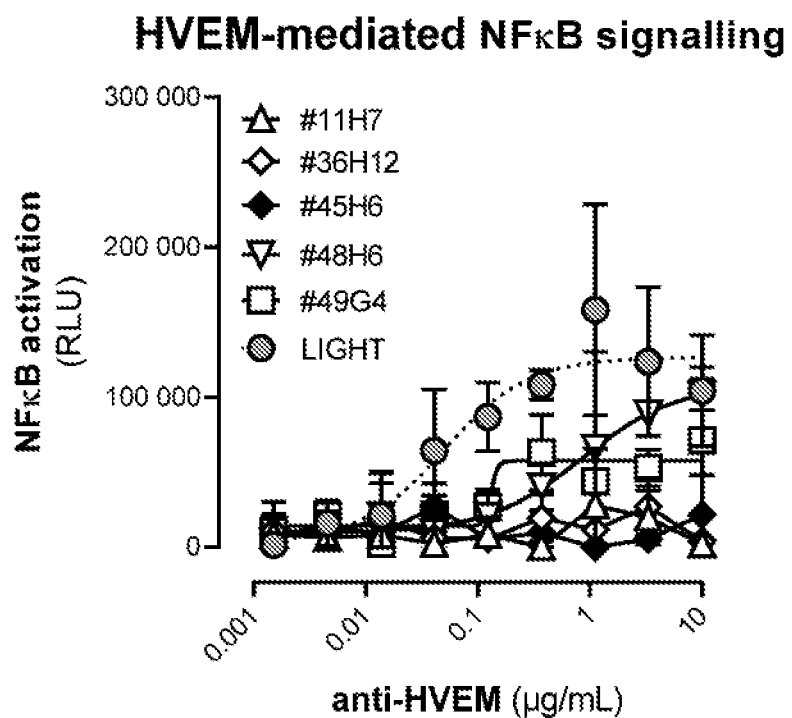

Figure 8C (Experiment 1)
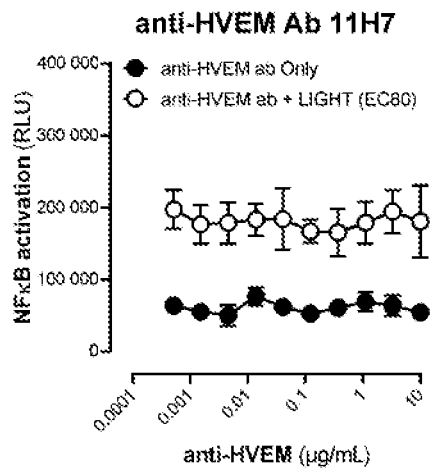
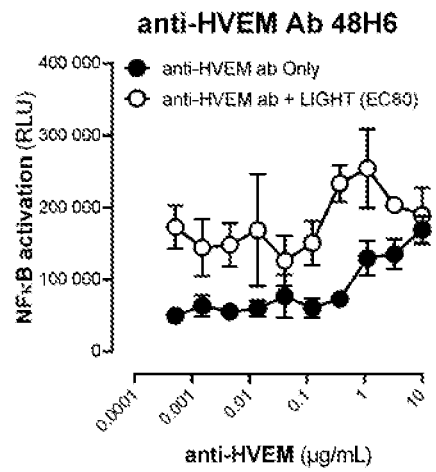
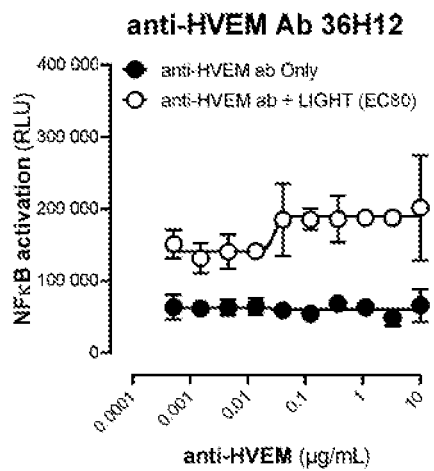
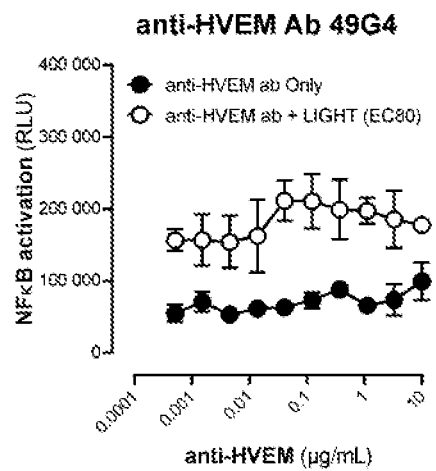
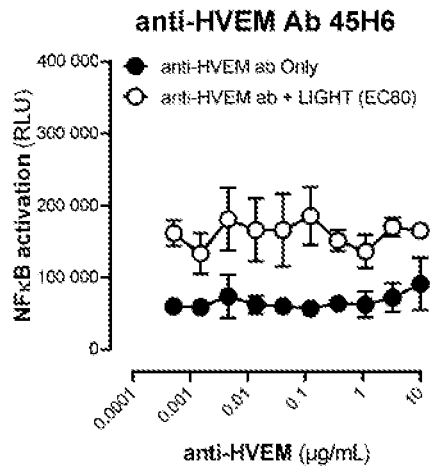

Figure 8C continued (Experiment 2)
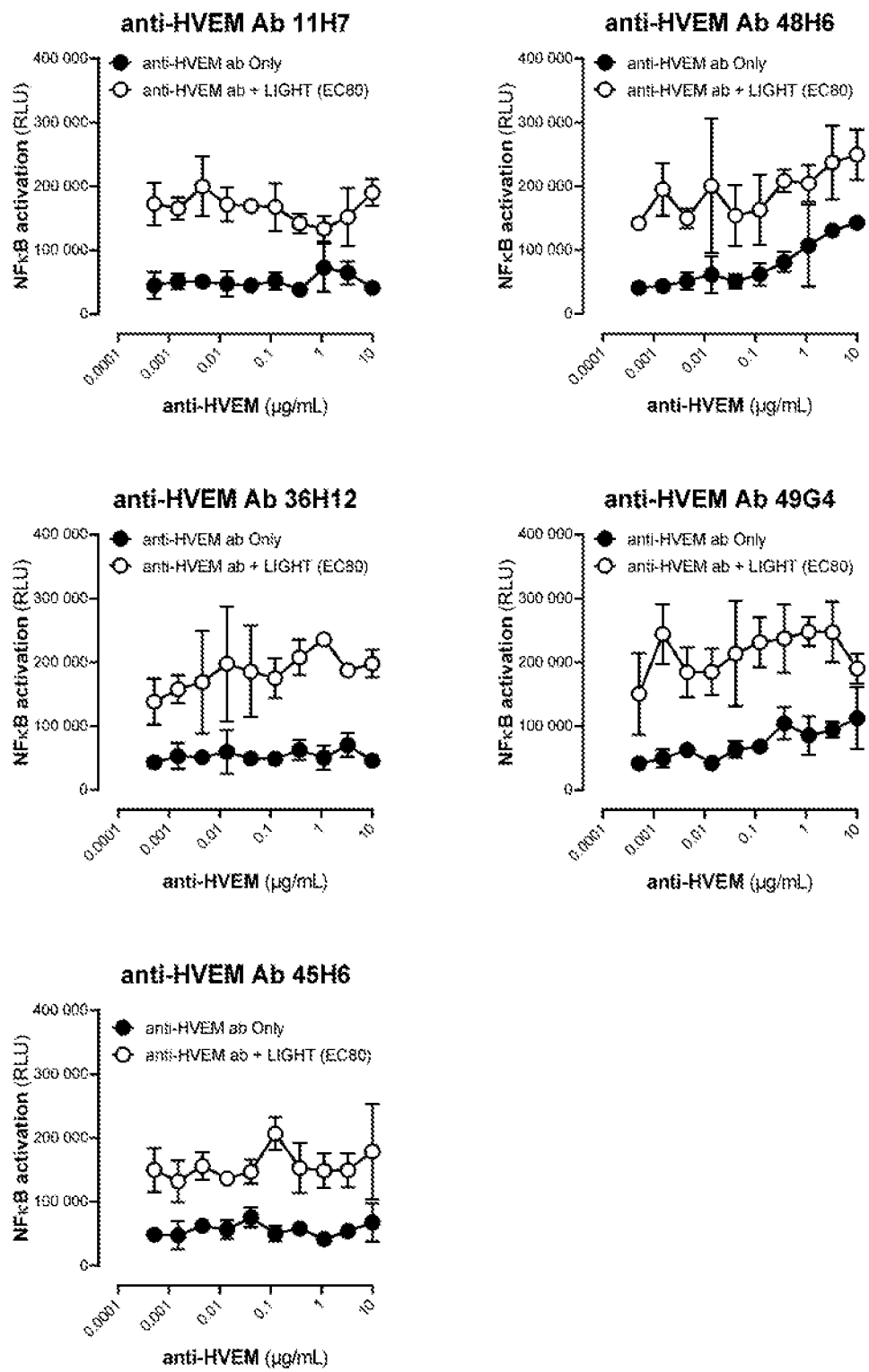

Figure 9
A
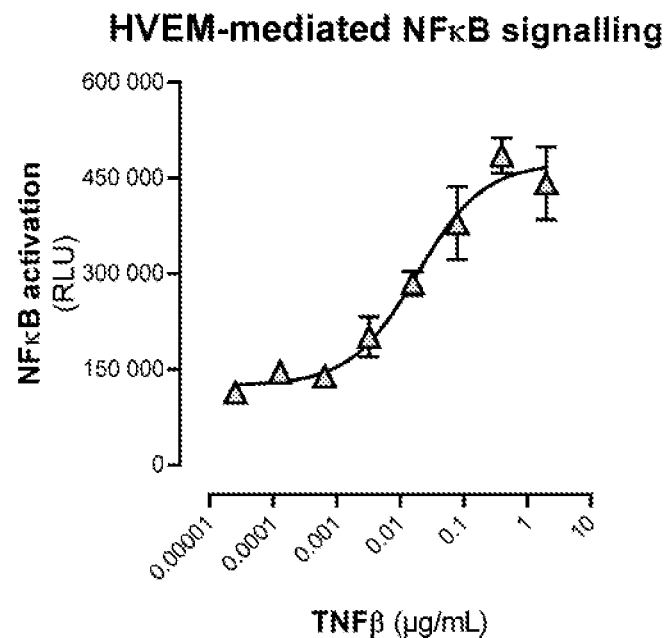
B
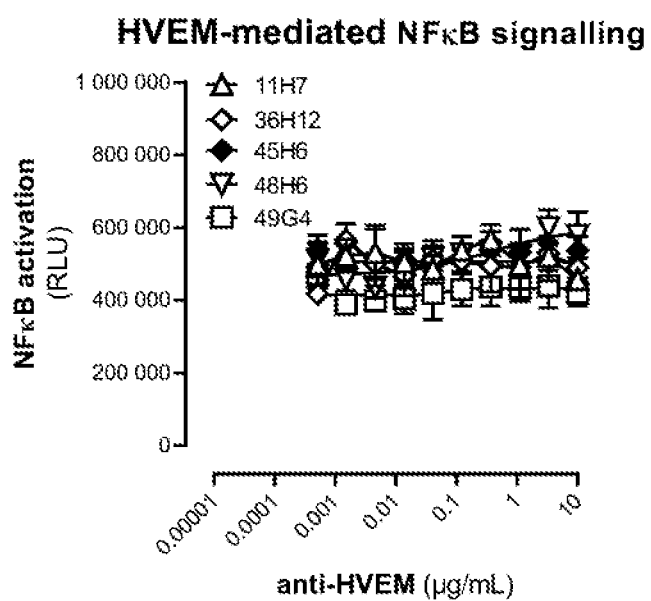

Figure 10 (Experiment 1 & 2)
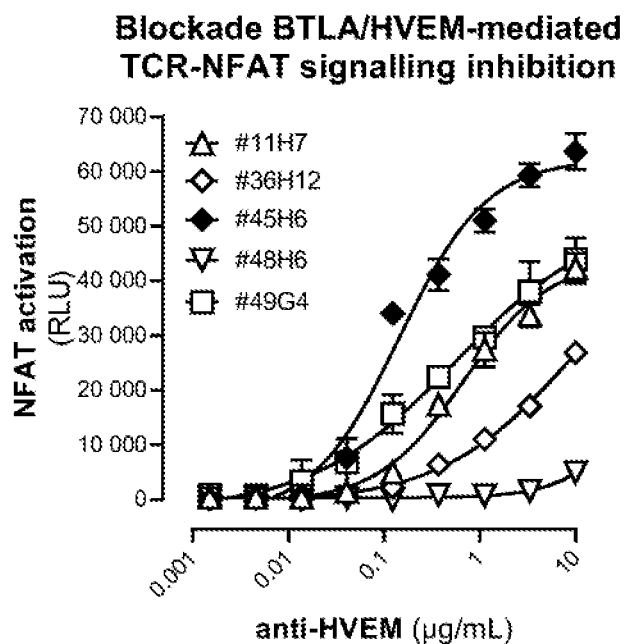
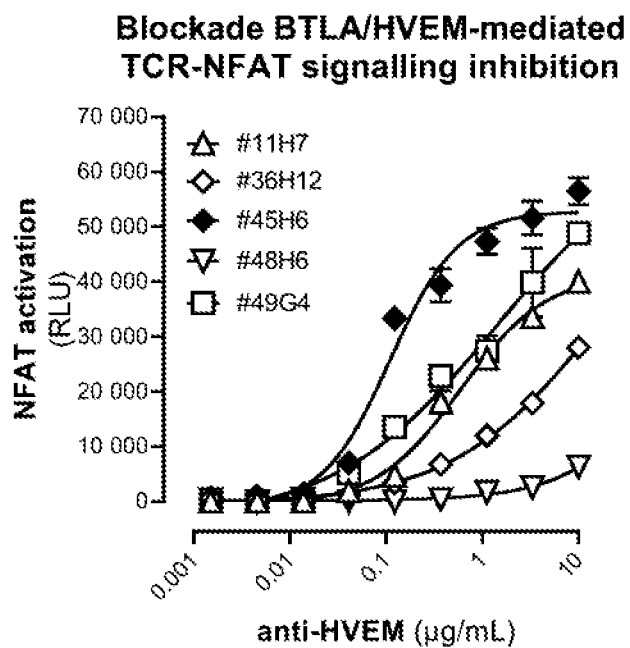

SEQUENCE LISTING

<160> NUMBER OF SEQ ID NOS: 77

<210> SEQ ID NO 1
<211> LENGTH: 283
<212> TYPE: PRT
<213> ORGANISM: Homo sapiens
<220> FEATURE:
<221> NAME/KEY: misc_feature
<223> OTHER INFORMATION: Amino acid sequence human HVEM (Swiss-Prot no. Q92956.3; aa 1-283)

<400> SEQUENCE: 1

```
Met Glu Pro Pro Gly Asp Trp Gly Pro Pro Trp Arg Ser Thr Pro
1               5                   10                  15

Lys Thr Asp Val Leu Arg Leu Val Leu Tyr Leu Thr Phe Leu Gly Ala
            20                  25                  30

Pro Cys Tyr Ala Pro Ala Leu Pro Ser Cys Lys Glu Asp Glu Tyr Pro
        35                  40                  45

Val Gly Ser Glu Cys Cys Pro Lys Cys Ser Pro Gly Tyr Arg Val Lys
    50                  55                  60

Glu Ala Cys Gly Glu Leu Thr Gly Thr Val Cys Glu Pro Cys Pro Pro
65                  70                  75                  80

Gly Thr Tyr Ile Ala His Leu Asn Gly Leu Ser Lys Cys Leu Gln Cys
                85                  90                  95

Gln Met Cys Asp Pro Ala Met Gly Leu Arg Ala Ser Arg Asn Cys Ser
            100                 105                 110

Arg Thr Glu Asn Ala Val Cys Gly Cys Ser Pro Gly His Phe Cys Ile
        115                 120                 125

Val Gln Asp Gly Asp His Cys Ala Ala Cys Arg Ala Tyr Ala Thr Ser
    130                 135                 140

Ser Pro Gly Gln Arg Val Gln Lys Gly Gly Thr Glu Ser Gln Asp Thr
145                 150                 155                 160

Leu Cys Gln Asn Cys Pro Pro Gly Thr Phe Ser Pro Asn Gly Thr Leu
                165                 170                 175

Glu Glu Cys Gln His Gln Thr Lys Cys Ser Trp Leu Val Thr Lys Ala
            180                 185                 190

Gly Ala Gly Thr Ser Ser Ser His Trp Val Trp Trp Phe Leu Ser Gly
```

```
               195                 200                 205
Ser Leu Val Ile Val Ile Val Cys Ser Thr Val Gly Leu Ile Ile Cys
        210                 215                 220

Val Lys Arg Lys Pro Arg Gly Asp Val Val Lys Val Ile Val Ser
225                 230                 235                 240

Val Gln Arg Lys Arg Gln Glu Ala Glu Gly Glu Ala Thr Val Ile Glu
                245                 250                 255

Ala Leu Gln Ala Pro Pro Asp Val Thr Thr Val Ala Val Glu Glu Thr
            260                 265                 270

Ile Pro Ser Phe Thr Gly Arg Ser Pro Asn His
        275                 280
```

<210> SEQ ID NO 2
<211> LENGTH: 849
<212> TYPE: DNA
<213> ORGANISM: Artificial Sequence
<220> FEATURE:
<223> OTHER INFORMATION: cDNA sequence coding for human HVEM protein
      (optimized for mammalian expression

<400> SEQUENCE: 2

```
atggagcccc tggcgattg gggacctcca ccttggagaa gcaccccaa gaccgacgtg    60 ctgcggctgg tgctgtacct gacctttctg ggcgctccct gttacgcccc tgccctgcct   120
agctgcaaag aggacgagta ccctgtgggc agcgagtgct gccctaagtg cagccctggc   180
tacagagtga agaggcctg cggcgagctg accggcaccg tgtgtgaacc ttgtcccct   240 ggcacctata tcgcccacct gaacggcctg agcaagtgcc tgcagtgcca gatgtgcgac   300
cccgctatgg gcctgagagc cagcagaaac tgcagccgga ccgagaatgc cgtgtgcggc   360
tgttctcctg ccacttctg catcgtgcag gacggcgatc actgcgccgc tgtagagcc   420 tacgccacat ctagcccagg ccagagagtg cagaagggcg caccgagag ccaggatacc   480 ctgtgccaga attgccctcc cggcaccttc agccccaacg cacactgga agagtgccag   540 caccagacca agtgcagctg gctcgtgacc aaagccggcg ctggcacaag cagctctcac   600
tgggtgtggt ggtttctgag cggcagcctc gtgatcgtga ttgtgtgcag caccgtgggc   660
ctgatcatct gcgtgaagcg gagaaagccc agaggcgacg tcgtgaaagt gatcgtgtcc   720
gtgcagcgga gcggcagga agccgaaggc gaggccacag tgattgaggc cctgcaggct   780 cccctgacg tgacaacagt ggccgtggaa gagacaatcc cagcttcac cggcagatcc   840 cccaaccac                                                          849
```

<210> SEQ ID NO 3
<211> LENGTH: 227
<212> TYPE: PRT
<213> ORGANISM: Artificial Sequence
<220> FEATURE:
<223> OTHER INFORMATION: Amino acid sequence CRD1 truncated human HVEM

<400> SEQUENCE: 3

```
Met Glu Trp Ser Gly Val Phe Met Phe Leu Leu Ser Val Thr Ala Gly
1               5                   10                  15

Val His Ser Glu Pro Cys Pro Pro Gly Thr Tyr Ile Ala His Leu Asn
            20                  25                  30

Gly Leu Ser Lys Cys Leu Gln Cys Gln Met Cys Asp Pro Ala Met Gly
        35                  40                  45

Leu Arg Ala Ser Arg Asn Cys Ser Arg Thr Glu Asn Ala Val Cys Gly
    50                  55                  60
```

```
Cys Ser Pro Gly His Phe Cys Ile Val Gln Asp Gly Asp His Cys Ala
65                  70                  75                  80

Ala Cys Arg Ala Tyr Ala Thr Ser Ser Pro Gly Gln Arg Val Gln Lys
                85                  90                  95

Gly Gly Thr Glu Ser Gln Asp Thr Leu Cys Gln Asn Cys Pro Pro Gly
            100                 105                 110

Thr Phe Ser Pro Asn Gly Thr Leu Glu Glu Cys Gln His Gln Thr Lys
        115                 120                 125

Cys Ser Trp Leu Val Thr Lys Ala Gly Ala Gly Thr Ser Ser Ser His
    130                 135                 140

Trp Val Trp Trp Phe Leu Ser Gly Ser Leu Val Ile Val Ile Val Cys
145                 150                 155                 160

Ser Thr Val Gly Leu Ile Ile Cys Val Lys Arg Arg Lys Pro Arg Gly
                165                 170                 175

Asp Val Val Lys Val Ile Val Ser Val Gln Arg Lys Arg Gln Glu Ala
            180                 185                 190

Glu Gly Glu Ala Thr Val Ile Glu Ala Leu Gln Ala Pro Pro Asp Val
        195                 200                 205

Thr Thr Val Ala Val Glu Glu Thr Ile Pro Ser Phe Thr Gly Arg Ser
    210                 215                 220

Pro Asn His
225

<210> SEQ ID NO 4
<211> LENGTH: 681
<212> TYPE: DNA
<213> ORGANISM: Artificial Sequence
<220> FEATURE:
<223> OTHER INFORMATION: cDNA sequence coding for CRD1 truncated human
      HVEM protein (optimized for mammalian expression)

<400> SEQUENCE: 4
atggagtgga gcggcgtgtt catgttcctg ctgagcgtga cagccggcgt gcacagcgaa     60
ccttgtcccc ctggcaccta tatcgcccac ctgaacggcc tgagcaagtg cctgcagtgc    120
cagatgtgcg accccgctat gggcctgaga gccagcagaa actgcagccg gaccgagaat    180
gccgtgtgcg gctgttctcc tggccacttc tgcatcgtgc aggacggcga tcactgcgcc    240
gcctgtagag cctacgccac atctagccct ggcagagagt gcagaagggg cggcaccgag    300
agccaggata ccctgtgcca gaattgccct ccggcacct tcagcccaa cggcacactg     360 gaagagtgcc agcaccagac caagtgcagc tggctcgtga ccaaagccgg cgctggcaca    420
agcagctctc actgggtgtg gtggtttctg agcggcagcc tcgtgatcgt gattgtgtgc    480
agcaccgtgg gcctgatcat ctgcgtgaag cggagaaagc cagaggcga cgtcgtgaaa    540 gtgatcgtgt ccgtgcagcg gaagcggcag gaagccgaag gcgaggccac agtgattgag    600
gccctgcagg ctccccctga cgtgacaaca gtggccgtgg aagagacaat ccccagcttc    660
accggcagat cccccaacca c                                              681

<210> SEQ ID NO 5
<211> LENGTH: 280
<212> TYPE: PRT
<213> ORGANISM: Cynomolgus sp.
<220> FEATURE:
<221> NAME/KEY: misc_feature
<223> OTHER INFORMATION: Amino acid sequence cynomolgus monkey HVEM
      (NCBI Reference Sequence: XP_005545061.1; aa 1-280)
```

<400> SEQUENCE: 5

```
Met Glu Pro Pro Gly Gly Trp Gly Ser Pro Pro Arg Arg Pro Ala Pro
1               5                   10                  15
Lys Ala Asp Ile Leu Thr Leu Val Leu Tyr Leu Thr Phe Leu Gly Ser
            20                  25                  30
Pro Cys Tyr Ala Pro Ala Leu Pro Ser Cys Lys Glu Asp Glu Tyr Pro
        35                  40                  45
Val Gly Ser Glu Cys Cys Pro Lys Cys Gly Pro Gly Phe His Val Arg
    50                  55                  60
Gln Ala Cys Gly Glu Gln Thr Gly Thr Val Cys Glu Pro Cys Ser Pro
65                  70                  75                  80
Gly Thr Tyr Ile Ala His Phe Asn Gly Leu Ser Lys Cys Leu Gln Cys
                85                  90                  95
Gln Met Cys Asp Pro Ala Met Gly Leu Arg Thr Ser Arg Asn Cys Ser
            100                 105                 110
Thr Thr Ala Asn Ala Leu Cys Gly Cys Ser Pro Gly His Phe Cys Ile
        115                 120                 125
Ile Gln Asp Gly Asp His Cys Ala Ala Cys Arg Ala Tyr Ala Thr Ser
    130                 135                 140
Ser Pro Gly Gln Arg Val Gln Lys Gly Gly Thr Glu Ser Gln Asp Thr
145                 150                 155                 160
Leu Cys Gln Asn Cys Pro Pro Gly Thr Phe Ser Ser Asn Gly Thr Leu
                165                 170                 175
Glu Glu Cys Gln His Gly Thr Lys Cys Ser Lys Trp Leu Val Thr Glu
            180                 185                 190
Ala Gly Pro Gly Thr Ser Ser Phe Arg Trp Val Trp Leu Leu Ser
        195                 200                 205
Gly Thr Leu Ile Val Ile Val Gly Leu Ile Leu Gly Leu Ile Tyr
    210                 215                 220
Val Lys Arg Arg Lys Ser Arg Gly Asp Val Val Lys Val Ile Val Ser
225                 230                 235                 240
Val Gln Arg Lys Arg Gln Glu Ala Glu Gly Glu Ala Ile Val Thr Glu
                245                 250                 255
Ala Leu Gln Ala Pro Pro Asp Ile Thr Thr Val Ala Val Glu Glu Thr
            260                 265                 270
Glu Pro Ala Phe Thr Gly Arg Ser
        275                 280
```

<210> SEQ ID NO 6
<211> LENGTH: 840
<212> TYPE: DNA
<213> ORGANISM: Artificial Sequence
<220> FEATURE:
<223> OTHER INFORMATION: cDNA sequence coding for cynomolgus monkey HVEM protein (optimized for mammalian expression)

<400> SEQUENCE: 6

```
atggagcctc caggcggatg gggatctccc ccaagaaggc ctgcccccaa ggccgatatc     60
ctgaccctgg tgctgtacct gaccttcctg ggcagccctt gttacgcccc tgccctgcct    120
agctgcaaag aggacgagta ccctgtgggc agcgagtgct gccctaagtg cggccctgga    180
tttcatgtgc ggcaggcctg tggcgagcag accggcacag tgtgcgagcc ttgtagcccc    240
ggcacctata tcgcccactt caacggcctg agcaagtgcc tgcagtgcca gatgtgcgac    300
cccgctatgg gcctgcggac cagcagaaat tgcagcacca ccgccaatgc cctgtgcggc    360
```

```
tgttctcctg gccacttctg cattattcag gacggcgacc actgcgccgc ctgcagagcc      420
tatgccacat ctagccctgg ccagcgggtg cagaagggcg aacagagtc tcaggacacc       480 ctgtgccaga actgcccccc tggcaccttc agcagcaacg gcaccctgga agagtgccag      540
cacggcacca agtgcagcaa gtggctcgtg acagaggccg gacctggcac cagcagcttc     600
agatgggtgt ggtggctgct gagcggcaca ctgatcgtga tcatcgtggg cctgatcctg      660
ggactgatct acgtgaagcg gcggaagtcc agaggcgacg tcgtgaaagt gatcgtgtcc     720
gtgcagcgga agagacagga agccgagggc gaggccattg tgaccgaagc cctgcaggcc    780 cctccccgaca ttacaaccgt ggccgtggaa gaaaccgagc ccgcctttac cggcagatcc   840
```

<210> SEQ ID NO 7
<211> LENGTH: 30
<212> TYPE: DNA
<213> ORGANISM: Artificial Sequence
<220> FEATURE:
<223> OTHER INFORMATION: PCR primer
<400> SEQUENCE: 7

```
atgaagttgc ctgttaggct gttggtgctg                                       30
```

<210> SEQ ID NO 8
<211> LENGTH: 30
<212> TYPE: DNA
<213> ORGANISM: Artificial Sequence
<220> FEATURE:
<223> OTHER INFORMATION: PCR primer
<400> SEQUENCE: 8

```
atggatttwc aggtgcagat twtcagcttc                                       30
```

<210> SEQ ID NO 9
<211> LENGTH: 24
<212> TYPE: DNA
<213> ORGANISM: Artificial Sequence
<220> FEATURE:
<223> OTHER INFORMATION: PCR primer
<400> SEQUENCE: 9

```
atgggcwtca aagatggagt caca                                             24
```

<210> SEQ ID NO 10
<211> LENGTH: 20
<212> TYPE: DNA
<213> ORGANISM: Artificial Sequence
<220> FEATURE:
<223> OTHER INFORMATION: PCR primer
<400> SEQUENCE: 10

```
actggatggt gggaagatgg                                                  20
```

<210> SEQ ID NO 11
<211> LENGTH: 27
<212> TYPE: DNA
<213> ORGANISM: Artificial Sequence
<220> FEATURE:
<223> OTHER INFORMATION: PCR primer
<400> SEQUENCE: 11

```
atgaaatgca gctggggcat sttcttc                                          27
```

<210> SEQ ID NO 12
<211> LENGTH: 25

```
<212> TYPE: DNA
<213> ORGANISM: Artificial Sequence
<220> FEATURE:
<223> OTHER INFORMATION: PCR primer

<400> SEQUENCE: 12
atgractttg ggytcagctt grttt                                            25

<210> SEQ ID NO 13
<211> LENGTH: 31
<212> TYPE: DNA
<213> ORGANISM: Artificial Sequence
<220> FEATURE:
<223> OTHER INFORMATION: PCR primer

<400> SEQUENCE: 13
atgggactcc aggctcaatt tagttttcct t                                     31

<210> SEQ ID NO 14
<211> LENGTH: 29
<212> TYPE: DNA
<213> ORGANISM: Artificial Sequence
<220> FEATURE:
<223> OTHER INFORMATION: PCR primer

<400> SEQUENCE: 14
atggcttgtc yttrgsgctr ctcttctgc                                        29

<210> SEQ ID NO 15
<211> LENGTH: 21
<212> TYPE: DNA
<213> ORGANISM: Artificial Sequence
<220> FEATURE:
<223> OTHER INFORMATION: PCR primer

<400> SEQUENCE: 15
cagtggatag acagatgggg g                                                21

<210> SEQ ID NO 16
<211> LENGTH: 119
<212> TYPE: PRT
<213> ORGANISM: Mus musculus
<220> FEATURE:
<221> NAME/KEY: misc_feature
<223> OTHER INFORMATION: Consensus amino acid sequence of heavy chain
      variable region of mouse anti-human HVEM antibody 36H12

<400> SEQUENCE: 16

Glu Val Gln Leu Gln Gln Ser Gly Ala Gly Leu Val Lys Pro Gly Ala
1               5                   10                  15

Ser Val Lys Leu Ser Cys Thr Ala Ser Gly Phe Asn Ile Lys Asp Thr
            20                  25                  30

Tyr Met His Trp Val Arg Gln Arg Pro Glu Gln Gly Leu Glu Trp Ile
        35                  40                  45

Gly Arg Ile Asp Pro Ala Thr Ala Asn Thr Lys Tyr Asp Pro Lys Phe
    50                  55                  60

Gln Gly Lys Ala Thr Leu Thr Thr Asp Thr Ser Asn Thr Ala Tyr
65                  70                  75                  80

Leu Gln Leu Ser Ser Leu Thr Ser Glu Asp Thr Ala Val Tyr Tyr Cys
                85                  90                  95

Val Thr Tyr Gly Tyr Asp Val Ser Trp Phe Ala Tyr Trp Gly Leu Gly
            100                 105                 110

Ala Leu Val Thr Val Ser Ala
```

```
<210> SEQ ID NO 17
<211> LENGTH: 112
<212> TYPE: PRT
<213> ORGANISM: Mus musculus
<220> FEATURE:
<221> NAME/KEY: misc_feature
<223> OTHER INFORMATION: Consensus amino acid sequence of light chain
      variable region of mouse anti-human HVEM antibody 36H12

<400> SEQUENCE: 17

Asp Val Leu Met Thr Gln Thr Pro Leu Ser Leu Pro Val Ser Leu Gly
1               5                   10                  15

Asp Gln Ala Ser Ile Ser Cys Arg Ser Gln Ser Ile Val His Ser
            20                  25                  30

Asn Gly Ile Thr Tyr Leu Glu Trp Tyr Leu Gln Lys Pro Gly Gln Ser
        35                  40                  45

Pro Lys Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Phe Gln Gly
                85                  90                  95

Ser His Val Pro Leu Thr Phe Gly Ala Gly Thr Lys Leu Glu Leu Lys
            100                 105                 110

<210> SEQ ID NO 18
<211> LENGTH: 5
<212> TYPE: PRT
<213> ORGANISM: Mus musculus
<220> FEATURE:
<221> NAME/KEY: misc_feature
<223> OTHER INFORMATION: Amino acid sequence heavy chain CDR1 of 36H12

<400> SEQUENCE: 18

Asp Thr Tyr Met His
1               5

<210> SEQ ID NO 19
<211> LENGTH: 17
<212> TYPE: PRT
<213> ORGANISM: Mus musculus
<220> FEATURE:
<221> NAME/KEY: misc_feature
<223> OTHER INFORMATION: Amino acid sequence heavy chain CDR2 of 36H12

<400> SEQUENCE: 19

Arg Ile Asp Pro Ala Thr Ala Asn Thr Lys Tyr Asp Pro Lys Phe Gln
1               5                   10                  15

Gly

<210> SEQ ID NO 20
<211> LENGTH: 10
<212> TYPE: PRT
<213> ORGANISM: Mus musculus
<220> FEATURE:
<221> NAME/KEY: misc_feature
<223> OTHER INFORMATION: Amino acid sequence heavy chain CDR3 of 36H12

<400> SEQUENCE: 20

Tyr Gly Tyr Asp Val Ser Trp Phe Ala Tyr
1               5                   10
```

<210> SEQ ID NO 21
<211> LENGTH: 16
<212> TYPE: PRT
<213> ORGANISM: Mus musculus
<220> FEATURE:
<221> NAME/KEY: misc_feature
<223> OTHER INFORMATION: Amino acid sequence light chain CDR1 of 36H12

<400> SEQUENCE: 21

Arg Ser Ser Gln Ser Ile Val His Ser Asn Gly Ile Thr Tyr Leu Glu
1               5                   10                  15

<210> SEQ ID NO 22
<211> LENGTH: 7
<212> TYPE: PRT
<213> ORGANISM: Mus musculus
<220> FEATURE:
<221> NAME/KEY: misc_feature
<223> OTHER INFORMATION: Amino acid sequence light chain CDR2 of 36H12

<400> SEQUENCE: 22

Lys Val Ser Asn Arg Phe Ser
1               5

<210> SEQ ID NO 23
<211> LENGTH: 9
<212> TYPE: PRT
<213> ORGANISM: Mus musculus
<220> FEATURE:
<221> NAME/KEY: misc_feature
<223> OTHER INFORMATION: Amino acid sequence light chain CDR3 of 36H12

<400> SEQUENCE: 23

Phe Gln Gly Ser His Val Pro Leu Thr
1               5

<210> SEQ ID NO 24
<211> LENGTH: 123
<212> TYPE: PRT
<213> ORGANISM: Mus musculus
<220> FEATURE:
<221> NAME/KEY: misc_feature
<223> OTHER INFORMATION: Consensus amino acid sequence of heavy chain
    variable region of mouse anti-human HVEM antibody 45H6

<400> SEQUENCE: 24

Asp Val Gln Leu Val Glu Ser Gly Gly Gly Leu Val Gln Pro Gly Gly
1               5                   10                  15

Ser Arg Lys Leu Ser Cys Ala Ala Ser Gly Phe Thr Phe Ser Ser Phe
            20                  25                  30

Gly Met His Trp Val Arg Gln Ala Pro Glu Lys Gly Leu Glu Trp Val
        35                  40                  45

Ala Tyr Ile Ser Ser Gly Asn Ser Asn Ile Tyr Tyr Val Asp Thr Val
    50                  55                  60

Lys Gly Arg Phe Thr Ile Ser Arg Asp Asn Pro Lys Asn Thr Leu Phe
65                  70                  75                  80

Leu Gln Met Thr Ser Leu Arg Ser Glu Asp Thr Ala Met Tyr Tyr Cys
                85                  90                  95

Ala Arg Lys Arg Ala Tyr Gly Asp Tyr Ser Gly Phe Ser Met Asp Tyr
            100                 105                 110

Trp Gly Gln Gly Thr Ser Val Thr Val Ser Ser
        115                 120

```
<210> SEQ ID NO 25
<211> LENGTH: 107
<212> TYPE: PRT
<213> ORGANISM: Mus musculus
<220> FEATURE:
<221> NAME/KEY: misc_feature
<223> OTHER INFORMATION: Consensus amino acid sequence of light chain
      variable region of mouse anti-human HVEM antibody 45H6

<400> SEQUENCE: 25

Asp Ile Val Met Thr Gln Ser Gln Lys Phe Met Ser Thr Ser Val Gly
1               5                   10                  15

Asp Arg Val Ser Val Thr Cys Lys Ala Ser Gln Asn Val Asp Thr Asn
            20                  25                  30

Val Ala Trp Tyr Gln Gln Lys Pro Gly Gln Ser Pro Lys Ala Leu Ile
        35                  40                  45

Tyr Ser Ala Ser Tyr Arg Tyr Ser Gly Val Pro Asp Arg Phe Thr Gly
50                  55                  60

Ser Gly Ser Gly Thr Asp Phe Thr Leu Thr Ile Ser Asn Val Gln Ser
65                  70                  75                  80

Glu Asp Leu Ala Glu Tyr Phe Cys Gln Gln Tyr Asn Lys Phe Pro Leu
                85                  90                  95

Thr Phe Gly Gly Gly Thr Lys Leu Glu Ile Lys
            100                 105

<210> SEQ ID NO 26
<211> LENGTH: 5
<212> TYPE: PRT
<213> ORGANISM: Mus musculus
<220> FEATURE:
<221> NAME/KEY: misc_feature
<223> OTHER INFORMATION: Amino acid sequence heavy chain CDR1 of 45H6

<400> SEQUENCE: 26

Ser Phe Gly Met His
1               5

<210> SEQ ID NO 27
<211> LENGTH: 17
<212> TYPE: PRT
<213> ORGANISM: Mus musculus
<220> FEATURE:
<221> NAME/KEY: misc_feature
<223> OTHER INFORMATION: Amino acid sequence heavy chain CDR2 of 45H6

<400> SEQUENCE: 27

Tyr Ile Ser Ser Gly Asn Ser Asn Ile Tyr Tyr Val Asp Thr Val Lys
1               5                   10                  15

Gly

<210> SEQ ID NO 28
<211> LENGTH: 14
<212> TYPE: PRT
<213> ORGANISM: Mus musculus
<220> FEATURE:
<221> NAME/KEY: misc_feature
<223> OTHER INFORMATION: Amino acid sequence heavy chain CDR3 of 45H6

<400> SEQUENCE: 28

Lys Arg Ala Tyr Gly Asp Tyr Ser Gly Phe Ser Met Asp Tyr
1               5                   10

<210> SEQ ID NO 29
<211> LENGTH: 11
```

```
<212> TYPE: PRT
<213> ORGANISM: Mus musculus
<220> FEATURE:
<221> NAME/KEY: misc_feature
<223> OTHER INFORMATION: Amino acid sequence light chain CDR1 of 45H6

<400> SEQUENCE: 29

Lys Ala Ser Gln Asn Val Asp Thr Asn Val Ala
1               5                   10

<210> SEQ ID NO 30
<211> LENGTH: 7
<212> TYPE: PRT
<213> ORGANISM: Mus musculus
<220> FEATURE:
<221> NAME/KEY: misc_feature
<223> OTHER INFORMATION: Amino acid sequence light chain CDR2 of 45H6

<400> SEQUENCE: 30

Ser Ala Ser Tyr Arg Tyr Ser
1               5

<210> SEQ ID NO 31
<211> LENGTH: 9
<212> TYPE: PRT
<213> ORGANISM: Mus musculus
<220> FEATURE:
<221> NAME/KEY: misc_feature
<223> OTHER INFORMATION: Amino acid sequence light chain CDR3 of 45H6

<400> SEQUENCE: 31

Gln Gln Tyr Asn Lys Phe Pro Leu Thr
1               5

<210> SEQ ID NO 32
<211> LENGTH: 117
<212> TYPE: PRT
<213> ORGANISM: Mus musculus
<220> FEATURE:
<221> NAME/KEY: misc_feature
<223> OTHER INFORMATION: Consensus amino acid sequence of heavy chain
      variable region of mouse anti-human HVEM antibody 48H6

<400> SEQUENCE: 32

Glu Val Lys Leu Val Glu Ser Gly Gly Gly Leu Val Lys Pro Gly Gly
1               5                   10                  15

Ser Leu Lys Leu Ser Cys Ala Ala Ser Gly Phe Thr Phe Ser Gly Tyr
            20                  25                  30

Ala Met Ser Trp Val Arg Gln Thr Pro Glu Lys Arg Leu Glu Trp Val
        35                  40                  45

Ala Ser Ile Ser Ser Gly Gly Ser Thr Tyr Tyr Pro Asp Ser Val Lys
    50                  55                  60

Gly Arg Phe Thr Ile Pro Arg Asp Asp Ala Arg Asn Ile Leu Tyr Leu
65                  70                  75                  80

Gln Met Ser Ser Leu Arg Ser Glu Asp Thr Ala Ile Tyr Tyr Cys Ala
                85                  90                  95

Arg Gly Gly His Gly Ser Ser Tyr Val Tyr Trp Gly Gln Gly Thr Thr
            100                 105                 110

Leu Thr Val Ser Ser
        115

<210> SEQ ID NO 33
<211> LENGTH: 113
<212> TYPE: PRT
```

```
<213> ORGANISM: Mus musculus
<220> FEATURE:
<221> NAME/KEY: misc_feature
<223> OTHER INFORMATION: Consensus amino acid sequence of light chain
      variable region of mouse anti-human HVEM antibody 48H6

<400> SEQUENCE: 33

Asp Ile Val Met Ser Gln Ser Pro Ser Ser Leu Ala Val Ser Val Gly
1               5                   10                  15

Glu Lys Val Thr Met Ser Cys Lys Ser Ser Gln Ser Leu Leu Tyr Ser
            20                  25                  30

Ser Asn Gln Lys Asn Tyr Leu Ala Trp Tyr Gln Gln Lys Pro Gly Gln
        35                  40                  45

Ser Pro Lys Leu Leu Ile Tyr Trp Ala Ser Thr Arg Glu Ser Gly Val
    50                  55                  60

Pro Asp Arg Phe Thr Gly Ser Gly Ser Gly Thr Asp Phe Thr Leu Thr
65                  70                  75                  80

Ile Ser Ser Val Lys Ala Glu Asp Leu Ala Val Tyr Tyr Cys His Gln
                85                  90                  95

Tyr Tyr Ser Tyr Pro Leu Thr Phe Gly Ala Gly Thr Lys Leu Glu Leu
                100                 105                 110

Asn

<210> SEQ ID NO 34
<211> LENGTH: 5
<212> TYPE: PRT
<213> ORGANISM: Mus musculus
<220> FEATURE:
<221> NAME/KEY: misc_feature
<223> OTHER INFORMATION: Amino acid sequence heavy chain CDR1 of 48H6

<400> SEQUENCE: 34

Gly Tyr Ala Met Ser
1               5

<210> SEQ ID NO 35
<211> LENGTH: 16
<212> TYPE: PRT
<213> ORGANISM: Mus musculus
<220> FEATURE:
<221> NAME/KEY: misc_feature
<223> OTHER INFORMATION: Amino acid sequence heavy chain CDR2 of 48H6

<400> SEQUENCE: 35

Ser Ile Ser Ser Gly Gly Ser Thr Tyr Tyr Pro Asp Ser Val Lys Gly
1               5                   10                  15

<210> SEQ ID NO 36
<211> LENGTH: 9
<212> TYPE: PRT
<213> ORGANISM: Mus musculus
<220> FEATURE:
<221> NAME/KEY: misc_feature
<223> OTHER INFORMATION: Amino acid sequence heavy chain CDR3 of 48H6

<400> SEQUENCE: 36

Gly Gly His Gly Ser Ser Tyr Val Tyr
1               5

<210> SEQ ID NO 37
<211> LENGTH: 17
<212> TYPE: PRT
<213> ORGANISM: Mus musculus
<220> FEATURE:
```

```
<221> NAME/KEY: misc_feature
<223> OTHER INFORMATION: Amino acid sequence light chain CDR1 of 48H6

<400> SEQUENCE: 37

Lys Ser Ser Gln Ser Leu Leu Tyr Ser Ser Asn Gln Lys Asn Tyr Leu
1               5                   10                  15
Ala

<210> SEQ ID NO 38
<211> LENGTH: 7
<212> TYPE: PRT
<213> ORGANISM: Mus musculus
<220> FEATURE:
<221> NAME/KEY: misc_feature
<223> OTHER INFORMATION: Amino acid sequence light chain CDR2 of 48H6

<400> SEQUENCE: 38

Trp Ala Ser Thr Arg Glu Ser
1               5

<210> SEQ ID NO 39
<211> LENGTH: 9
<212> TYPE: PRT
<213> ORGANISM: Mus musculus
<220> FEATURE:
<221> NAME/KEY: misc_feature
<223> OTHER INFORMATION: Amino acid sequence light chain CDR3 of 48H6

<400> SEQUENCE: 39

His Gln Tyr Tyr Ser Tyr Pro Leu Thr
1               5

<210> SEQ ID NO 40
<211> LENGTH: 122
<212> TYPE: PRT
<213> ORGANISM: Mus musculus
<220> FEATURE:
<221> NAME/KEY: misc_feature
<223> OTHER INFORMATION: Consensus amino acid sequence of heavy chain
      variable region of mouse anti-human HVEM antibody 11H7

<400> SEQUENCE: 40

Gln Val Gln Leu Lys Gln Ser Gly Pro Gly Leu Val Gln Pro Ser Gln
1               5                   10                  15

Ser Leu Ser Ile Thr Cys Thr Val Ser Gly Phe Ser Leu Thr Ile Tyr
            20                  25                  30

Gly Val His Trp Val Arg Gln Ser Pro Gly Lys Gly Leu Glu Trp Leu
        35                  40                  45

Gly Val Ile Trp Ser Gly Gly Ser Thr Asp Tyr Asn Ala Ala Phe Ile
    50                  55                  60

Ser Arg Leu Ser Ile Ser Lys Asp Asn Ser Lys Ser Gln Val Phe Phe
65                  70                  75                  80

Lys Met Asn Ser Leu Gln Ala Asn Asp Thr Ala Ile Tyr Tyr Cys Ala
                85                  90                  95

Arg Arg Asp Tyr Gly Ser Arg Ser Phe Tyr Tyr Ala Met Asp Tyr Trp
            100                 105                 110

Gly Gln Gly Thr Ser Val Thr Val Ser Ser
        115                 120

<210> SEQ ID NO 41
<211> LENGTH: 108
<212> TYPE: PRT
<213> ORGANISM: Mus musculus
```

```
<220> FEATURE:
<221> NAME/KEY: misc_feature
<223> OTHER INFORMATION: Consensus amino acid sequence of light chain
      variable region of mouse anti-human HVEM antibody 11H7

<400> SEQUENCE: 41

Glu Ile Val Leu Thr Gln Ser Pro Ala Leu Met Ala Ala Ser Pro Gly
1               5                   10                  15

Glu Lys Val Thr Ile Thr Cys Ser Val Ser Ser Ser Ile Ser Ser Ser
            20                  25                  30

Asn Leu His Trp Tyr Gln Gln Lys Ser Glu Thr Ser Pro Lys Pro Trp
        35                  40                  45

Ile Tyr Gly Thr Ser Asn Leu Ala Ser Gly Val Pro Val Arg Phe Ser
50                  55                  60

Gly Ser Gly Ser Gly Thr Ser Tyr Ser Leu Thr Ile Ser Ser Met Glu
65                  70                  75                  80

Ala Glu Asp Ala Ala Thr Tyr Tyr Cys Gln Gln Trp Ser Ser Tyr Pro
                85                  90                  95

Leu Thr Phe Gly Gly Gly Thr Lys Leu Glu Ile Lys
            100                 105

<210> SEQ ID NO 42
<211> LENGTH: 5
<212> TYPE: PRT
<213> ORGANISM: Mus musculus
<220> FEATURE:
<221> NAME/KEY: misc_feature
<223> OTHER INFORMATION: Amino acid sequence heavy chain CDR1 of 11H7

<400> SEQUENCE: 42

Ile Tyr Gly Val His
1               5

<210> SEQ ID NO 43
<211> LENGTH: 16
<212> TYPE: PRT
<213> ORGANISM: Mus musculus
<220> FEATURE:
<221> NAME/KEY: misc_feature
<223> OTHER INFORMATION: Amino acid sequence heavy chain CDR2 of 11H7

<400> SEQUENCE: 43

Val Ile Trp Ser Gly Gly Ser Thr Asp Tyr Asn Ala Ala Phe Ile Ser
1               5                   10                  15

<210> SEQ ID NO 44
<211> LENGTH: 14
<212> TYPE: PRT
<213> ORGANISM: Mus musculus
<220> FEATURE:
<221> NAME/KEY: misc_feature
<223> OTHER INFORMATION: Amino acid sequence heavy chain CDR3 of 11H7

<400> SEQUENCE: 44

Arg Asp Tyr Gly Ser Arg Ser Phe Tyr Tyr Ala Met Asp Tyr
1               5                   10

<210> SEQ ID NO 45
<211> LENGTH: 12
<212> TYPE: PRT
<213> ORGANISM: Mus musculus
<220> FEATURE:
<221> NAME/KEY: misc_feature
<223> OTHER INFORMATION: Amino acid sequence light chain CDR1 of 11H7
```

```
<400> SEQUENCE: 45

Ser Val Ser Ser Ser Ile Ser Ser Ser Asn Leu His
1               5                   10

<210> SEQ ID NO 46
<211> LENGTH: 7
<212> TYPE: PRT
<213> ORGANISM: Mus musculus
<220> FEATURE:
<221> NAME/KEY: misc_feature
<223> OTHER INFORMATION: Amino acid sequence light chain CDR2 of 11H7

<400> SEQUENCE: 46

Gly Thr Ser Asn Leu Ala Ser
1               5

<210> SEQ ID NO 47
<211> LENGTH: 9
<212> TYPE: PRT
<213> ORGANISM: Mus musculus
<220> FEATURE:
<221> NAME/KEY: misc_feature
<223> OTHER INFORMATION: Amino acid sequence light chain CDR3 of 11H7

<400> SEQUENCE: 47

Gln Gln Trp Ser Ser Tyr Pro Leu Thr
1               5

<210> SEQ ID NO 48
<211> LENGTH: 113
<212> TYPE: PRT
<213> ORGANISM: Mus musculus
<220> FEATURE:
<221> NAME/KEY: misc_feature
<223> OTHER INFORMATION: Consensus amino acid sequence of heavy chain
      variable region of mouse anti-human HVEM antibody 49G4

<400> SEQUENCE: 48

Glu Val Gln Leu Gln Gln Ser Gly Ala Glu Leu Val Lys Pro Gly Ala
1               5                   10                  15

Ser Val Lys Leu Ser Cys Arg Ala Ser Gly Phe Asn Ile Lys Asp Thr
            20                  25                  30

Tyr Met His Trp Val Lys Gln Arg Pro Glu Gln Gly Leu Glu Trp Ile
        35                  40                  45

Gly Arg Ile Asp Pro Ala Arg Gly Asn Thr Lys Tyr Asp Pro Lys Phe
    50                  55                  60

Gln Gly Lys Ala Thr Ile Thr Ala Asp Thr Ser Ser Asn Thr Ala Tyr
65                  70                  75                  80

Leu Gln Leu Ser Ser Leu Thr Ser Glu Asp Thr Ala Val Tyr Tyr Cys
                85                  90                  95

Ala Ser Ala Met Asp Tyr Trp Gly Gln Gly Thr Ser Val Thr Val Ser
            100                 105                 110

Ser

<210> SEQ ID NO 49
<211> LENGTH: 112
<212> TYPE: PRT
<213> ORGANISM: Mus musculus
<220> FEATURE:
<221> NAME/KEY: misc_feature
<223> OTHER INFORMATION: Consensus amino acid sequence of light chain
      variable region of mouse anti-human HVEM antibody 49G4

<400> SEQUENCE: 49
```

Asp Val Leu Met Thr Gln Thr Pro Leu Ser Leu Pro Val Ser Leu Gly
1               5                   10                  15

Asp Gln Ala Ser Ile Ser Cys Arg Ser Ser Gln Ser Ile Val His Ser
            20                  25                  30

Asn Gly Asn Thr Tyr Leu Glu Trp Phe Leu Gln Lys Pro Gly Gln Ser
        35                  40                  45

Pro Lys Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr Tyr Cys Phe Gln Gly
                85                  90                  95

Ser His Val Pro Leu Thr Phe Gly Ala Gly Thr Lys Leu Glu Leu Lys
            100                 105                 110

<210> SEQ ID NO 50
<211> LENGTH: 5
<212> TYPE: PRT
<213> ORGANISM: Mus musculus
<220> FEATURE:
<221> NAME/KEY: misc_feature
<223> OTHER INFORMATION: Amino acid sequence heavy chain CDR1 of 49G4

<400> SEQUENCE: 50

Asp Thr Tyr Met His
1               5

<210> SEQ ID NO 51
<211> LENGTH: 17
<212> TYPE: PRT
<213> ORGANISM: Mus musculus
<220> FEATURE:
<221> NAME/KEY: misc_feature
<223> OTHER INFORMATION: Amino acid sequence heavy chain CDR2 of 49G4

<400> SEQUENCE: 51

Arg Ile Asp Pro Ala Arg Gly Asn Thr Lys Tyr Asp Pro Lys Phe Gln
1               5                   10                  15

Gly

<210> SEQ ID NO 52
<211> LENGTH: 4
<212> TYPE: PRT
<213> ORGANISM: Mus musculus
<220> FEATURE:
<221> NAME/KEY: misc_feature
<223> OTHER INFORMATION: Amino acid sequence heavy chain CDR3 of 49G4

<400> SEQUENCE: 52

Ala Met Asp Tyr
1

<210> SEQ ID NO 53
<211> LENGTH: 16
<212> TYPE: PRT
<213> ORGANISM: Mus musculus
<220> FEATURE:
<221> NAME/KEY: misc_feature
<223> OTHER INFORMATION: Amino acid sequence light chain CDR1 of 49G4

<400> SEQUENCE: 53

Arg Ser Ser Gln Ser Ile Val His Ser Asn Gly Asn Thr Tyr Leu Glu
1               5                   10                  15

```
<210> SEQ ID NO 54
<211> LENGTH: 7
<212> TYPE: PRT
<213> ORGANISM: Mus musculus
<220> FEATURE:
<221> NAME/KEY: misc_feature
<223> OTHER INFORMATION: Amino acid sequence light chain CDR2 of 49G4

<400> SEQUENCE: 54

Lys Val Ser Asn Arg Phe Ser
1               5

<210> SEQ ID NO 55
<211> LENGTH: 9
<212> TYPE: PRT
<213> ORGANISM: Mus musculus
<220> FEATURE:
<221> NAME/KEY: misc_feature
<223> OTHER INFORMATION: Amino acid sequence light chain CDR3 of 49G4

<400> SEQUENCE: 55

Phe Gln Gly Ser His Val Pro Leu Thr
1               5

<210> SEQ ID NO 56
<211> LENGTH: 1395
<212> TYPE: DNA
<213> ORGANISM: Artificial Sequence
<220> FEATURE:
<223> OTHER INFORMATION: cDNA sequence coding for chimeric mouse VH
      36H12 and human constant heavy IgG4 chain

<400> SEQUENCE: 56
atggagctgg gcctgagctg gattttctg ctggccatcc tgaagggcgt gcagtgcgaa      60
gttcagctgc agcaatctgg cgccggactg gttaagcctg gcgcctctgt gaagctgagc     120
tgtaccgcca gcggcttcaa catcaaggac acctacatgc actgggtccg acagaggcct     180
gagcagggac tcgaatggat cggcagaatc gatcccgcca ccgccaacac caaatacgac     240
cccaagttcc agggcaaagc cacactgacc accgacacca gcagcaacac agcctacctg     300
cagctgtcta gcctgaccag cgaagatacc gccgtgtact actgcgtgac ctacggctac     360
gatgtgtctt ggtttgccta ctggggactg gcgccctgg ttacagtttc tgccgcctct     420
acaaagggcc ccagcgtttt cccactggct cctgtagca gaagcaccag cgaatctaca     480
gccgctctgg gctgcctggt caaggactac tttcctgagc ctgtgaccgt gtcctggaac     540
tctggcgctc tgacatctgg cgtgcacacc tttccagccg tgctgcaaag cagcggcctg     600
tactctctga gcagcgtggt cacagtgcct agctctagcc tgggcaccaa gacctacacc     660
tgtaatgtgg accacaagcc tagcaacacc aaggtggaca agcgcgtgga atctaagtac     720
ggccctcctt gtcctccatg tcctgcacct gagtttctcg gcggaccctc cgtgttcctg     780
tttcctccaa agcctaagga caccctgatg atcagcagaa cccctgaagt gacctgcgtg     840
gtggtggacg tttcccaaga ggaccctgag gtgcagttca attggtacgt ggacggcgtg     900
gaagtgcaca cgccaagac caagcctaga gaggaacagt tcaacagcac ctacagagtg     960
gtgtccgtgc tgacagtgct gcaccaggat tggctgaacg gcaaagagta caagtgcaag    1020
gtgtccaaca agggcctgcc tagcagcatc gagaaaacca tcagcaaggc caagggccag    1080
ccaagagaac cccaggtgta cacactgcct ccaagccaag aggaaatgac caagaaccag    1140
gtgtccctga cctgcctcgt gaagggcttc taccttccg atatcgccgt ggaatgggag    1200
```

```
agcaatggcc agcctgagaa caactacaag acaacccctc ctgtgctgga cagcgacggc    1260
tcattcttcc tgtacagcag actgaccgtg acaagagca gatggcaaga gggcaacgtg    1320
ttctcctgca gcgtgatgca cgaggccctg cacaaccact acacccagaa gtctctgtcc    1380
ctgtctctgg gcaag                                                   1395

<210> SEQ ID NO 57
<211> LENGTH: 1407
<212> TYPE: DNA
<213> ORGANISM: Artificial Sequence
<220> FEATURE:
<223> OTHER INFORMATION: cDNA sequence coding for chimeric mouse VH 45H6
      and human constant heavy IgG4 chain

<400> SEQUENCE: 57
atggagctgg gcctgagctg gattttctg ctggccatcc tgaagggcgt gcagtgtgat      60
gtgcagctgg tggaatctgg cggaggactg gttcaacctg gcggcagcag aaagctgtct    120
tgtgccgcca gcggcttcac cttcagcagc tttggaatgc actgggtccg acaggccct    180 gagaaaggcc ttgagtgggt cgcctacatc agcagcggca acagcaacat ctactacgtg   240
gacaccgtga agggcagatt caccatctcc agagacaacc ccaagaatac cctgttcctg   300
cagatgacca gcctgcggag cgaggatacc gccatgtact actgcgcccg gaaagagcc    360 tacggcgact acagcggctt tagcatggat tactggggcc agggcaccag cgtgacagtg   420
tctagcgcct ctacaaaggg ccctagcgtg ttccctctgg ctccttgtag cagaagcacc   480
agcgagtcta cagccgctct gggctgtctg gtcaaggact ctttcccga gcctgtgacc    540 gtgtcctgga attctggcgc tctgacaagc ggcgtgcaca cctttccagc tgtgctgcaa    600
agcagcggcc tgtactctct gagcagcgtg gtcacagtgc ctagctctag cctgggcacc   660
aagacctaca cctgtaatgt ggaccacaag cctagcaaca ccaaggtgga caagcgcgtg   720
gaatctaagt acggccctcc ttgtcctcca tgtcctgctc cagagtttct cggcggaccc   780
tccgtgttcc tgtttcctcc aaagcctaag gacaccctga tgatcagcag aacccctgaa   840
gtgacctgcg tggtggtgga cgtttcccaa gaggaccctg aggtgcagtt caattggtac    900
gtggacggcg tggaagtgca caacgccaag accaagccta gaggaacag ttcaacagc     960 acctacagag tggtgtccgt gctgaccgtg ctgcaccagg attggctgaa cggcaaagag   1020
tacaagtgca aggtgtccaa caagggcctg cctagcagca tcgagaaaac catcagcaag   1080
gccaagggcc agccaagaga accccaggtg tacacactgc ctccaagcca agaggaaatg    1140
accaagaacc aggtgtccct gacctgcctg gttaagggct ctaccctc cgatatcgcc     1200 gtggaatggg agagcaatgg ccagcctgag aacaactaca agaccacacc acctgtgctg   1260
gacagcgacg gctcattctt cctgtacagc agactgaccg tggacaagag cagatggcaa   1320
gagggcaacg tgttcagctg cagcgtgatg cacgaggccc tgcacaacca ctacacccag   1380
aagtctctga gcctgtctct gggcaag                                      1407

<210> SEQ ID NO 58
<211> LENGTH: 1389
<212> TYPE: DNA
<213> ORGANISM: Artificial Sequence
<220> FEATURE:
<223> OTHER INFORMATION: cDNA sequence coding for chimeric mouse VH 48H6
      and human constant heavy IgG4 chain

<400> SEQUENCE: 58
```

| | |
|---|---|
| atggagctgg gcctgagctg gattttctg ctggccatcc tgaagggcgt gcagtgcgaa | 60 |
| gtgaagctgg tggaatctgg cggcggactg gttaagcctg gcggatctct gaagctgagc | 120 |
| tgtgccgcca gcggctttac ctttagcggc tacgccatga gctgggtccg acagacaccc | 180 |
| gagaagagac tggaatgggt cgccagcatc agcagcggcg gcagcacata ttaccccgac | 240 |
| tctgtgaagg gccgctttac aatccccaga gatgacgccc ggaacatcct gtacctgcag | 300 |
| atgagcagcc tgcggagcga ggataccgcc atctactatt gtgccagagg cggccacggc | 360 |
| agcagctatg tttattgggg ccagggcacc acactgaccg tgtctagcgc tctacaaag | 420 |
| ggccctagcg tgttccctct ggctccttgt agcagaagca ccagcgagtc tacagccgct | 480 |
| ctgggctgtc tggtcaagga ctactttccc gagcctgtga cagtgtcctg gaactctggc | 540 |
| gctctgacaa gcggcgtgca cacatttcca gccgtgctgc aaagcagcgg cctgtactct | 600 |
| ctgagcagcg tggtcacagt gcctagctct agcctgggca ccaagaccta cacctgtaat | 660 |
| gtggaccaca gcctagcaa caccaaggtg gacaagcgcg tggaatctaa gtacggccct | 720 |
| ccttgtcctc catgtcctgc acctgagttt ctcggcggac cctccgtgtt cctgtttcct | 780 |
| ccaaagccta aggacaccct gatgatcagc agaacccctg aagtgacctg cgtggtggtg | 840 |
| gacgtttccc aagaggaccc tgaggtgcag ttcaattggt acgtgacgg cgtggaagtg | 900 |
| cacaacgcca agaccaagcc tagagaggaa cagttcaaca gcacctacag agtggtgtcc | 960 |
| gtgctgacag tgctgcacca ggattggctg aacggcaaa agtacaagtg caaggtgtcc | 1020 |
| aacaagggcc tgcctagcag catcgagaaa accatcagca aggccaaggg ccagccaaga | 1080 |
| gaacccagg tgtacacact gcctccaagc caagaggaaa tgaccaagaa ccaggtgtcc | 1140 |
| ctgacctgcc tcgtgaaggg cttctaccct tccgatatcg ccgtggaatg ggagagcaat | 1200 |
| ggccagcctg agaacaacta caagacaacc cctcctgtgc tggacagcga cggctcattc | 1260 |
| ttcctgtaca gcaggctgac cgtggacaag agcagatggc aagagggcaa cgtgttcagc | 1320 |
| tgcagcgtga tgcacgaggc cctgcacaac cactacaccc agaagtctct gagcctgtct | 1380 |
| ctgggcaag | 1389 |

<210> SEQ ID NO 59
<211> LENGTH: 1404
<212> TYPE: DNA
<213> ORGANISM: Artificial Sequence
<220> FEATURE:
<223> OTHER INFORMATION: cDNA sequence coding for chimeric mouse VH 11H7 and human constant heavy IgG4 chain

<400> SEQUENCE: 59

| | |
|---|---|
| atggagctgg gcctgagctg gattttctg ctggccatcc tgaagggcgt gcagtgtcag | 60 |
| gtgcagctga agcagtctgg acctggactg gtgcagccta ccagagcct gagcatcacc | 120 |
| tgtaccgtgt ccggcttcag cctgaccatc tatggcgtgc actgggtccg acagagccct | 180 |
| ggcaaaggac tggaatggct gggagtgatt tggagcggcg gcagcaccga ttacaacgcc | 240 |
| gcctttatca gcagactgag catctccaag gacaacagca gagccaggt gttcttcaag | 300 |
| atgaactccc tgcaggccaa cgacaccgcc atctactact gcgccagaag agactacggc | 360 |
| agccggtcct ctactacgc tatggactat tggggcagg gcaccagcgt gacagtgtct | 420 |
| agcgcctcta caagggccc tagcgtgttc cctctggctc cttgtagcag aagcaccagc | 480 |
| gagtctacag ccgctctggg ctgtctggtc aaggactact ttcccgagcc agtgaccgtg | 540 |
| tcctggaatt ctggcgctct gacaagcggc gtgcacacct ttcagctgt gctgcaaagc | 600 |

| | |
|---|---|
| agcggcctgt actctctgag cagcgtggtc acagtgccta gctctagcct gggcaccaag | 660 |
| acctacacct gtaatgtgga ccacaagcct agcaacacca aggtggacaa gcgcgtggaa | 720 |
| tctaagtacg gccctccttg tcctccatgt cctgctccag agtttctcgg cggaccctcc | 780 |
| gtgttcctgt ttcctccaaa gcctaaggac ccctgatga tcagcagaac ccctgaagtg | 840 |
| acctgcgtgg tggtggacgt tcccaagag gaccctgagg tgcagttcaa ttggtacgtg | 900 |
| gacggcgtgg aagtgcacaa cgccaagacc aagcctagag gaacagtt caacagcacc | 960 |
| tacagagtgg tgtccgtgct gaccgtgctg catcaggatt ggctgaacgg caaagagtac | 1020 |
| aagtgcaagg tgtccaacaa gggcctgcct agcagcatcg agaaaaccat cagcaaggcc | 1080 |
| aagggccagc caagagaacc ccaggtgtac acactgcctc caagccaaga ggaaatgacc | 1140 |
| aagaatcagg tgtccctgac ctgcctcgtg aagggcttct acccttccga tatcgccgtg | 1200 |
| gaatgggaga gcaatggcca gcctgagaac aactacaaga caacccctcc tgtgctggac | 1260 |
| agcgacggct cattcttcct gtactccaga ctgaccgtgg acaagagcag atggcaagag | 1320 |
| ggcaacgtgt tcagctgctc cgtgatgcac gaggccctgc acaaccacta cacccagaag | 1380 |
| tccctgagcc tgtctctggg caaa | 1404 |

<210> SEQ ID NO 60
<211> LENGTH: 1377
<212> TYPE: DNA
<213> ORGANISM: Artificial Sequence
<220> FEATURE:
<223> OTHER INFORMATION: cDNA sequence coding for chimeric mouse VH 49G4 and human constant heavy IgG4 chain

<400> SEQUENCE: 60

| | |
|---|---|
| atggagctgg gcctgagctg gattttctg ctggccatcc tgaagggcgt gcagtgcgaa | 60 |
| gttcagctgc agcagtctgg cgccgagctt gtgaaacctg gcgcctctgt gaagctgagc | 120 |
| tgtagagcca gcggcttcaa catcaaggac acctacatgc actgggtcaa gcagaggcct | 180 |
| gagcagggcc tcgaatggat cggcagaatc gatcccgcca gaggcaacac caaatacgac | 240 |
| cccaagttcc agggcaaagc caccatcacc gccgacacct ctagcaacac agcctacctg | 300 |
| cagctgtcca gcctgacctc tgaagatacc gccgtgtact actgcgccag cgctatggat | 360 |
| tattggggcc agggcacaag cgtgaccgtg tctagcgcct ctacaaaggg ccctagcgtg | 420 |
| ttcccactgg ctcccgtgag cagaagcacc agcgaatcta gccgctctct gggctgcctg | 480 |
| gtcaaggact actttcctga gcctgtgaca gtgtcctgga actctggcgc tctgacaagc | 540 |
| ggcgtgcaca catttccagc cgtgctgcaa agcagcggcc tgtactctct gagcagcgtg | 600 |
| gtcacagtgc ctagctctag cctgggcacc aagacctaca cctgtaatgt ggaccacaag | 660 |
| ccttccaaca ccaaggtgga caagcgcgtg aatctaagt acggcccctc ttgtcctcca | 720 |
| tgtcctgcac ctgagtttct cggcggaccc tccgtgttcc tgtttcctcc aaagcctaag | 780 |
| gacacccctga tgatcagcag aacccctgaa gtgacctgcg tggtggtgga cgtttcccaa | 840 |
| gaggaccctg aggtgcagtt caattggtac gtggacggcg tggaagtgca acgccaag | 900 |
| accaagccta gagaggaaca gttcaacagc acctacagag tggtgtccgt gctgacagtg | 960 |
| ctgcaccagg attggctgaa cggcaaagag tacaagtgca aggtgtccaa caagggcctg | 1020 |
| cctagcagca tcgagaaaac catcagcaag gccaagggcc agccaagaga accccaggtg | 1080 |
| tacacactgc ctccaagcca agaggaaatg accaagaacc aggtgtccct gacctgcctc | 1140 |
| gtgaagggct tctacccttc cgatatcgcc gtggaatggg agagcaatgg ccagcctgag | 1200 |

| | |
|---|---|
| aacaactaca agacaacccc tcctgtgctg gactccgacg gctcattctt cctgtacagc | 1260 |
| agactgaccg tggacaagag cagatggcaa gagggcaacg tgttctcctg cagcgtgatg | 1320 |
| cacgaagccc tgcacaacca ctacacccag aagtctctgt ccctgtctct gggcaag | 1377 |

<210> SEQ ID NO 61
<211> LENGTH: 723
<212> TYPE: DNA
<213> ORGANISM: Artificial Sequence
<220> FEATURE:
<223> OTHER INFORMATION: cDNA sequence coding for chimeric mouse VL
      36H12 and human constant light kappa chain

<400> SEQUENCE: 61

| | |
|---|---|
| atggacatga gagttcccgc tcagctgctg ggactgctgc tgctttggtt tcctggcgct | 60 |
| agatgcgacg tgctgatgac ccagacacct ctgagcctgc ctgtgtctct gggagatcag | 120 |
| gccagcatca gctgcagatc cagccagagc atcgtgcaca gcaacggcat cacctacctg | 180 |
| gaatggtatc tgcagaagcc cggacagagc cccaagctgc tgatctacaa ggtgtccaac | 240 |
| cggttcagcg gcgtgcccga tagatttcct ggcagcggct ctggcaccga cttcaccctg | 300 |
| aagatctcca gagtggaagc cgaggacctg ggcgtgtact actgcttcca aggctctcac | 360 |
| gtgcccctga catttggagc cggcaccaag ctggaactga gagaacagt ggccgctcct | 420 |
| agcgtgttca tcttcccacc ttccgacgag cagctgaaaa gcggcacagc tctgtcgtg | 480 |
| tgcctgctga caacttcta ccccagagaa gccaaggtgc agtggaaggt ggacaacgcc | 540 |
| ctgcagagcg gcaatagcca agagagcgtg accgagcagg acagcaagga ctctacctac | 600 |
| agcctgagca gcaccctgac actgagcaag gccgactacg agaagcacaa agtgtacgcc | 660 |
| tgcgaagtga cccaccaggg cctttctagc cctgtgacca gagcttcaa ccggggcgaa | 720 |
| tgt | 723 |

<210> SEQ ID NO 62
<211> LENGTH: 708
<212> TYPE: DNA
<213> ORGANISM: Artificial Sequence
<220> FEATURE:
<223> OTHER INFORMATION: cDNA sequence coding for chimeric mouse VL 45H6
      and human constant light kappa chain

<400> SEQUENCE: 62

| | |
|---|---|
| atggacatga gagttcccgc tcagctgctg ggactgctgc tgctttggtt tcctggcgct | 60 |
| agatgcgaca tcgtgatgac ccagagccag aaattcatga gcaccagcgt gggcgacaga | 120 |
| gtgtccgtga catgtaaagc cagccagaac gtggacacca acgtggcctg gtatcagcag | 180 |
| aagcctggac agagcccaa ggctctgatc tacagcgcca gctacagata cagcggcgtg | 240 |
| cccgatagat tcacaggcag cggctctggc accgacttca ccctgacaat cagcaacgtg | 300 |
| cagagcgagg acctggccga gtatttctgc cagcagtaca acaagttccc tctgaccttc | 360 |
| ggcggaggca ccaagctgga aatcaagaga acagtggccg ctcctagcgt gttcatcttc | 420 |
| ccaccttccg acgagcagct gaaaagcggc acagcctctg tcgtgtgcct gctgaacaac | 480 |
| ttctacccca gagaagccaa ggtgcagtgg aaggtggaca cgccctgca gagcggcaat | 540 |
| agccaagaga gcgtgaccga gcaggacagc aaggactcta cctacagcct gagcagcaca | 600 |
| ctgaccctga gcaaggccga ctacgagaag cacaaagtgt acgcctgcga agtgacccac | 660 |
| cagggccttt ctagccctgt gaccaagagc ttcaaccggg gcgaatgt | 708 |

```
<210> SEQ ID NO 63
<211> LENGTH: 726
<212> TYPE: DNA
<213> ORGANISM: Artificial Sequence
<220> FEATURE:
<223> OTHER INFORMATION: cDNA sequence coding for chimeric mouse VL 48H6
      and human constant light kappa chain

<400> SEQUENCE: 63
atggacatga gagttcccgc tcagctgctg ggactgctgc tgctttggtt tcctggcgct    60
agatgcgaca tcgtgatgtc tcagagccct agcagcctgg ccgtgtctgt gggagagaaa   120
gtgaccatga gctgcaagag cagccagagc ctgctgtact ccagcaacca agaagaactac  180 ctggcctggt atcagcagaa gcccggacag tctcccaagc tgctgatcta ctgggccagc   240
accagagaaa gcggcgtgcc cgatagattc acaggcagcg gcagcggaac cgacttcacc   300
ctgacaatca gcagcgtgaa ggccgaggac ctggctgtgt actactgcca ccagtattac   360
agctaccctc tgaccttcgg agccggcacc aagctggaac tgaacagaac agtggccgct   420
cctagcgtgt tcatcttccc accttccgac gagcagctga agtctggcac agcctctgtc   480
gtgtgcctgc tgaacaactt ctaccccaga gaagccaagg tgcagtggaa ggtggacaac   540
gccctgcaga gcggcaatag ccaagagagc gtgaccgagc aggacagcaa ggactctacc   600
tacagcctga gcagcacact gaccctgagc aaggccgact acgagaagca caaagtgtac   660
gcctgcgaag tgacccacca gggcctttct agccctgtga ccaagagctt caaccggggc   720
gaatgt                                                              726

<210> SEQ ID NO 64
<211> LENGTH: 711
<212> TYPE: DNA
<213> ORGANISM: Artificial Sequence
<220> FEATURE:
<223> OTHER INFORMATION: cDNA sequence coding for chimeric mouse VL 11H7
      and human constant light kappa chain

<400> SEQUENCE: 64
atggacatga gagttcccgc tcagctgctg ggactgctgc tgctttggtt tcctggcgct    60
agatgcgaga tcgtgctgac acagagccct gctctgatgg ctgcttcccc tggcgagaaa   120
gtgaccatca cctgtagcgt gtccagcagc atcagcagct ccaacctgca ctggtatcag   180
cagaagtccg agacaagccc caagccttgg atctacggca ccagcaatct ggccagcgga   240
gtgcctgtca gattttctgg cagcggctct ggcaccagct acagcctgac aatcagcagc   300
atggaagccg aggatgccgc cacctactac tgccagcagt ggtctagcta ccctctgacc   360
tttggcggag gcaccaagct ggaaatcaag cggacagtgg ccgctcctag cgtgttcatc   420
tttccaccta gcgacgagca gctgaagtct ggcacagcct ctgtcgtgtg cctgctgaac   480
aacttctacc ccagagaagc caaggtgcag tggaaggtgg acaacgccct gcagagcggc   540
aatagccaag agagcgtgac cgagcaggac agcaaggact ccacctatag cctgagcagc   600
accctgacac tgagcaaggc cgactacgag aagcacaaag tgtacgcctg cgaagtgacc   660
caccagggcc tttctagccc tgtgaccaag agcttcaacc ggggcgaatg t             711

<210> SEQ ID NO 65
<211> LENGTH: 723
<212> TYPE: DNA
<213> ORGANISM: Artificial Sequence
<220> FEATURE:
<223> OTHER INFORMATION: cDNA sequence coding for chimeric mouse VL and
      49G4 human constant light kappa chain
```

<400> SEQUENCE: 65

```
atggacatga gagttcccgc tcagctgctg ggactgctgc tgctttggtt tcctggcgct      60
agatgcgacg tgctgatgac ccagacacct ctgagcctgc ctgtgtctct gggagatcag     120
gccagcatca gctgcagatc cagccagagc atcgtgcaca gcaacggcaa tacctacctg     180
gaatggttcc tgcagaagcc cggacagagc cccaagctgc tgatctacaa ggtgtccaac     240
cggttcagcg gcgtgcccga tagattttct ggcagcggct ctggcaccga cttcaccctg     300
aagatctcca gagtggaagc cgaggacctg ggcgtgtact actgcttcca aggctctcac     360
gtgcccctga catttggagc cggcaccaag ctggaactga agagaacagt ggccgctcct     420
agcgtgttca tcttcccacc ttccgacgag cagctgaaaa gcggcacagc ctctgtcgtg     480
tgcctgctga caacttcta ccccagagaa gccaaggtgc agtggaaggt ggacaacgcc     540
ctgcagagcg gcaatagcca agagagcgtg accgagcagg acagcaagga ctctacctac     600
agcctgagca gcaccctgac actgagcaag gccgactacg agaagcacaa agtgtacgcc     660
tgcgaagtga cccaccaggg cctttctagc cctgtgacca gagcttcaa ccggggcgaa      720
tgt                                                                   723
```

<210> SEQ ID NO 66
<211> LENGTH: 465
<212> TYPE: PRT
<213> ORGANISM: Artificial Sequence
<220> FEATURE:
<223> OTHER INFORMATION: Amino acid sequence of chimeric mouse VH 36H12 and human constant heavy IgG4 chain

<400> SEQUENCE: 66

```
Met Glu Leu Gly Leu Ser Trp Ile Phe Leu Leu Ala Ile Leu Lys Gly
1               5                   10                  15
Val Gln Cys Glu Val Gln Leu Gln Gln Ser Gly Ala Gly Leu Val Lys
            20                  25                  30
Pro Gly Ala Ser Val Lys Leu Ser Cys Thr Ala Ser Gly Phe Asn Ile
        35                  40                  45
Lys Asp Thr Tyr Met His Trp Val Arg Gln Arg Pro Glu Gln Gly Leu
    50                  55                  60
Glu Trp Ile Gly Arg Ile Asp Pro Ala Thr Ala Asn Thr Lys Tyr Asp
65                  70                  75                  80
Pro Lys Phe Gln Gly Lys Ala Thr Leu Thr Thr Asp Thr Ser Ser Asn
                85                  90                  95
Thr Ala Tyr Leu Gln Leu Ser Ser Leu Thr Ser Glu Asp Thr Ala Val
            100                 105                 110
Tyr Tyr Cys Val Thr Tyr Gly Tyr Asp Val Ser Trp Phe Ala Tyr Trp
        115                 120                 125
Gly Leu Gly Ala Leu Val Thr Val Ser Ala Ala Ser Thr Lys Gly Pro
    130                 135                 140
Ser Val Phe Pro Leu Ala Pro Cys Ser Arg Ser Thr Ser Glu Ser Thr
145                 150                 155                 160
Ala Ala Leu Gly Cys Leu Val Lys Asp Tyr Phe Pro Glu Pro Val Thr
                165                 170                 175
Val Ser Trp Asn Ser Gly Ala Leu Thr Ser Gly Val His Thr Phe Pro
            180                 185                 190
Ala Val Leu Gln Ser Ser Gly Leu Tyr Ser Leu Ser Ser Val Val Thr
        195                 200                 205
```

Val Pro Ser Ser Leu Gly Thr Lys Thr Tyr Thr Cys Asn Val Asp
    210                 215                 220
His Lys Pro Ser Asn Thr Lys Val Asp Lys Arg Val Glu Ser Lys Tyr
225                 230                 235                 240
Gly Pro Pro Cys Pro Pro Cys Pro Ala Pro Glu Phe Leu Gly Gly Pro
                245                 250                 255
Ser Val Phe Leu Phe Pro Pro Lys Pro Lys Asp Thr Leu Met Ile Ser
            260                 265                 270
Arg Thr Pro Glu Val Thr Cys Val Val Val Asp Val Ser Gln Glu Asp
        275                 280                 285
Pro Glu Val Gln Phe Asn Trp Tyr Val Asp Gly Val Glu Val His Asn
    290                 295                 300
Ala Lys Thr Lys Pro Arg Glu Glu Gln Phe Asn Ser Thr Tyr Arg Val
305                 310                 315                 320
Val Ser Val Leu Thr Val Leu His Gln Asp Trp Leu Asn Gly Lys Glu
                325                 330                 335
Tyr Lys Cys Lys Val Ser Asn Lys Gly Leu Pro Ser Ser Ile Glu Lys
            340                 345                 350
Thr Ile Ser Lys Ala Lys Gly Gln Pro Arg Glu Pro Gln Val Tyr Thr
        355                 360                 365
Leu Pro Pro Ser Gln Glu Glu Met Thr Lys Asn Gln Val Ser Leu Thr
    370                 375                 380
Cys Leu Val Lys Gly Phe Tyr Pro Ser Asp Ile Ala Val Glu Trp Glu
385                 390                 395                 400
Ser Asn Gly Gln Pro Glu Asn Asn Tyr Lys Thr Thr Pro Pro Val Leu
                405                 410                 415
Asp Ser Asp Gly Ser Phe Phe Leu Tyr Ser Arg Leu Thr Val Asp Lys
            420                 425                 430
Ser Arg Trp Gln Glu Gly Asn Val Phe Ser Cys Ser Val Met His Glu
        435                 440                 445
Ala Leu His Asn His Tyr Thr Gln Lys Ser Leu Ser Leu Ser Leu Gly
    450                 455                 460
Lys
465

<210> SEQ ID NO 67
<211> LENGTH: 469
<212> TYPE: PRT
<213> ORGANISM: Artificial Sequence
<220> FEATURE:
<223> OTHER INFORMATION: Amino acid sequence of chimeric mouse VH 45H6
      and human constant heavy IgG4 chain

<400> SEQUENCE: 67

Met Glu Leu Gly Leu Ser Trp Ile Phe Leu Leu Ala Ile Leu Lys Gly
1               5                   10                  15
Val Gln Cys Asp Val Gln Leu Val Glu Ser Gly Gly Gly Leu Val Gln
            20                  25                  30
Pro Gly Gly Ser Arg Lys Leu Ser Cys Ala Ala Ser Gly Phe Thr Phe
        35                  40                  45
Ser Ser Phe Gly Met His Trp Val Arg Gln Ala Pro Glu Lys Gly Leu
    50                  55                  60
Glu Trp Val Ala Tyr Ile Ser Ser Gly Asn Ser Asn Ile Tyr Tyr Val
65                  70                  75                  80
Asp Thr Val Lys Gly Arg Phe Thr Ile Ser Arg Asp Asn Pro Lys Asn
            85                  90                  95

Thr Leu Phe Leu Gln Met Thr Ser Leu Arg Ser Glu Asp Thr Ala Met
            100                 105                 110

Tyr Tyr Cys Ala Arg Lys Arg Ala Tyr Gly Asp Tyr Ser Gly Phe Ser
            115                 120                 125

Met Asp Tyr Trp Gly Gln Gly Thr Ser Val Thr Val Ser Ser Ala Ser
    130                 135                 140

Thr Lys Gly Pro Ser Val Phe Pro Leu Ala Pro Cys Ser Arg Ser Thr
145                 150                 155                 160

Ser Glu Ser Thr Ala Ala Leu Gly Cys Leu Val Lys Asp Tyr Phe Pro
                165                 170                 175

Glu Pro Val Thr Val Ser Trp Asn Ser Gly Ala Leu Thr Ser Gly Val
            180                 185                 190

His Thr Phe Pro Ala Val Leu Gln Ser Ser Gly Leu Tyr Ser Leu Ser
        195                 200                 205

Ser Val Val Thr Val Pro Ser Ser Ser Leu Gly Thr Lys Thr Tyr Thr
    210                 215                 220

Cys Asn Val Asp His Lys Pro Ser Asn Thr Lys Val Asp Lys Arg Val
225                 230                 235                 240

Glu Ser Lys Tyr Gly Pro Pro Cys Pro Pro Cys Pro Ala Pro Glu Phe
                245                 250                 255

Leu Gly Gly Pro Ser Val Phe Leu Phe Pro Pro Lys Pro Lys Asp Thr
            260                 265                 270

Leu Met Ile Ser Arg Thr Pro Glu Val Thr Cys Val Val Val Asp Val
        275                 280                 285

Ser Gln Glu Asp Pro Glu Val Gln Phe Asn Trp Tyr Val Asp Gly Val
    290                 295                 300

Glu Val His Asn Ala Lys Thr Lys Pro Arg Glu Glu Gln Phe Asn Ser
305                 310                 315                 320

Thr Tyr Arg Val Val Ser Val Leu Thr Val Leu His Gln Asp Trp Leu
                325                 330                 335

Asn Gly Lys Glu Tyr Lys Cys Lys Val Ser Asn Lys Gly Leu Pro Ser
            340                 345                 350

Ser Ile Glu Lys Thr Ile Ser Lys Ala Lys Gly Gln Pro Arg Glu Pro
        355                 360                 365

Gln Val Tyr Thr Leu Pro Pro Ser Gln Glu Glu Met Thr Lys Asn Gln
    370                 375                 380

Val Ser Leu Thr Cys Leu Val Lys Gly Phe Tyr Pro Ser Asp Ile Ala
385                 390                 395                 400

Val Glu Trp Glu Ser Asn Gly Gln Pro Glu Asn Asn Tyr Lys Thr Thr
                405                 410                 415

Pro Pro Val Leu Asp Ser Asp Gly Ser Phe Phe Leu Tyr Ser Arg Leu
            420                 425                 430

Thr Val Asp Lys Ser Arg Trp Gln Glu Gly Asn Val Phe Ser Cys Ser
        435                 440                 445

Val Met His Glu Ala Leu His Asn His Tyr Thr Gln Lys Ser Leu Ser
    450                 455                 460

Leu Ser Leu Gly Lys
465

<210> SEQ ID NO 68
<211> LENGTH: 463
<212> TYPE: PRT
<213> ORGANISM: Artificial Sequence
<220> FEATURE:

<223> OTHER INFORMATION: Amino acid sequence of chimeric mouse VH 48H6 and human constant heavy IgG4 chain

<400> SEQUENCE: 68

```
Met Glu Leu Gly Leu Ser Trp Ile Phe Leu Leu Ala Ile Leu Lys Gly
1               5                   10                  15

Val Gln Cys Glu Val Lys Leu Val Glu Ser Gly Gly Gly Leu Val Lys
            20                  25                  30

Pro Gly Gly Ser Leu Lys Leu Ser Cys Ala Ala Ser Gly Phe Thr Phe
        35                  40                  45

Ser Gly Tyr Ala Met Ser Trp Val Arg Gln Thr Pro Glu Lys Arg Leu
    50                  55                  60

Glu Trp Val Ala Ser Ile Ser Ser Gly Gly Ser Thr Tyr Tyr Pro Asp
65                  70                  75                  80

Ser Val Lys Gly Arg Phe Thr Ile Pro Arg Asp Asp Ala Arg Asn Ile
                85                  90                  95

Leu Tyr Leu Gln Met Ser Ser Leu Arg Ser Glu Asp Thr Ala Ile Tyr
            100                 105                 110

Tyr Cys Ala Arg Gly Gly His Gly Ser Ser Tyr Val Tyr Trp Gly Gln
        115                 120                 125

Gly Thr Thr Leu Thr Val Ser Ser Ala Ser Thr Lys Gly Pro Ser Val
    130                 135                 140

Phe Pro Leu Ala Pro Cys Ser Arg Ser Thr Ser Glu Ser Thr Ala Ala
145                 150                 155                 160

Leu Gly Cys Leu Val Lys Asp Tyr Phe Pro Glu Pro Val Thr Val Ser
                165                 170                 175

Trp Asn Ser Gly Ala Leu Thr Ser Gly Val His Thr Phe Pro Ala Val
            180                 185                 190

Leu Gln Ser Ser Gly Leu Tyr Ser Leu Ser Ser Val Val Thr Val Pro
        195                 200                 205

Ser Ser Ser Leu Gly Thr Lys Thr Tyr Thr Cys Asn Val Asp His Lys
    210                 215                 220

Pro Ser Asn Thr Lys Val Asp Lys Arg Val Glu Ser Lys Tyr Gly Pro
225                 230                 235                 240

Pro Cys Pro Pro Cys Pro Ala Pro Glu Phe Leu Gly Gly Pro Ser Val
                245                 250                 255

Phe Leu Phe Pro Pro Lys Pro Lys Asp Thr Leu Met Ile Ser Arg Thr
            260                 265                 270

Pro Glu Val Thr Cys Val Val Val Asp Val Ser Gln Glu Asp Pro Glu
        275                 280                 285

Val Gln Phe Asn Trp Tyr Val Asp Gly Val Glu Val His Asn Ala Lys
    290                 295                 300

Thr Lys Pro Arg Glu Glu Gln Phe Asn Ser Thr Tyr Arg Val Val Ser
305                 310                 315                 320

Val Leu Thr Val Leu His Gln Asp Trp Leu Asn Gly Lys Glu Tyr Lys
                325                 330                 335

Cys Lys Val Ser Asn Lys Gly Leu Pro Ser Ser Ile Glu Lys Thr Ile
            340                 345                 350

Ser Lys Ala Lys Gly Gln Pro Arg Glu Pro Gln Val Tyr Thr Leu Pro
        355                 360                 365

Pro Ser Gln Glu Glu Met Thr Lys Asn Gln Val Ser Leu Thr Cys Leu
    370                 375                 380

Val Lys Gly Phe Tyr Pro Ser Asp Ile Ala Val Glu Trp Glu Ser Asn
385                 390                 395                 400
```

-continued

```
Gly Gln Pro Glu Asn Asn Tyr Lys Thr Thr Pro Pro Val Leu Asp Ser
            405                 410                 415

Asp Gly Ser Phe Phe Leu Tyr Ser Arg Leu Thr Val Asp Lys Ser Arg
            420                 425                 430

Trp Gln Glu Gly Asn Val Phe Ser Cys Ser Val Met His Glu Ala Leu
            435                 440                 445

His Asn His Tyr Thr Gln Lys Ser Leu Ser Leu Ser Leu Gly Lys
    450                 455                 460

<210> SEQ ID NO 69
<211> LENGTH: 468
<212> TYPE: PRT
<213> ORGANISM: Artificial Sequence
<220> FEATURE:
<223> OTHER INFORMATION: Amino acid sequence of chimeric mouse VH 11H7
      and human constant heavy IgG4 chain

<400> SEQUENCE: 69

Met Glu Leu Gly Leu Ser Trp Ile Phe Leu Leu Ala Ile Leu Lys Gly
1               5                   10                  15

Val Gln Cys Gln Val Gln Leu Lys Gln Ser Gly Pro Gly Leu Val Gln
            20                  25                  30

Pro Ser Gln Ser Leu Ser Ile Thr Cys Thr Val Ser Gly Phe Ser Leu
        35                  40                  45

Thr Ile Tyr Gly Val His Trp Val Arg Gln Ser Pro Gly Lys Gly Leu
    50                  55                  60

Glu Trp Leu Gly Val Ile Trp Ser Gly Gly Ser Thr Asp Tyr Asn Ala
65              70                  75                  80

Ala Phe Ile Ser Arg Leu Ser Ile Ser Lys Asp Asn Ser Lys Ser Gln
                85                  90                  95

Val Phe Phe Lys Met Asn Ser Leu Gln Ala Asn Asp Thr Ala Ile Tyr
            100                 105                 110

Tyr Cys Ala Arg Arg Asp Tyr Gly Ser Arg Ser Phe Tyr Tyr Ala Met
        115                 120                 125

Asp Tyr Trp Gly Gln Gly Thr Ser Val Thr Val Ser Ser Ala Ser Thr
    130                 135                 140

Lys Gly Pro Ser Val Phe Pro Leu Ala Pro Cys Ser Arg Ser Thr Ser
145                 150                 155                 160

Glu Ser Thr Ala Ala Leu Gly Cys Leu Val Lys Asp Tyr Phe Pro Glu
                165                 170                 175

Pro Val Thr Val Ser Trp Asn Ser Gly Ala Leu Thr Ser Gly Val His
            180                 185                 190

Thr Phe Pro Ala Val Leu Gln Ser Ser Gly Leu Tyr Ser Leu Ser Ser
        195                 200                 205

Val Val Thr Val Pro Ser Ser Ser Leu Gly Thr Lys Thr Tyr Thr Cys
    210                 215                 220

Asn Val Asp His Lys Pro Ser Asn Thr Lys Val Asp Lys Arg Val Glu
225                 230                 235                 240

Ser Lys Tyr Gly Pro Pro Cys Pro Pro Cys Pro Ala Pro Glu Phe Leu
                245                 250                 255

Gly Gly Pro Ser Val Phe Leu Phe Pro Pro Lys Pro Lys Asp Thr Leu
            260                 265                 270

Met Ile Ser Arg Thr Pro Glu Val Thr Cys Val Val Val Asp Val Ser
        275                 280                 285

Gln Glu Asp Pro Glu Val Gln Phe Asn Trp Tyr Val Asp Gly Val Glu
```

```
                290                 295                 300
Val His Asn Ala Lys Thr Lys Pro Arg Glu Glu Gln Phe Asn Ser Thr
305                 310                 315                 320

Tyr Arg Val Val Ser Val Leu Thr Val Leu His Gln Asp Trp Leu Asn
                325                 330                 335

Gly Lys Glu Tyr Lys Cys Lys Val Ser Asn Lys Gly Leu Pro Ser Ser
                340                 345                 350

Ile Glu Lys Thr Ile Ser Lys Ala Lys Gly Gln Pro Arg Glu Pro Gln
                355                 360                 365

Val Tyr Thr Leu Pro Pro Ser Gln Glu Glu Met Thr Lys Asn Gln Val
            370                 375                 380

Ser Leu Thr Cys Leu Val Lys Gly Phe Tyr Pro Ser Asp Ile Ala Val
385                 390                 395                 400

Glu Trp Glu Ser Asn Gly Gln Pro Glu Asn Asn Tyr Lys Thr Thr Pro
                405                 410                 415

Pro Val Leu Asp Ser Asp Gly Ser Phe Phe Leu Tyr Ser Arg Leu Thr
                420                 425                 430

Val Asp Lys Ser Arg Trp Gln Glu Gly Asn Val Phe Ser Cys Ser Val
            435                 440                 445

Met His Glu Ala Leu His Asn His Tyr Thr Gln Lys Ser Leu Ser Leu
            450                 455                 460

Ser Leu Gly Lys
465

<210> SEQ ID NO 70
<211> LENGTH: 459
<212> TYPE: PRT
<213> ORGANISM: Artificial Sequence
<220> FEATURE:
<223> OTHER INFORMATION: Amino acid sequence of chimeric mouse VH 49G4
      and human constant heavy IgG4 chain

<400> SEQUENCE: 70

Met Glu Leu Gly Leu Ser Trp Ile Phe Leu Leu Ala Ile Leu Lys Gly
1               5                   10                  15

Val Gln Cys Glu Val Gln Leu Gln Gln Ser Gly Ala Glu Leu Val Lys
            20                  25                  30

Pro Gly Ala Ser Val Lys Leu Ser Cys Arg Ala Ser Gly Phe Asn Ile
        35                  40                  45

Lys Asp Thr Tyr Met His Trp Val Lys Gln Arg Pro Glu Gln Gly Leu
    50                  55                  60

Glu Trp Ile Gly Arg Ile Asp Pro Ala Arg Gly Asn Thr Lys Tyr Asp
65                  70                  75                  80

Pro Lys Phe Gln Gly Lys Ala Thr Ile Thr Ala Asp Thr Ser Ser Asn
                85                  90                  95

Thr Ala Tyr Leu Gln Leu Ser Ser Leu Thr Ser Glu Asp Thr Ala Val
            100                 105                 110

Tyr Tyr Cys Ala Ser Ala Met Asp Tyr Trp Gly Gln Gly Thr Ser Val
        115                 120                 125

Thr Val Ser Ser Ala Ser Thr Lys Gly Pro Ser Val Phe Pro Leu Ala
    130                 135                 140

Pro Cys Ser Arg Ser Thr Ser Glu Ser Thr Ala Ala Leu Gly Cys Leu
145                 150                 155                 160

Val Lys Asp Tyr Phe Pro Glu Pro Val Thr Val Ser Trp Asn Ser Gly
                165                 170                 175
```

Ala Leu Thr Ser Gly Val His Thr Phe Pro Ala Val Leu Gln Ser Ser
            180                 185                 190

Gly Leu Tyr Ser Leu Ser Ser Val Val Thr Val Pro Ser Ser Ser Leu
        195                 200                 205

Gly Thr Lys Thr Tyr Thr Cys Asn Val Asp His Lys Pro Ser Asn Thr
    210                 215                 220

Lys Val Asp Lys Arg Val Glu Ser Lys Tyr Gly Pro Pro Cys Pro Pro
225                 230                 235                 240

Cys Pro Ala Pro Glu Phe Leu Gly Gly Pro Ser Val Phe Leu Phe Pro
                245                 250                 255

Pro Lys Pro Lys Asp Thr Leu Met Ile Ser Arg Thr Pro Glu Val Thr
            260                 265                 270

Cys Val Val Val Asp Val Ser Gln Glu Asp Pro Glu Val Gln Phe Asn
        275                 280                 285

Trp Tyr Val Asp Gly Val Glu Val His Asn Ala Lys Thr Lys Pro Arg
    290                 295                 300

Glu Glu Gln Phe Asn Ser Thr Tyr Arg Val Val Ser Val Leu Thr Val
305                 310                 315                 320

Leu His Gln Asp Trp Leu Asn Gly Lys Glu Tyr Lys Cys Lys Val Ser
                325                 330                 335

Asn Lys Gly Leu Pro Ser Ser Ile Glu Lys Thr Ile Ser Lys Ala Lys
            340                 345                 350

Gly Gln Pro Arg Glu Pro Gln Val Tyr Thr Leu Pro Pro Ser Gln Glu
        355                 360                 365

Glu Met Thr Lys Asn Gln Val Ser Leu Thr Cys Leu Val Lys Gly Phe
    370                 375                 380

Tyr Pro Ser Asp Ile Ala Val Glu Trp Glu Ser Asn Gly Gln Pro Glu
385                 390                 395                 400

Asn Asn Tyr Lys Thr Thr Pro Pro Val Leu Asp Ser Asp Gly Ser Phe
                405                 410                 415

Phe Leu Tyr Ser Arg Leu Thr Val Asp Lys Ser Arg Trp Gln Glu Gly
            420                 425                 430

Asn Val Phe Ser Cys Ser Val Met His Glu Ala Leu His Asn His Tyr
        435                 440                 445

Thr Gln Lys Ser Leu Ser Leu Ser Leu Gly Lys
    450                 455

<210> SEQ ID NO 71
<211> LENGTH: 241
<212> TYPE: PRT
<213> ORGANISM: Artificial Sequence
<220> FEATURE:
<223> OTHER INFORMATION: Amino acid sequence of chimeric mouse VL 36H12
      and human constant light kappa chain

<400> SEQUENCE: 71

Met Asp Met Arg Val Pro Ala Gln Leu Leu Gly Leu Leu Leu Leu Trp
1               5                   10                  15

Phe Pro Gly Ala Arg Cys Asp Val Leu Met Thr Gln Thr Pro Leu Ser
            20                  25                  30

Leu Pro Val Ser Leu Gly Asp Gln Ala Ser Ile Ser Cys Arg Ser Ser
        35                  40                  45

Gln Ser Ile Val His Ser Asn Gly Ile Thr Tyr Leu Glu Trp Tyr Leu
    50                  55                  60

Gln Lys Pro Gly Gln Ser Pro Lys Leu Leu Ile Tyr Lys Val Ser Asn
65                  70                  75                  80

-continued

```
Arg Phe Ser Gly Val Pro Asp Arg Phe Ser Gly Ser Gly Ser Gly Thr
                85                  90                  95

Asp Phe Thr Leu Lys Ile Ser Arg Val Glu Ala Glu Asp Leu Gly Val
            100                 105                 110

Tyr Tyr Cys Phe Gln Gly Ser His Val Pro Leu Thr Phe Gly Ala Gly
        115                 120                 125

Thr Lys Leu Glu Leu Lys Arg Thr Val Ala Ala Pro Ser Val Phe Ile
130                 135                 140

Phe Pro Pro Ser Asp Glu Gln Leu Lys Ser Gly Thr Ala Ser Val Val
145                 150                 155                 160

Cys Leu Leu Asn Asn Phe Tyr Pro Arg Glu Ala Lys Val Gln Trp Lys
                165                 170                 175

Val Asp Asn Ala Leu Gln Ser Gly Asn Ser Gln Glu Ser Val Thr Glu
            180                 185                 190

Gln Asp Ser Lys Asp Ser Thr Tyr Ser Leu Ser Ser Thr Leu Thr Leu
        195                 200                 205

Ser Lys Ala Asp Tyr Glu Lys His Lys Val Tyr Ala Cys Glu Val Thr
210                 215                 220

His Gln Gly Leu Ser Ser Pro Val Thr Lys Ser Phe Asn Arg Gly Glu
225                 230                 235                 240

Cys

<210> SEQ ID NO 72
<211> LENGTH: 236
<212> TYPE: PRT
<213> ORGANISM: Artificial Sequence
<220> FEATURE:
<223> OTHER INFORMATION: Amino acid sequence of chimeric mouse VL 45H6
      and human constant light kappa chain

<400> SEQUENCE: 72

Met Asp Met Arg Val Pro Ala Gln Leu Leu Gly Leu Leu Leu Leu Trp
1               5                   10                  15

Phe Pro Gly Ala Arg Cys Asp Ile Val Met Thr Gln Ser Gln Lys Phe
                20                  25                  30

Met Ser Thr Ser Val Gly Asp Arg Val Ser Val Thr Cys Lys Ala Ser
            35                  40                  45

Gln Asn Val Asp Thr Asn Val Ala Trp Tyr Gln Gln Lys Pro Gly Gln
        50                  55                  60

Ser Pro Lys Ala Leu Ile Tyr Ser Ala Ser Tyr Arg Tyr Ser Gly Val
65                  70                  75                  80

Pro Asp Arg Phe Thr Gly Ser Gly Ser Gly Thr Asp Phe Thr Leu Thr
                85                  90                  95

Ile Ser Asn Val Gln Ser Glu Asp Leu Ala Glu Tyr Phe Cys Gln Gln
            100                 105                 110

Tyr Asn Lys Phe Pro Leu Thr Phe Gly Gly Gly Thr Lys Leu Glu Ile
        115                 120                 125

Lys Arg Thr Val Ala Ala Pro Ser Val Phe Ile Phe Pro Pro Ser Asp
130                 135                 140

Glu Gln Leu Lys Ser Gly Thr Ala Ser Val Val Cys Leu Leu Asn Asn
145                 150                 155                 160

Phe Tyr Pro Arg Glu Ala Lys Val Gln Trp Lys Val Asp Asn Ala Leu
                165                 170                 175

Gln Ser Gly Asn Ser Gln Glu Ser Val Thr Glu Gln Asp Ser Lys Asp
            180                 185                 190
```

```
Ser Thr Tyr Ser Leu Ser Ser Thr Leu Thr Leu Ser Lys Ala Asp Tyr
        195                 200                 205

Glu Lys His Lys Val Tyr Ala Cys Glu Val Thr His Gln Gly Leu Ser
    210                 215                 220

Ser Pro Val Thr Lys Ser Phe Asn Arg Gly Glu Cys
225                 230                 235

<210> SEQ ID NO 73
<211> LENGTH: 242
<212> TYPE: PRT
<213> ORGANISM: Artificial Sequence
<220> FEATURE:
<223> OTHER INFORMATION: Amino acid sequence of chimeric mouse VL 48H6
      and human constant light kappa chain

<400> SEQUENCE: 73

Met Asp Met Arg Val Pro Ala Gln Leu Leu Gly Leu Leu Leu Leu Trp
1               5                   10                  15

Phe Pro Gly Ala Arg Cys Asp Ile Val Met Ser Gln Ser Pro Ser Ser
            20                  25                  30

Leu Ala Val Ser Val Gly Glu Lys Val Thr Met Ser Cys Lys Ser Ser
        35                  40                  45

Gln Ser Leu Leu Tyr Ser Ser Asn Gln Lys Asn Tyr Leu Ala Trp Tyr
    50                  55                  60

Gln Gln Lys Pro Gly Gln Ser Pro Lys Leu Leu Ile Tyr Trp Ala Ser
65                  70                  75                  80

Thr Arg Glu Ser Gly Val Pro Asp Arg Phe Thr Gly Ser Gly Ser Gly
                85                  90                  95

Thr Asp Phe Thr Leu Thr Ile Ser Ser Val Lys Ala Glu Asp Leu Ala
            100                 105                 110

Val Tyr Tyr Cys His Gln Tyr Tyr Ser Tyr Pro Leu Thr Phe Gly Ala
        115                 120                 125

Gly Thr Lys Leu Glu Leu Asn Arg Thr Val Ala Ala Pro Ser Val Phe
    130                 135                 140

Ile Phe Pro Pro Ser Asp Glu Gln Leu Lys Ser Gly Thr Ala Ser Val
145                 150                 155                 160

Val Cys Leu Leu Asn Asn Phe Tyr Pro Arg Glu Ala Lys Val Gln Trp
                165                 170                 175

Lys Val Asp Asn Ala Leu Gln Ser Gly Asn Ser Gln Glu Ser Val Thr
            180                 185                 190

Glu Gln Asp Ser Lys Asp Ser Thr Tyr Ser Leu Ser Ser Thr Leu Thr
        195                 200                 205

Leu Ser Lys Ala Asp Tyr Glu Lys His Lys Val Tyr Ala Cys Glu Val
    210                 215                 220

Thr His Gln Gly Leu Ser Ser Pro Val Thr Lys Ser Phe Asn Arg Gly
225                 230                 235                 240

Glu Cys

<210> SEQ ID NO 74
<211> LENGTH: 237
<212> TYPE: PRT
<213> ORGANISM: Artificial Sequence
<220> FEATURE:
<223> OTHER INFORMATION: Amino acid sequence of chimeric mouse VL 11H7
      and human constant light kappa chain

<400> SEQUENCE: 74
```

```
Met Asp Met Arg Val Pro Ala Gln Leu Leu Gly Leu Leu Leu Trp
1               5                   10                  15

Phe Pro Gly Ala Arg Cys Glu Ile Val Leu Thr Gln Ser Pro Ala Leu
                20                  25                  30

Met Ala Ala Ser Pro Gly Glu Lys Val Thr Ile Thr Cys Ser Val Ser
            35                  40                  45

Ser Ser Ile Ser Ser Ser Asn Leu His Trp Tyr Gln Gln Lys Ser Glu
    50                  55                  60

Thr Ser Pro Lys Pro Trp Ile Tyr Gly Thr Ser Asn Leu Ala Ser Gly
65                  70                  75                  80

Val Pro Val Arg Phe Ser Gly Ser Gly Ser Gly Thr Ser Tyr Ser Leu
                85                  90                  95

Thr Ile Ser Ser Met Glu Ala Glu Asp Ala Ala Thr Tyr Tyr Cys Gln
            100                 105                 110

Gln Trp Ser Ser Tyr Pro Leu Thr Phe Gly Gly Gly Thr Lys Leu Glu
            115                 120                 125

Ile Lys Arg Thr Val Ala Ala Pro Ser Val Phe Ile Phe Pro Pro Ser
130                 135                 140

Asp Glu Gln Leu Lys Ser Gly Thr Ala Ser Val Val Cys Leu Leu Asn
145                 150                 155                 160

Asn Phe Tyr Pro Arg Glu Ala Lys Val Gln Trp Lys Val Asp Asn Ala
                165                 170                 175

Leu Gln Ser Gly Asn Ser Gln Glu Ser Val Thr Glu Gln Asp Ser Lys
            180                 185                 190

Asp Ser Thr Tyr Ser Leu Ser Ser Thr Leu Thr Leu Ser Lys Ala Asp
            195                 200                 205

Tyr Glu Lys His Lys Val Tyr Ala Cys Glu Val Thr His Gln Gly Leu
210                 215                 220

Ser Ser Pro Val Thr Lys Ser Phe Asn Arg Gly Glu Cys
225                 230                 235

<210> SEQ ID NO 75
<211> LENGTH: 241
<212> TYPE: PRT
<213> ORGANISM: Artificial Sequence
<220> FEATURE:
<223> OTHER INFORMATION: Amino acid sequence of chimeric mouse VL 49G4
      and human constant light kappa chain

<400> SEQUENCE: 75

Met Asp Met Arg Val Pro Ala Gln Leu Leu Gly Leu Leu Leu Trp
1               5                   10                  15

Phe Pro Gly Ala Arg Cys Asp Val Leu Met Thr Gln Thr Pro Leu Ser
                20                  25                  30

Leu Pro Val Ser Leu Gly Asp Gln Ala Ser Ile Ser Cys Arg Ser Ser
            35                  40                  45

Gln Ser Ile Val His Ser Asn Gly Asn Thr Tyr Leu Glu Trp Phe Leu
    50                  55                  60

Gln Lys Pro Gly Gln Ser Pro Lys Leu Leu Ile Tyr Lys Val Ser Asn
65                  70                  75                  80

Arg Phe Ser Gly Val Pro Asp Arg Phe Ser Gly Ser Gly Ser Gly Thr
                85                  90                  95

Asp Phe Thr Leu Lys Ile Ser Arg Val Glu Ala Glu Asp Leu Gly Val
            100                 105                 110

Tyr Tyr Cys Phe Gln Gly Ser His Val Pro Leu Thr Phe Gly Ala Gly
            115                 120                 125
```

```
Thr Lys Leu Glu Leu Lys Arg Thr Val Ala Pro Ser Val Phe Ile
    130                 135                 140

Phe Pro Pro Ser Asp Glu Gln Leu Lys Ser Gly Thr Ala Ser Val Val
145                 150                 155                 160

Cys Leu Leu Asn Asn Phe Tyr Pro Arg Glu Ala Lys Val Gln Trp Lys
                165                 170                 175

Val Asp Asn Ala Leu Gln Ser Gly Asn Ser Gln Glu Ser Val Thr Glu
                180                 185                 190

Gln Asp Ser Lys Asp Ser Thr Tyr Ser Leu Ser Ser Thr Leu Thr Leu
                195                 200                 205

Ser Lys Ala Asp Tyr Glu Lys His Lys Val Tyr Ala Cys Glu Val Thr
    210                 215                 220

His Gln Gly Leu Ser Ser Pro Val Thr Lys Ser Phe Asn Arg Gly Glu
225                 230                 235                 240

Cys
```

<210> SEQ ID NO 76
<211> LENGTH: 513
<212> TYPE: PRT
<213> ORGANISM: Artificial Sequence
<220> FEATURE:
<223> OTHER INFORMATION: Amino acid sequence of membrane-bound
      anti-human CD3 scFv (signal peptide followed by OKT3 scFv linked
      to CH2-CH3 domains of human IgG1 and human CD80 cytoplasmic tail)

<400> SEQUENCE: 76

```
Met Lys Trp Val Thr Phe Ile Ser Leu Leu Phe Leu Phe Ser Ser Ala
1               5                   10                  15

Tyr Ser Gln Val Gln Leu Gln Gln Ser Gly Ala Glu Leu Ala Arg Pro
                20                  25                  30

Gly Ala Ser Val Lys Met Ser Cys Lys Ala Ser Gly Tyr Thr Phe Thr
            35                  40                  45

Arg Tyr Thr Met His Trp Val Lys Gln Arg Pro Gly Gln Gly Leu Glu
    50                  55                  60

Trp Ile Gly Tyr Ile Asn Pro Ser Arg Gly Tyr Thr Asn Tyr Asn Gln
65                  70                  75                  80

Lys Phe Lys Asp Lys Ala Thr Leu Thr Thr Asp Lys Ser Ser Ser Thr
                85                  90                  95

Ala Tyr Met Gln Leu Ser Ser Leu Thr Ser Glu Asp Ser Ala Val Tyr
                100                 105                 110

Tyr Cys Ala Arg Tyr Tyr Asp Asp His Tyr Cys Leu Asp Tyr Trp Gly
            115                 120                 125

Gln Gly Thr Thr Leu Thr Val Ser Ser Gly Gly Gly Gly Ser Gly Gly
    130                 135                 140

Gly Gly Ser Gly Gly Gly Gly Ser Gln Ile Val Leu Thr Gln Ser Pro
145                 150                 155                 160

Ala Ile Met Ser Ala Ser Pro Gly Glu Lys Val Thr Met Thr Cys Ser
                165                 170                 175

Ala Ser Ser Ser Val Ser Tyr Met Asn Trp Tyr Gln Gln Lys Ser Gly
                180                 185                 190

Thr Ser Pro Lys Arg Trp Ile Tyr Asp Thr Ser Lys Leu Ala Ser Gly
            195                 200                 205

Val Pro Ala His Phe Arg Gly Ser Gly Ser Gly Thr Ser Tyr Ser Leu
    210                 215                 220

Thr Ile Ser Gly Met Glu Ala Glu Asp Ala Ala Thr Tyr Tyr Cys Gln
```

```
                225                 230                 235                 240
Gln Trp Ser Ser Asn Pro Phe Thr Phe Gly Ser Gly Thr Lys Leu Glu
                    245                 250                 255
Ile Asn Arg Ala Ala Ala Pro Ser Val Phe Leu Phe Pro Pro Lys Pro
                    260                 265                 270
Lys Asp Thr Leu Met Ile Ser Arg Thr Pro Glu Val Thr Cys Val Val
                    275                 280                 285
Val Asp Val Ser His Glu Asp Pro Glu Val Lys Phe Asn Trp Tyr Val
                    290                 295                 300
Asp Gly Val Glu Val His Asn Ala Lys Thr Lys Pro Arg Glu Glu Gln
305                 310                 315                 320
Tyr Asn Ser Thr Tyr Arg Val Val Ser Val Leu Thr Val Leu His Gln
                    325                 330                 335
Asp Trp Leu Asn Gly Lys Glu Tyr Lys Cys Lys Val Ser Asn Lys Ala
                    340                 345                 350
Leu Pro Ala Pro Ile Glu Lys Thr Ile Ser Lys Ala Lys Gly Gln Pro
                    355                 360                 365
Arg Glu Pro Gln Val Tyr Thr Leu Pro Pro Ser Arg Glu Glu Met Thr
                370                 375                 380
Lys Asn Gln Val Ser Leu Thr Cys Leu Val Lys Gly Phe Tyr Pro Ser
385                 390                 395                 400
Asp Ile Ala Val Glu Trp Glu Ser Asn Gly Gln Pro Glu Asn Asn Tyr
                    405                 410                 415
Lys Thr Thr Pro Pro Val Leu Asp Ser Asp Gly Ser Phe Phe Leu Tyr
                    420                 425                 430
Ser Lys Leu Thr Val Asp Lys Ser Arg Trp Gln Gln Gly Asn Val Phe
                    435                 440                 445
Ser Cys Ser Val Met His Glu Ala Leu His Asn His Tyr Thr Gln Lys
                    450                 455                 460
Ser Leu Ser Leu Ser Pro Gly Trp Ala Ile Thr Leu Ile Ser Val Asn
465                 470                 475                 480
Gly Ile Phe Val Ile Cys Cys Leu Thr Tyr Cys Phe Ala Pro Arg Cys
                    485                 490                 495
Arg Glu Arg Arg Arg Asn Glu Arg Leu Arg Arg Glu Ser Val Arg Pro
                    500                 505                 510
Val
```

<210> SEQ ID NO 77
<211> LENGTH: 1539
<212> TYPE: DNA
<213> ORGANISM: Artificial Sequence
<220> FEATURE:
<223> OTHER INFORMATION: cDNA sequence coding for membrane-bound
      anti-human CD3 scFv

<400> SEQUENCE: 77

| | | | | | |
|---|---|---|---|---|---|
| atgaaatggg | tcacctttat | ctccctgctg | ttcctgttct | ccagcgccta | ctctcaggtc | 60 |
| cagttgcagc | agtctggcgc | cgaattggct | agacctggcg | cctccgtgaa | gatgtcctgc | 120 |
| aaggcttccg | gctacacctt | caccagatac | accatgcact | gggtcaagca | gaggcctgga | 180 |
| cagggccttg | agtggatcgg | ctacatcaac | ccttctcggg | gctacaccaa | ctacaaccag | 240 |
| aagttcaagg | acaaggctac | cctgacaacc | gacaagtcct | cctccaccgc | ctacatgcag | 300 |
| ctgtccagcc | tgacctctga | ggactccgcc | gtgtactact | gtgcccggta | ctacgacgac | 360 |
| cactactgcc | tggattattg | gggccagggc | accacactga | cagtgtctag | cggaggcgga | 420 |

```
ggatctggtg gtggtggatc tggcggcgga ggttctcaga ttgtgctgac ccagtctcct      480
gccatcatgt ccgcttctcc cggcgagaaa gtgacaatga cctgctccgc ctcttcctcc      540
gtgtcctaca tgaactggta tcagcagaag tccggcacct ctcctaagcg gtggatctac      600
gacacctcca agctggcatc tggcgtgccc gctcacttta gaggctctgg ctctggcacc      660
agctactccc tgaccatctc tggcatggaa gccgaggatg ccgccaccta ctattgccag      720
cagtggtcta gcaaccccttc caccttcggc tccggcacca agctggaaat caacagagcc      780
gccgctcctt ccgtgtttct gttccctcca aagcctaagg acaccctgat gatctctcgg      840 accccctgaag tgacctgcgt ggtggtcgat gtgtctcacg aggacccaga agtgaagttc      900
aattggtacg tggacggcgt ggaagtgcac aacgccaaga ccaagcctag agaggaacag      960
tacaactcca cctacagagt ggtgtccgtg ctgaccgtgc tgcaccagga ttggctgaac     1020
ggcaaagagt acaagtgcaa ggtgtccaac aaggctctgc ccgctcctat cgaaaagacc     1080
atctccaagg ccaagggcca gcctaggaa ccccaggttt acaccctgcc tccaagccgg      1140
gaagagatga ccaagaacca ggtgtccctg acctgcctgg tcaagggctt ctaccctcc      1200 gatatcgccg tggaatggga gagcaatggc cagcctgaga caactacaa gaccacacct      1260 cctgtgctgg actccgacgg ctcattcttc ctgtacagca gctgacagt ggacaagtcc      1320 agatggcagc agggcaacgt gttctcctgc tccgtgatgc acgaggccct gcacaatcac      1380
tacacacaga gtccctgtc tctgtcccct ggctgggcta tcaccctgat ctctgtgaac      1440
ggcatcttcg tgatctgctg cctgacctac tgcttcgccc ctagatgcag agagcggcgg      1500
agaaacgaac ggctgcggag agaatctgtc cggcctgtg                            1539
```

ANTI-HUMAN HVEM (TNFRSF14) ANTIBODIES AND USES THEREOF

RELATED APPLICATIONS

This application is a National Stage Application under 35 U.S.C. 371 of co-pending PCT application PCT/NL2020/050817 designating the United States and filed Dec. 24, 2020; which claims the benefit of EP Application Serial No. 19219684.8.1 and filed Dec. 24, 2019, each of which are hereby incorporated by reference in their entireties.

FIELD OF THE INVENTION

The invention relates to the field of antibodies and the use of such antibodies. The invention in particular provides antibodies that bind HVEM. The invention also provides kits and compositions comprising an anti HVEM antibody and methods of treatment using an antibody as described herein.

BACKGROUND OF THE INVENTION

The activation of T cells requires the concomitant activation of at least two signals: the engagement of T cell receptor and an additional signal delivered by co-stimulatory molecules. Some co-stimulatory molecules belong to B7/CD28 and TNF/TNFR families, and play crucial roles in the modulation of immune responses and improvement of antitumor immunity. Tumors can escape immune surveillance by generating an immunosuppressive microenvironment, where antitumor T cell responses are attenuated by the lack of co-stimulatory molecules on and/or by overexpression of co-inhibitory molecules such as PD-L1/L2 on the surface of cancer cells. Targeting co-stimulatory and co-inhibitory pathways represent an attractive therapeutic strategy to enhance the antitumor immunity in several human cancers. Clinical trials targeting the co-inhibitory Ig molecules CTLA-4 and PD-1, have already given promising results in patients with melanoma, renal cell and prostate carcinoma, and non-Hodgkin's lymphoma, and resulted in drug approvals like Yervoy® and Opdivo®.

There is interest in evaluating the potential role of other co-stimulatory and co-inhibitory receptor/ligand interactions. One such molecule is Herpes virus entry mediator (HVEM/CD270/TNFRSF14) and its ligands. The interactions between HVEM and its ligands are more complex than for instance PD-1/PD-L1, as there is evidence of bi-directional signalling. HVEM is a molecular switch between stimulatory and inhibitory signalling upon interaction with its ligands, which comprise BTLA (B- and T-lymphocyte attenuator), CD160, LIGHT (lymphotoxin-like, exhibits inducible expression, and competes with herpes simplex virus glycoprotein D for HVEM, a receptor expressed by T lymphocytes) and TNFβ/LTα (tumor necrosis factor β/lymphotoxin a). HVEM and its ligands have a role in the physiopathology of immune regulation. In the present invention it was shown that dysregulation of this network contributes to various diseases.

HVEM was initially discovered as the co-receptor for the glycoprotein D of the herpes simplex virus 1, allowing the entry of the virus in the cell. HVEM is found to be widely expressed in tissues, with highest expression levels in lung, kidney, and liver. HVEM is also found to be expressed on T cells, B cells, NK cells and myeloid cells. Notably, HVEM expression is upregulated in several cancers. HVEM is known to interact with BTLA, CD160, LIGHT and TNFβ. Most of the ligands, as well as HVEM itself can be expressed on either side of an immune synapse: CD160 is found to be expressed in NK cells, NKT cells and T cells, BTLA is highly expressed in activated T cells and rested B cells, and less in naïve T cells, NK cells, dendritic cells (DCs) and macrophages. LIGHT is found to be expressed by immature DCs, granulocytes, monocytes and activated T cells and TNFβ is expressed in B cells and T cells and NK cells.

Without being bound by theory, it is believed that engagement of BTLA and CD160 on T lymphocytes by HVEM provides co-inhibitory signals to T lymphocytes through BTLA and CD160, ligation of HVEM on T lymphocytes by LIGHT and TNFβ delivers co-stimulatory signals through HVEM. These interactions are bidirectional: HVEM induces inhibitory signals in T cells after interaction with BTLA and CD160 on T cells, while both BTLA and CD160 act as activating ligands for HVEM resulting in NFκB activation. Furthermore, LIGHT delivers costimulatory signals to a T cell when interacting with HVEM expressed on the T cell, and HVEM has also been implicated to transmit costimulatory signals to a T cell when interacting with LIGHT expressed by the T cell. However, LIGHT does not contain an obvious signalling motif and its mechanism for signalling is incompletely defined.

When LIGHT and/or TNFβ, BTLA and/or CD160 simultaneously interact with HVEM, the net effect is an inhibitory signal for T-cell activation. Many tumors (e.g., melanoma, esophageal squamous cell carcinoma, hepatocellular carcinoma, and colorectal cancer) overexpress HVEM. Hence, therapeutic blocking of the inhibitory interaction between HVEM on cancer cells with BTLA/CD160 on T cells, while leaving LIGHT-mediated signalling in HVEM expressing T cells intact, could enhance antitumor T cell responses. Antibodies have been described that can interfere with binding of BTLA to HVEM (WO2014184360A1). In one embodiment the present invention provides an antibody that can block binding of BTLA to HVEM and displace BTLA bound to HVEM. These and other antibodies are the subject of the present invention disclosure.

SUMMARY OF THE INVENTION

In one aspect the disclosure provides an antibody that binds an extracellular part of Herpesvirus entry mediator (HVEM) on HVEM expressing cells, and prevents binding of B- and T-lymphocyte attenuator (BTLA) to HVEM when said antibody is bound to said extracellular part of HVEM. In one aspect the antibody can displace a BTLA bound to said extracellular part of HVEM.

In one aspect the disclosure provides an antibody that binds an extracellular part of HVEM on HVEM expressing cells comprising a heavy chain variable region with the CDR1, CDR2 and CDR3 sequence of SEQ ID NO: 26-28 with 0, 1 or 2 amino acid insertions, deletions, substitutions or additions, and a light chain variable region with the CDR1, CDR2, CDR3 sequence of SEQ ID NO: 29-31 with 0, 1 or 2 amino acid insertions, deletions, substitutions or additions.

In one aspect, the disclosure provides an antibody that binds an extracellular part of HVEM on HVEM expressing cell comprising a heavy chain region with the amino acid sequence of SEQ ID NO: 24 with 0, 1, 2, 3, 4, 5, 6, 7, 8, 9 or 10 amino acid insertions, deletions, substitutions or additions and a light chain variable region with the amino acid sequence of SEQ ID NO: 25 with 0, 1, 2, 3, 4, 5, 6, 7, 8, 9 or 10 amino acid insertions, deletions, substitutions or additions.

In one aspect the disclosure provides an antibody that binds an extracellular part of HVEM on HVEM expressing cells comprising a heavy chain variable region with the CDR1, CDR2 and CDR3 sequence of SEQ ID NO: 42-44 with 0, 1 or 2 amino acid insertions, deletions, substitutions or additions, and a light chain variable region with the CDR1, CDR2, CDR3 sequence of SEQ ID NO: 45-47 with 0, 1 or 2 amino acid insertions, deletions, substitutions or additions.

In one aspect, the disclosure provides an antibody that binds an extracellular part of HVEM on HVEM expressing cell comprising a heavy chain region with the amino acid sequence of SEQ ID NO: 40 with 0, 1, 2, 3, 4, 5, 6, 7, 8, 9 or 10 amino acid insertions, deletions, substitutions or additions and a light chain variable region with the amino acid sequence of SEQ ID NO: 41 with 0, 1, 2, 3, 4, 5, 6, 7, 8, 9 or 10 amino acid insertions, deletions, substitutions or additions.

In one aspect the disclosure provides an antibody that binds an extracellular part of HVEM on HVEM expressing cells comprising a heavy chain variable region with the CDR1, CDR2 and CDR3 sequence of SEQ ID NO: 18-20 with 0, 1 or 2 amino acid insertions, deletions, substitutions or additions, and a light chain variable region with the CDR1, CDR2, CDR3 sequence of SEQ ID NO: 21-23 with 0, 1 or 2 amino acid insertions, deletions, substitutions or additions.

In one aspect, the disclosure provides an antibody that binds an extracellular part of HVEM on HVEM expressing cell comprising a heavy chain region with the amino acid sequence of SEQ ID NO: 16 with 0, 1, 2, 3, 4, 5, 6, 7, 8, 9 or 10 amino acid insertions, deletions, substitutions or additions and a light chain variable region with the amino acid sequence of SEQ ID NO: 17 with 0, 1, 2, 3, 4, 5, 6, 7, 8, 9 or 10 amino acid insertions, deletions, substitutions or additions.

In one aspect the disclosure provides an antibody that binds an extracellular part of HVEM on HVEM expressing cells comprising a heavy chain variable region with the CDR1, CDR2 and CDR3 sequence of SEQ ID NO: 34-36 with 0, 1 or 2 amino acid insertions, deletions, substitutions or additions, and a light chain variable region with the CDR1, CDR2, CDR3 sequence of SEQ ID NO: 37-39 with 0, 1 or 2 amino acid insertions, deletions, substitutions or additions.

In one aspect, the disclosure provides an antibody that binds an extracellular part of HVEM on HVEM expressing cell comprising a heavy chain region with the amino acid sequence of SEQ ID NO: 32 with 0, 1, 2, 3, 4, 5, 6, 7, 8, 9 or 10 amino acid insertions, deletions, substitutions or additions and a light chain variable region with the amino acid sequence of SEQ ID NO: 33 with 0, 1, 2, 3, 4, 5, 6, 7, 8, 9 or 10 amino acid insertions, deletions, substitutions or additions.

In one aspect the disclosure provides an antibody that binds an extracellular part of HVEM on HVEM expressing cells comprising a heavy chain variable region with the CDR1, CDR2 and CDR3 sequence of SEQ ID NO: 50-52 with 0, 1 or 2 amino acid insertions, deletions, substitutions or additions, and a light chain variable region with the CDR1, CDR2, CDR3 sequence of SEQ ID NO: 53-55 with 0, 1 or 2 amino acid insertions, deletions, substitutions or additions.

In one aspect, the disclosure provides an antibody that binds an extracellular part of HVEM on HVEM expressing cell comprising a heavy chain region with the amino acid sequence of SEQ ID NO: 48 with 0, 1, 2, 3, 4, 5, 6, 7, 8, 9 or 10 amino acid insertions, deletions, substitutions or additions and a light chain variable region with the amino acid sequence of SEQ ID NO: 49 with 0, 1, 2, 3, 4, 5, 6, 7, 8, 9 or 10 amino acid insertions, deletions, substitutions or additions.

In one aspect the disclosure provides a nucleic acid molecule or nucleic acid molecules encoding an antibody as disclosed herein or an antigen binding fragment thereof as disclosed herein. Further provided is a nucleic acid encoding a variable region as disclosed herein.

In one aspect the disclosure provides a vector comprising a nucleic acid molecule as described herein. In one aspect the disclosure provides a cell comprising an antibody, a nucleic acid molecule or molecules and/or a vector as disclosed herein.

Preferably, the host cell is a mammalian, insect, plant, bacterial or yeast cell. More preferably, the cell is a human cell. Preferably, the host cell is a hybridoma cell, a Chinese hamster ovary (CHO) cell, an NSO cell, or a PER-C6™ cell.

In one aspect the disclosure provides a method of producing the antibody as disclosed herein. The method includes harvesting of the antibody. Preferably, the antibodies are produced using a cell and harvested from said cell. Preferably said cell is a hybridoma cell, a Chinese hamster ovary (CHO) cell, an NSO cell, or a PER-C6™ cell. Preferably, the antibodies are produced synthetically.

In one aspect the disclosure provides a pharmaceutical composition comprising an antibody or antigen binding fragment thereof, nucleic acid and/or cell as disclosed. Preferably, the composition or antibody or antigen binding fragment thereof as disclosed herein are for use in the manufacture of a medicament. Preferably, the medicament is for the treatment and/or prophylaxis of cancer and immune-related disorders.

In one aspect the disclosure provides a method for the treatment of cancer and immune-related disorders in a subject comprising administering to the subject in need thereof a therapeutically effective amount of an antibody or antigen binding fragment thereof, a nucleic acid molecule or a vector as disclosed herein.

In one aspect the disclosure provides an antibody or antigen binding fragment thereof for use in the treatment of cancer and immune-related disorders.

In one aspect the disclosure provides a method for modulating HVEM signalling activity, comprising contacting HVEM expressing cells with an antibody or antigen binding fragment thereof, a nucleic acid molecule or a vector as disclosed herein.

In one aspect the disclosure provides a method for increasing an immune response in a subject comprising administering to the subject in need thereof a therapeutically effective amount of a composition comprising an antibody or antigen binding fragment thereof, a nucleic acid molecule or a vector as disclosed herein.

In one aspect the disclosure provides a method for reducing tumor growth in a subject comprising administering to the subject in need thereof a therapeutically effective amount of a composition comprising an antibody or antigen binding fragment thereof, a nucleic acid molecule or a vector as disclosed herein.

DETAILED DESCRIPTION OF THE DISCLOSED EMBODIMENTS

The disclosure describes antibodies that binds an extracellular part of human HVEM on HVEM-expressing cells and soluble HVEM. An antibody as described herein is useful to prevent binding of BTLA and CD160 to HVEM when the antibody is bound to said extracellular part of human HVEM. Several antibodies have been generated that binds to HVEM. Antibodies that specifically bind HVEM are known in the art. For example, the antibody eBio HVEM-122 (eBiosciences) is commercially available and referred to in example 2. Antibodies have been described that can interfere with binding of BTLA to HVEM (WO2014184360A1). The present invention provides antibodies that block binding of BTLA to HVEM and displace BTLA once bound to HVEM.

In one aspect the disclosure provides an antibody that binds an extracellular part of HVEM on HVEM expressing cells; prevents binding of BTLA to HVEM when said antibody is bound to said extracellular part of HVEM; and displaces a BTLA once bound to said extracellular part of HVEM.

The term "antibody" refers to an immunoglobulin molecule that is typically composed of two identical pairs of polypeptide chains, each pair having one "heavy" (H) chain and one "light" (L) chain. Human light chains are classified as kappa (κ) and lambda (λ). Heavy chains are classified as mu, delta, gamma, alpha, or epsilon, and define the antibody's isotype as IgM, IgD, IgG, IgA, and IgE, respectively. Each heavy chain is comprised of a heavy chain variable region (abbreviated herein as HCVR or VH) and a heavy chain constant region. The heavy chain constant regions of IgD, IgG, and IgA are comprised of three domains, CH1, CH2 and CH3, and the heavy chain constant regions of IgM and IgE are comprised of four domains, CH1, CH2, CH3, and CH4. Each light chain is comprised of a light chain variable region (abbreviated herein as LCVR or VL) and a light chain constant region. The light chain constant region is comprised of one domain, CL. The constant regions of the antibodies may mediate the binding of the immunoglobulin to host tissues or factors, including various cells of the immune system (e.g., effector cells). The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from the amino-terminus to carboxy-terminus in the following order: FR1, CDR1, FR2, CDR2, FR3, CDR3, FR4. The variable regions of the light and heavy chain together form the antibody binding site and defines the specificity for the epitope. Various methods are known in the art to assign amino acids to a region or domain in an antibody. Well known methods include the Kabat method and the Chothia method (Kabat Sequences of Proteins of Immunological Interest (National Institutes of Health, Bethesda, Md. (1987 and 1991); Chothia et al. Conformations of immunoglobulin hypervariable regions in Nature 1989; 342(6252):877-83). The assignment of the amino acids to each region or domain of this disclosure is in accordance with the definitions of Kabat.

The term "antibody" encompasses murine, humanized, deimmunized human and chimeric antibodies, and an antibody that is a multimeric form of antibodies, such as dimers, trimers, or higher-order multimers of monomeric antibodies. Antibody also encompasses monospecific, bispecific or multispecific antibodies, and any other modified configuration of the immunoglobulin molecule that comprises an antigen recognition site of the required specificity. It also encompasses an antibody that is linked or attached to a non-antibody moiety. Further, the term "antibody" is not limited by any particular method of producing the antibody. For example, it includes monoclonal antibodies, recombinant antibodies and polyclonal antibodies. The invention provides an antibody as described herein. Furthermore, the invention provides a part, derivative and/or analogue of an antibody as disclosed herein. The part, derivative and/or analogue retains the antigen binding property of the antibody in kind, not necessarily in amount. Non-limiting examples of a part and/or derivative include a part of an antibody is an antigen binding part and typically contains one or more variable domains of the antibody. Non-limiting examples are the various Fab fragments. A part can also be a so-called single domain antibody fragment. A single-domain antibody fragment (sdAb, called Nanobody by Ablynx, the developer) is an antibody fragment with a single monomeric variable antibody domain. Like a whole antibody, it is able to bind selectively to a specific antigen. With a molecular weight of only 12-15 kDa, single-domain antibody fragments are much smaller than common antibodies (150-160 kDa) which are composed of two heavy protein chains and two light chains, and even smaller than Fab fragments (~50 kDa, one light chain and half a heavy chain) and single-chain variable fragments (~25 kDa, two variable regions, one from a light and one from a heavy chain). Single-domain antibodies by themselves are not much smaller than normal antibodies (being typically 90-100 kDa). Single-domain antibody fragments are mostly engineered from heavy-chain antibodies found in camelids; these are called VHH fragments (Nanobodies®). Some fishes also have heavy-chain only antibodies (IgNAR, 'immunoglobulin new antigen receptor'), from which single-domain antibody fragments called VNAR fragments can be obtained. An alternative approach is to split the dimeric variable domains from common immunoglobulin G (IgG) from humans or mice into monomers. Although most research into single-domain antibodies is currently based on heavy chain variable domains, nanobodies derived from light chains have also been shown to bind specifically to target epitopes. A non-limiting example of an antibody part contains a variable domain of a heavy chain and/or a light chain of an antibody or an equivalent thereof. Non-limiting examples of such parts are VHH, Human Domain Antibodies (dAbs) and Unibodies. Preferred antibody parts or derivatives have at least a variable domain of a heavy chain and a light chain of an antibody as described herein. Non-limiting examples of a derivative or a part is are a F(ab)-fragment and a single chain Fv fragment. A functional part of a bispecific antibody comprises the antigen binding parts of the bispecific antibody, or a derivative and/or analogue of the binding parts.

A "single-chain antibody" (scFv) has a single polypeptide chain comprising a VL domain linked to a VH domain wherein VL domain and VH domain are paired to form a monovalent molecule. Single chain antibody can be prepared according to method known in the art (see, for example, Bird et al., (1988) Science 242:423-426 and Huston et al., (1988) Proc. Natl. Acad. Sci. USA 85:5879-5883). A "diabody" has two chains, each chain comprising a heavy chain variable region connected to a light chain variable region on the same polypeptide chain connected by a short peptide linker, wherein the two regions on the same chain do not pair with each other but with complementary domains on the other chain to form a bispecific molecule. Methods of preparing diabodies are known in the art (See, e.g., Holliger P. et al., (1993) Proc. Natl. Acad. Sci. USA 90:6444-6448, and Poljak R. J. et al., (1994) Structure 2:1121-1123). Domain antibodies (dAbs) are small functional binding units of antibodies, corresponding to the variable regions of either the heavy or light chains of antibodies. Domain antibodies are well expressed in bacterial, yeast, and mammalian cell systems. Further details of domain antibodies and methods of production thereof are known in the art (see, for example, U.S. Pat. Nos. 6,291,158; 6,582,915; 6,593,081; WO04/003019 and WO03/002609). Nanobodies are derived from the heavy chains of an antibody. A nanobody typically comprises a single variable domain and two constant domains (CH2 and CH3) and retains antigen-binding capacity of the original antibody. Nanobodies can be prepared by methods known in the art (see e.g., U.S. Pat. Nos. 6,765,087, 6,838,254, WO 06/079372). Unibodies have one light chain and one heavy chain of an IgG4 antibody. Unibodies may be made by the removal of the hinge region of IgG4 antibodies. Further details of unibodies and methods of preparing them may be found in WO2007/059782. The list of analogues to antibodies is increasing every year. With the sequence of the variable domains and the presently extensive knowledge of the 3D structure of many different antibodies the skilled person can convert an antibody of the invention to one or the other antibody analogue, part or derivative.

In addition to the binding molecule, the molecules of the invention may further comprise a moiety for increasing the in vivo half-life of the molecule, such as but not limited to polyethylene glycol (PEG), human serum albumin, glycosylation groups, fatty acids and dextran. Such further moieties may be conjugated or otherwise combined with the binding moiety using methods well known in the art. Also provided are chimeric antigen receptors (CAR) comprising a variable domain of an antibody as described herein. CAR are engineered receptors that combine a new specificity (typically an antigen binding part of an antibody or a derivative thereof) with an immune cell to target cells. The receptors are called chimeric because they are fused of parts from different sources (T lymphocytes genetically modified to express one or more chimeric antigen receptors (CARs; see, e.g., Eshhar, U.S. Pat. No. 7,741,465; Eshhar, U.S. Patent Application Publication No. 2012/0093842). In some embodiments, the antibodies as disclosed herein can be coupled to an active compound for example a toxin. Furthermore, the antibodies or antigen binding fragments as disclosed may be coupled to a label, e.g., a fluorescent protein, chemical label, organic dye, coloured particle or enzyme. The antibodies as disclosed herein can be coupled to a drug to form an antibody-drug conjugate (ADC). The invention provides antibody analogues, antibody parts and antibody derivatives, also when these molecules are coupled to other molecules or incorporated.

In some embodiments an antibody as disclosed herein is a chimeric antibody. The term "chimeric antibody" refers to an antibody that comprises amino acid sequences derived from two different species such as human and mouse, typically a combination of mouse variable (from heavy and light chains) regions and human constant (heavy and light chains) regions. A non-limiting example of generating such a chimeric antibody is described in the working examples (e.g., example 5). In this chimeric antibody the mouse IgG1/kappa constant region is exchanged for a human IgG/kappa constant domain. In some embodiments an antibody as disclosed herein is a humanized antibody. The term "humanized antibody" refers to an antibody that contains some or all of the CDRs from a non-human animal antibody while the framework and constant regions of the antibody contain amino acid residues derived from human antibody sequences. Humanized antibodies are typically produced by grafting CDRs from a mouse antibody into human framework sequences followed by back substitution of certain human framework residues for the corresponding mouse residues from the source antibody. The term "deimmunized antibody" also refers to an antibody of non-human origin in which, typically in one or more variable regions, one or more epitopes have been removed, that have a high propensity of constituting a human T-cell and/or B-cell epitope, for purposes of reducing immunogenicity. The amino acid sequence of the epitope can be removed in full or in part. However, typically the amino acid sequence is altered by substituting one or more of the amino acids constituting the epitope for one or more other amino acids, thereby changing the amino acid sequence into a sequence that does not constitute a human T-cell and/or B-cell epitope. The amino acids are substituted by amino acids that are present at the corresponding position(s) in a corresponding human variable heavy or variable light chain as the case may be. In some embodiments, an antibody as disclosed herein is a human antibody. The term "human antibody" refers to an antibody consisting of amino acid sequences of human immunoglobulin sequences only. A human antibody may contain murine carbohydrate chains if produced in a mouse, in a mouse cell or in a hybridoma derived from a mouse cell. Human antibodies may be prepared in a variety of ways known in the art. Chimeric, humanized, deimmunized and human antibodies are within the scope of the invention.

An antibody that binds human HVEM binds to HVEM under conditions that are normally used for antibody binding. When the antibody and human HVEM are contacted with each other under conditions suitable for antibody binding, the antibody will bind to human HVEM. The antibody binds to membrane bound human HVEM expressed on the HEK293F cells, while the antibody does not bind significantly to HEK293F cells that do not express human HVEM on their cell membrane. Binding of the antibody to a human HVEM expressing cell can be detected by methods known to the person skilled in the art. For example, by using a secondary antibody carrying a fluorescent label and measure labelled cells using flow cytometry (FACS).

HVEM, also known as tumor necrosis factor receptor superfamily member 14 (TNFRSF14) and CD270, is a human cell surface receptor of the TNF-receptor (tumor necrosis factor) superfamily. In humans, the protein is encoded by the TNFRSF14 gene. HVEM can engage at least four distinct ligands, the TNFSF members LIGHT (TNFSF14) and TNFβ/LTα (tumor necrosis factor β/lymphotoxin a) and immunoglobulin superfamily members B- and T-lymphocyte attenuator (BTLA) and CD160. For a reference sequence of human HVEM, we refer to SEQ ID NO.: 1 (Swiss-Prot no. Q92956.3; aa1-283). The reference is solely made to identify a HVEM gene/protein. It is not intended to limit the HVEM as described herein to the particular sequence of the database entry. Natural variants of HVEM that can bind BTLA, CD160, LIGHT and TNFβ and can be bound by an antibody as described herein are within the scope of the invention. A recombinant human HVEM is also within the scope of the invention if it can bind BTLA, CD160, LIGHT and TNFβ, and can bind an antibody as described herein.

HVEM is widely expressed in tissues, with highest expression levels in lung, kidney, and liver, and is found to be expressed on T cells, B cells, NK cells and myeloid cells. Expression of HVEM is found to be upregulated in several cancers. The term "HVEM expressing cells" refers to a cell that expresses HVEM. Exemplary cells are T cells, B cells, NK cells and myeloid cells. Binding of BTLA and/or CD160 to HVEM can have inhibitory effects, binding of LIGHT and/or TNFβ to HVEM can have stimulatory effects.

The term "extra-cellular" literally means outside the cells. The term "extra-cellular part" refers to a part of a molecule that is on the outside of the cell membrane. This part of the molecule can be available for interactions with other molecules outside the cell. HVEM has an extracellular part defined by a cysteine-rich signature. The extracellular domain of HVEM contains four cysteine rich domains, namely CRD1-CRD4, and a linker. Without being bound by theory it is believed that interactions between BTLA and CD160 with HVEM occur via the CRD1 of HVEM, whereas interactions between LIGHT and TNFβ with HVEM occur via the CRD2 and CRD3 of HVEM.

In one embodiment, an antibody of the invention binds the CRD1 of HVEM.

HVEM is present on the cell surface of most hematopoietic cell lineages, among which T cells, B cells, NK cells and myeloid cells. Expression of HVEM is found to be downregulated in T cells and B cells upon activation, and is upregulated in some cancers. Non limiting examples are: melanoma, esophageal squamous cell carcinoma, hepatocellular carcinoma, and colorectal cancer. The term "human HVEM expressing cell" refers to a cell that expresses human HVEM. Exemplary cells are T cells, B cells, NK cells and myeloid cells.

The term "to prevent binding" refers to the ability of the antibody or antigen-binding fragment thereof to prevent binding of a ligand to a protein, when said protein is bound by said antibody. Where reference is made to "prevent binding", this can also be interpreted as "blocking". If binding of a ligand is prevented with more than ($>$) 70% compared to binding of the ligand in absence of the antibody, binding of said ligand is said to be prevented. If binding of a ligand is prevented with more than or equals ($\geq$) 30% but less than or equals ($\leq$) 70% compared to binding of the ligand in absence of the antibody, binding said ligand is said to be partially prevented. Binding of a ligand is said not to be affected when binding of the ligand is prevented with less than ($<$) 30% compared to binding of the ligand in absence of the antibody. If binding of a ligand is increased with more than ($>$) 30%, compared to binding of the ligand in absence of the antibody, binding of said ligand is said to be enhanced.

An antibody or antigen-binding fragment as disclosed herein prevents binding of BTLA to an extracellular part of HVEM on HVEM expressing cells when said antibody is bound to said extracellular part of HVEM. Exemplary antibodies are: 45H6, 11H7, 36H12, 48H6, and 49G4.

In a further embodiment, an anti-HVEM antibody or antigen-binding fragment thereof as disclosed herein prevents binding of BTLA to an extracellular part of HVEM on HVEM expressing cells and does not prevent or partially prevents binding of LIGHT to an extracellular part of HVEM on HVEM expressing cells when said antibody is bound to said extracellular part of HVEM. Exemplary antibodies are: 45H6, 11H7, 36H12, 48H6, and 49G4.

In a further embodiment, an anti-HVEM antibody or antigen-binding fragment thereof as disclosed herein prevents binding of BTLA to an extracellular part of HVEM on HVEM expressing cells and partially prevents binding of LIGHT to an extracellular part of HVEM on HVEM expressing cells when said antibody is bound to said extracellular part of HVEM. Exemplary antibodies are: 45H6, 36H12, 48H6, and 49G4.

In a further embodiment, an anti-HVEM antibody or antigen-binding fragment thereof as disclosed herein prevents binding of BTLA to an extracellular part of HVEM on HVEM expressing cells and does not prevent binding of LIGHT to an extracellular part of HVEM on HVEM expressing cells when said antibody is bound to said extracellular part of HVEM. An exemplary antibody is: 11H7.

In a further embodiment, an anti-HVEM antibody as disclosed herein prevents binding of BTLA to an extracellular part of HVEM on HVEM expressing cells and partially prevents binding of CD160 to an extracellular part of HVEM on HVEM expressing cells when said antibody is bound to said extracellular part of HVEM. Exemplary antibodies are: 45H6, 11H7, 36H12, 48H6, and 49G4.

In a further embodiment, an anti-HVEM antibody or antigen-binding fragment thereof as disclosed herein prevents binding of BTLA to an extracellular part of HVEM on HVEM expressing cells, partially prevents binding of CD160 and LIGHT to an extracellular part of HVEM on HVEM expressing cells when said antibody is bound to said extracellular part of HVEM. Exemplary antibodies are: 45H6, 36H12, 48H6, and 49G4.

In a further embodiment, an anti-HVEM antibody or antigen-binding fragment thereof as disclosed herein prevents binding of BTLA to an extracellular part of HVEM on HVEM expressing cells, partially prevents binding of CD160 to an extracellular part of HVEM on HVEM expressing cells, and does not prevent binding of LIGHT to an extracellular part of HVEM on HVEM expressing cells when said antibody is bound to said extracellular part of HVEM. An exemplary antibody is: 11H7.

Typically, an anti-HVEM antibody or antigen binding fragment thereof as described above binds the CRD1 domain of the HVEM protein.

Binding of BTLA, CD160 and LIGHT to HVEM is preferably measured with a method described in the examples. An exemplary method is described, for instance, in example 6b, of which the results are depicted in FIG. 6A-D. Preferably HEK293F cells, transfected with a full-length HVEM are used. Preferably, said cells stably express full length HVEM on the plasma membrane. A test antibody is examined using HVEM-expressing HEK293F cells. Cells are incubated with the anti-HVEM antibody of interest. After washing, cells are incubated with a biotin-labelled or his-tagged human BTLA, CD160 or LIGHT. After washing, the label or tag is detected with fluorescently labelled streptavidin or anti-his antibody. Binding of BTLA, CD160 or LIGHT to HVEM expressed on cells can be measured by detecting the fluorescence using a flow cytometer (FACS). The capacity to prevent binding is then determined by comparing the percentage of BTLA, CD160 or LIGHT bound to HVEM in presence of an anti-HVEM antibody to the percentage bound in presence of a control antibody that does not bind HVEM. Less binding of BTLA, CD160 or LIGHT to HVEM indicates a stronger blocking capacity of the antibody.

The term "to displace" refers to the capacity of a first entity to remove a second entity from its position, whereby the second entity is replaced by the first entity. If more than ($>$) 70% of a ligand bound to the extracellular part of HVEM is displaced compared to presence of the ligand in absence of the antibody, said ligand is said to be displaced. If more than or equals ($\geq$) 30% but less than or equals ($\leq$) 70% of a ligand bound to the extracellular part of HVEM is displaced compared to presence of the ligand in absence of the antibody, said ligand is said to be partially displaced. A ligand is said not to be displaced if less than ($<$) 30% of the ligand bound to the extracellular part of HVEM is displaced compared to presence of the ligand in absence of the antibody. If binding of a ligand is increased with more than (>) 30% compared to presence of the ligand in absence of the antibody, binding of said ligand is to be enhanced.

An antibody or antigen-binding fragment as disclosed herein prevents binding of BTLA to an extracellular part of HVEM on HVEM expressing cells. Said antibody preferably displaces BTLA bound to the extracellular part of HVEM on HVEM expressing cells. Exemplary antibodies are: 45H6, 11H7, 36H12, 48H6, and 49G4

In a further embodiment, an anti-HVEM antibody or antigen-binding fragment thereof as disclosed herein prevents binding of BTLA to an extracellular part of HVEM on HVEM expressing cells and does not prevent or partially prevents binding of LIGHT to an extracellular part of HVEM on HVEM expressing cells when said antibody is bound to said extracellular part of HVEM. Preferably said antibody displaces BTLA bound to the extracellular part of HVEM on HVEM expressing cells and does not displace LIGHT bound to the extracellular part of HVEM on HVEM expressing cells. Exemplary antibodies are: 45H6, 11H7, 36H12, 48H6, and 49G4.

In a further embodiment, an anti-HVEM antibody or antigen-binding fragment thereof as disclosed herein prevents binding of BTLA to an extracellular part of HVEM on HVEM expressing cells and partially prevents binding of LIGHT to an extracellular part of HVEM on HVEM expressing cells when said antibody is bound to said extracellular part of HVEM. Preferably said antibody displaces BTLA bound to the extracellular part of HVEM on HVEM expressing cells and does not displace LIGHT bound to the extracellular part of HVEM on HVEM expressing cells. Exemplary antibodies are: 45H6, 36H12, 48H6, and 49G4

In a further embodiment, an anti-HVEM antibody or antigen-binding fragment thereof as disclosed herein prevents binding of BTLA to an extracellular part of HVEM on HVEM expressing cells and does not prevent binding of LIGHT to an extracellular part of HVEM on HVEM expressing cells when said antibody is bound to said extracellular part of HVEM. Preferably said antibody displaces BTLA bound to the extracellular part of HVEM on HVEM expressing cells, and does not displace LIGHT bound to the extracellular part of HVEM on HVEM expressing cells. An exemplary antibody is: 11H7.

In a further embodiment, an anti-HVEM antibody as disclosed herein prevents binding of BTLA to an extracellular part of HVEM on HVEM expressing cells and partially prevents binding of CD160 to an extracellular part of HVEM on HVEM expressing cells when said antibody is bound to said extracellular part of HVEM. Preferably said antibody displaces BTLA bound to the extracellular part of HVEM on HVEM expressing cells and partially displaces CD160 bound to the extracellular part of HVEM on HVEM expressing cells. Exemplary antibodies are: 45H6, 11H7, 36H12, 48H6, and 49G4

In a further embodiment, an anti-HVEM antibody or antigen-binding fragment thereof as disclosed herein prevents binding of BTLA to an extracellular part of HVEM on HVEM expressing cells and partially prevents binding of CD160 and LIGHT to an extracellular part of HVEM on HVEM expressing cells when said antibody is bound to said extracellular part of HVEM. Preferably said antibody displaces BTLA bound to the extracellular part of HVEM on HVEM expressing cells, partially displaces CD160 bound to the extracellular part of HVEM on HVEM expressing cells, and does not displace LIGHT bound to the extracellular part of HVEM on HVEM expressing cells. Exemplary antibodies are: 45H6, 36H12, 48H6, and 49G4

In a further embodiment, an anti-HVEM antibody or antigen-binding fragment thereof as disclosed herein prevents binding of BTLA to an extracellular part of HVEM on HVEM expressing cells, partially prevents binding of CD160 to an extracellular part of HVEM on HVEM expressing cells when said antibody is bound to said extracellular part of HVEM, and does not prevent binding of LIGHT to an extracellular part of HVEM on HVEM expressing cells. Preferably said antibody displaces BTLA bound to the extracellular part of HVEM on HVEM expressing cells, partially displaces CD160 bound to the extracellular part of HVEM on HVEM expressing cells, and does not displace LIGHT bound to the extracellular part of HVEM on HVEM expressing cells. An exemplary antibody is: 11H7.

Typically, an anti-HVEM antibody or antigen binding fragment thereof as described above binds the CRD1 domain of the HVEM protein.

In order to analyze if anti-HVEM antibodies as disclosed herein have the capacity to displace ligands bound to the extracellular part of HVEM, the skilled person can use a number of known suitable assays. One of the suitable methods is disclosed in the example section. The assay is described in detail in e.g. example 6c. Preferably HEK293F cells, transfected with full-length HVEM are used. Preferably, said cells are stably expressing full length HVEM on the plasma membrane. The cells are incubated with a soluble ligand (e.g., biotin-labelled or his-tagged BTLA, CD160 or LIGHT). Subsequently, the cells are incubated with an antibody of the invention, binding the extracellular part of HVEM. After washing, ligand bound to the cells is detected using fluorescently labelled streptavidin or anti-his antibody After washing, the fluorescent signal of the antibody bound to the ligand can be detected using a flow cytometer (FACS). The amount of ligand bound to the extracellular part of HVEM indicates the capacity of the anti-HVEM antibody to replace the ligand bound to the extracellular part of HVEM of the antibody. A lower fluorescent signal of the ligand indicates a stronger capacity to replace of the anti-HVEM antibody. A preferred method is described in the examples of which the results are, for example, depicted in FIG. 7A-D. Percentages of displacement are typically given as a percentage compared to binding of the ligand to HVEM in presence of a non-specific antibody, under otherwise identical conditions. Displacement can be measured using metabolically active cells (for instance incubated overnight at 37° C.) or using metabolically inactive cells (for instance incubated at 4° C. in the presence of sodium azide).

Without being bound by theory, it is believed that activation of T cells is inhibited upon interaction of BTLA and/or CD160 with HVEM, even in presence of LIGHT and/or TNFβ. An antibody as disclosed herein is useful to target cells expressing HVEM. Binding of an antibody as disclosed herein displaces BTLA and preferably at least partially displaces CD160 bound to the extracellular part of HVEM, but does not displace LIGHT bound to the extracellular part of HVEM. As a result, due to the ability to prevent binding of BTLA and CD160 and the capacity to displace BTLA and preferably partially displace CD160, the inhibitory effect of BTLA and CD160 on T-cell activation is suppressed. A cell that has bound an antibody as disclosed herein is available to respond to other stimuli, such as binding of LIGHT or TNFβ to HVEM.

The full length cynomolgus (*Macaca fascicularis*) monkey HVEM protein (Met1-Ser280; NCBI Reference sequence: XP_005545061.1, see SEQ ID NO. 5) has a similar amino acid sequence as human HVEM and exhibits 82% on homology to the human HVEM protein (Met1-His283; Swiss-Prot no. Q92956.3, see SEQ ID NO. 1). The predicted amino acid sequence of the extracellular domain of cynomolgus monkey HVEM (i.e., Leu39-Val203; NCBI Reference Sequence: XP_005545061.1) shows 87% homology with the amino acid sequence of the extracellular domain of human HVEM protein (i.e., Leu 39-Val202; Swiss-Prot no. Q92956.3).

Substitutions of amino acids of human HVEM with the corresponding amino acids of cynomolgus HVEM can be used to test the specificity and cross-specificity of the antibodies. In one embodiment, an antibody of the invention binds human HVEM and is cross-specific for cynomolgus (*Macaca fascicularis*) monkey HVEM. Exemplary antibodies are: 45H6, 11H7, 48H6 and 49G4. Without being bound by theory, it is believed that such antibodies are particularly suitable for binding to human HVEM carrying mutations. Furthermore, such antibodies are suitable for toxicity testing.

One aspect of the disclosure provides an antibody that binds an extracellular part of HVEM on HVEM expressing cells comprising a heavy chain variable region with the CDR1, CDR2 and CDR3 sequence of SEQ ID NO: 26-28 with 0, 1 or 2 amino acid insertions, deletions, substitutions or additions, and a light chain variable region with the CDR1, CDR2, CDR3 sequence of SEQ ID NO: 29-31 with 0, 1 or 2 amino acid insertions, deletions, substitutions or additions. Preferably, the antibody that binds an extracellular part of HVEM on HVEM expressing cells comprises a heavy chain variable region with the CDR1, CDR2 and CDR3 sequence of SEQ ID NO: 26-28 and a light chain variable region with the CDR1, CDR2, CDR3 sequence of SEQ ID NO: 29-31.

In a further aspect, the disclosure provides an antibody that binds an extracellular part of HVEM on HVEM expressing cell comprising a heavy chain variable region with the amino acid sequence of SEQ ID NO: 24 with 0, 1, 2, 3, 4, 5, 6, 7, 8, 9 or 10 amino acid insertions, deletions, substitutions or additions and a light chain variable region with the amino acid sequence of SEQ ID NO: 25 with 0, 1, 2, 3, 4, 5, 6, 7, 8, 9 or 10 amino acid insertions, deletions, substitutions or additions. In a preferred embodiment, the 0, 1, 2, 3, 4, 5, 6, 7, 8, 9 or 10 amino acid insertions, deletions, substitutions or additions are located in the framework regions of the light and/or heavy chain variable region. Preferably, the antibody that binds an extracellular part of HVEM on HVEM expressing cell comprises a heavy chain variable region with the amino acid sequence of SEQ ID NO: 24 and a light chain variable region with the amino acid sequence of SEQ ID NO: 25. An exemplary antibody with these characteristics is 45H6.

One aspect of the disclosure provides an antibody that binds an extracellular part of HVEM on HVEM expressing cells comprising a heavy chain variable region with the CDR1, CDR2 and CDR3 sequence of SEQ ID NO: 42-44 with 0, 1 or 2 amino acid insertions, deletions, substitutions or additions, and a light chain variable region with the CDR1, CDR2, CDR3 sequence of SEQ ID NO: 45-47 with 0, 1 or 2 amino acid insertions, deletions, substitutions or additions. Preferably, the antibody that binds an extracellular part of HVEM on HVEM expressing cells comprises a heavy chain variable region with the CDR1, CDR2 and CDR3 sequence of SEQ ID NO: 42-44 and a light chain variable region with the CDR1, CDR2, CDR3 sequence of SEQ ID NO: 45-47.

In a further aspect, the disclosure provides an antibody that binds an extracellular part of HVEM on HVEM expressing cell comprising a heavy chain variable region with the amino acid sequence of SEQ ID NO: 40 with 0, 1, 2, 3, 4, 5, 6, 7, 8, 9 or 10 amino acid insertions, deletions, substitutions or additions and a light chain variable region with the amino acid sequence of SEQ ID NO: 41 with 0, 1, 2, 3, 4, 5, 6, 7, 8, 9 or 10 amino acid insertions, deletions, substitutions or additions. In a preferred embodiment, the 0, 1, 2, 3, 4, 5, 6, 7, 8, 9 or 10 amino acid insertions, deletions, substitutions or additions are located in the framework regions of the light and/or heavy chain variable region. Preferably, the antibody that binds an extracellular part of HVEM on HVEM expressing cell comprises a heavy chain variable region with the amino acid sequence of SEQ ID NO: 40 and a light chain variable region with the amino acid sequence of SEQ ID NO: 41. An exemplary antibody with these characteristics is 11H7.

One aspect of the disclosure provides an antibody that binds an extracellular part of HVEM on HVEM expressing cells comprising a heavy chain variable region with the CDR1, CDR2 and CDR3 sequence of SEQ ID NO: 18-20 with 0, 1 or 2 amino acid insertions, deletions, substitutions or additions, and a light chain variable region with the CDR1, CDR2, CDR3 sequence of SEQ ID NO: 21-23 with 0, 1 or 2 amino acid insertions, deletions, substitutions or additions. Preferably, the antibody that binds an extracellular part of HVEM on HVEM expressing cells comprises a heavy chain variable region with the CDR1, CDR2 and CDR3 sequence of SEQ ID NO: 18-20 and a light chain variable region with the CDR1, CDR2, CDR3 sequence of SEQ ID NO: 21-23.

In a further aspect, the disclosure provides an antibody that binds an extracellular part of HVEM on HVEM expressing cell comprising a heavy chain variable region with the amino acid sequence of SEQ ID NO: 16 with 0, 1, 2, 3, 4, 5, 6, 7, 8, 9 or 10 amino acid insertions, deletions, substitutions or additions and a light chain variable region with the amino acid sequence of SEQ ID NO: 17 with 0, 1, 2, 3, 4, 5, 6, 7, 8, 9 or 10 amino acid insertions, deletions, substitutions or additions. In a preferred embodiment, the 0, 1, 2, 3, 4, 5, 6, 7, 8, 9 or 10 amino acid insertions, deletions, substitutions or additions are located in the framework regions of the light and/or heavy chain variable region. Preferably, the antibody that binds an extracellular part of HVEM on HVEM expressing cell comprises a heavy chain variable region with the amino acid sequence of SEQ ID NO: 16 and a light chain variable region with the amino acid sequence of SEQ ID NO: 17. An exemplary antibody with these characteristics is 36H12.

One aspect of the disclosure provides an antibody that binds an extracellular part of HVEM on HVEM expressing cells comprising a heavy chain variable region with the CDR1, CDR2 and CDR3 sequence of SEQ ID NO: 34-36 with 0, 1 or 2 amino acid insertions, deletions, substitutions or additions, and a light chain variable region with the CDR1, CDR2, CDR3 sequence of SEQ ID NO: 37-39 with 0, 1 or 2 amino acid insertions, deletions, substitutions or additions. Preferably, the antibody that binds an extracellular part of HVEM on HVEM expressing cells comprises a heavy chain variable region with the CDR1, CDR2 and CDR3 sequence of SEQ ID NO: 34-36 and a light chain variable region with the CDR1, CDR2, CDR3 sequence of SEQ ID NO: 37-39.

In a further aspect, the disclosure provides an antibody that binds an extracellular part of HVEM on HVEM expressing cell comprising a heavy chain variable region with the amino acid sequence of SEQ ID NO: 32 with 0, 1, 2, 3, 4, 5, 6, 7, 8, 9 or 10 amino acid insertions, deletions, substitutions or additions and a light chain variable region with the amino acid sequence of SEQ ID NO: 33 with 0, 1, 2, 3, 4, 5, 6, 7, 8, 9 or 10 amino acid insertions, deletions, substitutions or additions. In a preferred embodiment, the 0, 1, 2, 3, 4, 5, 6, 7, 8, 9 or 10 amino acid insertions, deletions, substitutions or additions are located in the framework regions of the light and/or heavy chain variable region. Preferably, the antibody that binds an extracellular part of HVEM on HVEM expressing cell comprises a heavy chain variable region with the amino acid sequence of SEQ ID NO: 32 and a light chain variable region with the amino acid sequence of SEQ ID NO: 33. An exemplary antibody with these characteristics is 48H6.

One aspect of the disclosure provides an antibody that binds an extracellular part of HVEM on HVEM expressing cells comprising a heavy chain variable region with the CDR1, CDR2 and CDR3 sequence of SEQ ID NO: 50-52 with 0, 1 or 2 amino acid insertions, deletions, substitutions or additions, and a light chain variable region with the CDR1, CDR2, CDR3 sequence of SEQ ID NO: 53-55 with 0, 1 or 2 amino acid insertions, deletions, substitutions or additions. Preferably, the antibody that binds an extracellular part of HVEM on HVEM expressing cells comprises a heavy chain variable region with the CDR1, CDR2 and CDR3 sequence of SEQ ID NO: 50-52 and a light chain variable region with the CDR1, CDR2, CDR3 sequence of SEQ ID NO: 53-55.

In a further aspect, the disclosure provides an antibody that binds an extracellular part of HVEM on HVEM expressing cell comprising a heavy chain variable region with the amino acid sequence of SEQ ID NO: 48 with 0, 1, 2, 3, 4, 5, 6, 7, 8, 9 or 10 amino acid insertions, deletions, substitutions or additions and a light chain variable region with the amino acid sequence of SEQ ID NO: 49 with 0, 1, 2, 3, 4, 5, 6, 7, 8, 9 or 10 amino acid insertions, deletions, substitutions or additions. In a preferred embodiment, the 0, 1, 2, 3, 4, 5, 6, 7, 8, 9 or 10 amino acid insertions, deletions, substitutions or additions are located in the framework regions of the light and/or heavy chain variable region. Preferably, the antibody that binds an extracellular part of HVEM on HVEM expressing cell comprises a heavy chain variable region with the amino acid sequence of SEQ ID NO: 48 and a light chain variable region with the amino acid sequence of SEQ ID NO: 49. An exemplary antibody with these characteristics is 49G4.

In one aspect, an anti-HVEM antibody or antigen-binding fragment referred to herein by sequence prevents binding of BTLA to an extracellular part of HVEM on HVEM expressing cells when said antibody is bound to said extracellular part of HVEM. Preferably said antibody displaces BTLA bound to the extracellular part of HVEM on HVEM expressing cells. Exemplary antibodies are: 45H6, 11H7, 36H12, 48H6, and 49G4

In a further aspect, an anti-HVEM antibody or antigen-binding fragment referred to herein by sequence prevents binding of BTLA to an extracellular part of HVEM on HVEM expressing cells and partially prevents binding of LIGHT to an extracellular part of HVEM on HVEM expressing cells when said antibody is bound to said extracellular part of HVEM. Preferably said antibody displaces BTLA bound to the extracellular part of HVEM on HVEM expressing cells and does not displace LIGHT bound to the extracellular part of HVEM on HVEM expressing cells. Exemplary antibodies are: 45H6, 36H12, 48H6, and 49G4

In a further aspect, an anti-HVEM antibody or antigen-binding fragment referred to herein by sequence prevents binding of BTLA to an extracellular part of HVEM on HVEM expressing cells and does not prevent binding of LIGHT to an extracellular part of HVEM on HVEM expressing cells when said antibody is bound to said extracellular part of HVEM. Preferably said antibody displaces BTLA bound to the extracellular part of HVEM on HVEM expressing cells, and does not displace LIGHT bound to the extracellular part of HVEM on HVEM expressing cells. An exemplary antibody is: 11H7.

In a further aspect, an anti-HVEM antibody or antigen-binding fragment referred to herein by sequence prevents binding of BTLA to an extracellular part of HVEM on HVEM expressing cells and partially prevents binding of CD160 to an extracellular part of HVEM on HVEM expressing cells when said antibody is bound to said extracellular part of HVEM. Preferably said antibody displaces BTLA bound to the extracellular part of HVEM on HVEM expressing cells and partially displaces CD160 bound to the extracellular part of HVEM on HVEM expressing cells. Exemplary antibodies are: 45H6, 11H7, 36H12, 48H6, and 49G4

In a further aspect, an anti-HVEM antibody or antigen-binding fragment referred to herein by sequence prevents binding of BTLA to an extracellular part of HVEM on HVEM expressing cells and partially prevents binding of CD160 and LIGHT to an extracellular part of HVEM on HVEM expressing cells when said antibody is bound to said extracellular part of HVEM. Preferably said antibody displaces BTLA bound to the extracellular part of HVEM on HVEM expressing cells, partially displaces CD160 bound to the extracellular part of HVEM on HVEM expressing cells, and does not displace LIGHT bound to the extracellular part of HVEM on HVEM expressing cells. Exemplary antibodies are: 45H6, 36H12, 48H6, and 49G4

In a further aspect, an anti-HVEM antibody or antigen-binding fragment referred to herein by sequence prevents binding of BTLA to an extracellular part of HVEM on HVEM expressing cells, partially prevents binding of CD160 to an extracellular part of HVEM on HVEM expressing cells, and does not prevent binding of LIGHT to an extracellular part of HVEM on HVEM expressing cells when said antibody is bound to said extracellular part of HVEM, wherein said antibody displaces BTLA bound to the extracellular part of HVEM on HVEM expressing cells, partially displaces CD160 bound to the extracellular part of HVEM on HVEM expressing cells, and does not displace LIGHT bound to the extracellular part of HVEM on HVEM expressing cells. An exemplary antibody is: 11H7

Typically, an anti-HVEM antibody or antigen binding fragment thereof referred to herein by sequence binds the CRD1 domain of the HVEM protein.

An anti-HVEM antibody or antigen binding fragment thereof of the disclosure preferably comprises a heavy chain variable region and a light chain variable region as described herein. Such an antibody has good characteristics. It is of course possible to generate variants of such an original antibody by modifying one or more amino acids therein. Many of such variants will behave more or less similar when compared to said original. Such variants are also included in the scope of the disclosure.

Variants can have amino acid substitutions, insertions, deletions, or additions with respect to the sequence of the original antibody. An amino acid substitution is the replacement of an amino acid with another amino acid. Preferably, the amino acid is preplaced by an amino acid having similar chemical properties, which is often called conservative substitution. Amino acid deletions result in the deletion of one or multiple amino acids form the sequence. Amino acid insertions result in one or more additional amino acids in the sequence. Amino acid addition results in one or more amino acids at the start or end of the amino acid sequence.

A non-limiting example of such a modification is an antibody comprising a pyroglutamate instead of a glutamate. Other non-limiting examples of such modifications are an insertion, deletion, inversion and/or substitution of one or more amino acids when compared to said original antibody. Preferably amino acid substitutions, insertions, deletions, or additions are outside the CDR's of the variable domain. Preferably amino acid substitutions, insertions, deletions, or additions are within the framework regions of the variable region and/or in the constant region of the antibody. HVEM binding of variants can be tested as described herein.

In some embodiments, the constant region of an antibody of the invention is the constant region of an IgG, IgA, IgD, IgE or IgM antibody, such as IgG1, IgG2, IgG3 or IgG4 antibody. The constant regions may comprise modifications such as amino acid substitutions to confer specific properties to the constant regions. For instance, mutation of the IgG4 hinge region to render the antibody more stable towards the exchange of half-molecules. Other modifications affect half-life of the antibody, add or remove a glycosylation site, improve production, improve the homogeneity of the antibody product produced in large scale fermenters etc.

An antibody of the invention is preferably a murine IgG1, a human IgG1 mutated in the constant region to reduce or prevent complement activation or Fc receptor interactions, or a human IgG4, or a human IgG4 mutated to prevent the exchange of half-molecules with other IgG4 molecules.

Some variation in the CDRs (CDR1-CDR2-CDR3) of an antibody as disclosed herein is allowed. Typically, between about 0-2 amino acid substitutions, insertions, deletions, or additions are allowed in one CDR. Often more amino acid changes than 2 are allowed.

An antibody of the invention can have a heavy chain CDR1, CDR2, or CDR3 with 0-5, preferably 0-2, more preferably 2, 1, or 0 amino acid substitutions, insertions, deletions, or additions with respect to naturally occurring heavy chain CDR1, CDR2, or CDR3.

Such an antibody can have a light chain CDR1, CDR2, or CDR3 with 0-5, preferably 0-2, more preferably 0-1, more preferably 0 amino acid substitutions, insertions, deletions, or additions with respect to naturally occurring light chain CDR1, CDR2, or CDR3.

Some variation in the variable regions of an antibody as disclosed herein is allowed. Typically, between about 0-10 amino acid substitutions are allowed in a variable chain. Often more amino acid changes than 10 are allowed.

An antibody of the invention can have a heavy chain variable region with 0-15, preferably 0-10, more preferably 0-5, more preferably 5, 4, 3, 2, 1, or 0 amino acid substitutions, insertions, deletions, or additions with respect to a naturally occurring variable heavy chain.

Such an antibody can have a light chain variable region with 0-15, preferably 0-10, more preferably 0-5, more preferably 5, 4, 3, 2, 1, or 0 amino acid substitutions, insertions, deletions, or additions with respect to a naturally occurring light chain variable region.

Some variations in the constant region of an antibody as disclosed herein is allowed. Typically, between about 0-10 amino acid substitutions are allowed in the constant region. Often more amino acid changes than 10 are allowed. An antibody of the invention can have a heavy chain constant region (CH1-CH2-CH3) with 0-15, preferably 0-10, more preferably 0-5, more preferably 5, 4, 3, 2, 1, or 0 amino acid substitutions with respect to a naturally occurring heavy chain constant region (CH1-CH2-CH3). Such an antibody can have a light chain constant region with 0-5, preferably 5, 4, 3, 2, 1, or 0 amino acid substitutions with respect to a naturally occurring light chain constant region.

Some variation in IgG4 occurs in nature and/or is allowed without changing the immunological properties of the resulting antibody. An antibody with an IgG4 constant region or a mutated IgG1 constant region has at least most of the pharmacological properties of an antibody but does not bind complement, and will thus not induce depletion of the cells its binds to in vivo. Preferably said constant region is a constant region of a human antibody (chimeric).

Preferably, said constant region is a region that is deficient in complement activation, preferably a human IgG4 constant region or a mutated human IgG1 constant region.

HVEM binding by an antibody and antigen binding fragments thereof disclosed herein can be confirmed in a number of suitable assays known to the skilled person. Such assays include, e.g., affinity assays, e.g., western blots, radioimmunoassay, FACS, and ELISA (enzyme-linked immunosorbent assay). The examples (e.g., Example 2 c and 6a) describe in detail some of the many assays which can be used to measure HVEM binding, as well as a method to determine the relative binding affinity of an antibody for human HVEM.

In a further aspect, the disclosure provides a nucleic acid molecule or nucleic acid molecules encoding an antibody as disclosed herein or an antigen binding fragment thereof as disclosed herein. Further provided is a nucleic acid molecule encoding a variable region as disclosed herein. A nucleic acid as used in the disclosure is typically but not exclusively a ribonucleic acid (RNA) or a deoxyribonucleic acid (DNA). Based on the genetic code, a skilled person can determine the nucleic acid sequence which encode an antibody variant as disclosed herein. Based on the degeneracy of the genetic code, sixty-four codons may be used to encode twenty amino acids and translational terminal signal. As is known to a skilled person, codon usage bias in different organisms can affect gene expression level. Various computational tools are available to the skilled person in order to optimize codon usage depending on which organisms the desired nucleic acid will be expressed.

In a further aspect, the disclosure provides a vector comprising a nucleic acid sequence molecule as described herein. The term "vector" as used herein refers to a nucleic acid molecule, such as a plasmid, bacteriophage or animal virus, capable of introducing a heterologous nucleic acid sequence into a host cell. A vector according to the invention allows the expression or production of an antibody of the invention encoded by the heterologous nucleic acid sequence in a host cell. A vector used in accordance with the invention is for instance derived from an animal virus, examples of which include, but not limited to, vaccinia virus (including attenuated derivatives such as the Modified Vaccinia virus Ankara, MVA), Newcastle Disease virus (NDV), adenovirus or retrovirus. A vector according to the invention preferably comprises an expression cassette comprising a promoter that is suitable for initiation of transcription of an antibody according to the invention in the selected host cells. Examples of suitable promoters for expression of polypeptides according to the invention in eukaryotic host cells include, but are not limited to, beta-actin promoter, immunoglobin promoter, 5S RNA promoter, or virus derived promoters such as cytomegalovirus (CMV), Rous sarcoma virus (RSV) and Simian virus 40 (SV40) promoters for mammalian hosts.

When a nucleic acid molecule or nucleic acid molecules as disclosed herein is/are expressed in a cell, the cell may produce an antibody according to the disclosure. Therefore, in one embodiment, a cell is provided comprising an antibody, a nucleic acid molecule or molecules and/or a vector according to the disclosure. The host cells may be a mammalian, insect, plant, bacterial or yeast cell. Said cell is preferably an animal cell, preferably a mammalian cell, most preferably a human cell. Examples of mammalian cell lines suitable as host cells include a hybridoma cell, a Chinese hamster ovary (CHO) cell, an NSO cell, or a PER-C6™ cell. For the purpose of the disclosure a suitable cell is any cell capable of comprising and preferably of producing said antibodies and/or said nucleic acids. The disclosure further encloses cell cultures that comprise said cells.

The term "host cell" refers to a cell into which an expression vector has been introduced. The term encompasses not only the particular subject cell but also the progeny of such a cell. Because certain modifications may occur in successive generations due to either environmental influences or mutation, such progeny may not be identical to the parent cell but are still included within the scope of the term "host cell."

An antibody as disclosed herein can be produced by any method known to a skilled person. In a preferred embodiment, the antibodies are produced using a cell, preferably wherein the cell is a hybridoma cell, a CHO cell, an NSO cell or a PER-C6™ cell. In a particular preferred embodiment said cell is a CHO cell, preferably said cell is cultured in serum free medium. This includes harvesting said antibody form said culture. The antibody is preferably purified form the medium, preferably said antibody is affinity purified. Alternatively, said antibodies can be generated synthetically.

Various institutions and companies have developed cell lines for the large-scale production of antibodies, for instance for clinical use. These cells are also used for other purposes such as the production of proteins. Cell lines developed for industrial scale production of proteins and antibodies are herein further referred to as industrial cell lines. Thus, a preferred embodiment of the disclosure provides the use of a cell line developed for the large-scale production of said antibodies.

An antibody according to the invention exhibits a number of activities that can be advantageously used in therapeutic and non-therapeutic uses. In particular, antibodies according to the invention are useful for the treatment of an individual. Preferably, the antibodies according to the invention are useful for the treatment of immune related diseases or prevention against immune related diseases. In a preferred embodiment the antibodies according to the invention are useful for the treatment of cancer. In some embodiments, an antibody according to the invention is preferably used in therapy, preferably human therapy. In some embodiments, an antibody as disclosed herein may be used for research purposes. For example, in in vitro experiments, cell culture, organotypic culture and in vivo models.

Also described are methods for treatment of cancer. Examples of cancers are e.g.: melanoma, esophageal squamous cell carcinoma, hepatocellular carcinoma, and colorectal cancer.

The invention provides a method for the treatment of a subject suffering from cancer comprising administering to said subject a therapeutically effective amount of an antibody as disclosed herein. Further provided is a method for the preparation of a medicament for the treatment of a subject suffering from cancer. The disclosure describes methods for preventing inhibition of T-cell activation by preventing binding of BTLA and HVEM, and CD160 and HVEM.

The invention provides a method for the treatment of a subject suffering from inflammatory diseases comprising administering to said subject a therapeutically effective amount of an antibody as disclosed herein. Further provided is a method for the preparation of a medicament for the treatment of a subject suffering from inflammatory diseases. The disclosure describes methods for preventing inhibition of T-cell activation by preventing binding of BTLA and HVEM, and CD160 and HVEM.

The disclosure further comprises a pharmaceutical composition comprising an antibody or antigen binding fragment thereof as disclosed herein, or a nucleic acid encoding same, or a cell comprising an antibody or antigen binding fragment thereof as disclosed herein, or a nucleic acid encoding same. Provided are pharmaceutical compositions comprising a polypeptide according to the invention or a pharmaceutically acceptable salt thereof, and at least one pharmaceutically acceptable carrier, diluent and/or excipient. Such compositions are especially suited for use as a medicament. The compositions may be in any suitable forms, such as liquid, semi-solid and solid dosage forms. The dosage and scheduling for the formulation, which is selected can be determined by standard procedures, well known by a skilled person. Such procedures involve extrapolating and estimating dosing schedule form animal models, and then determining the optimal dosage in a human clinical dose ranging study. The dosage in pharmaceutical compositions will vary depending upon a number of factors, such as the desired release and pharmacodynamic characteristics.

One embodiment of the disclosure provides a pharmaceutical composition as described herein for use as a prophylactic or in the treatment of cancer and/or immune-related disorders.

Further provided are methods to modulate HVEM signalling activity. The term "to modulate" refers to the activity of adjusting an output signal of a system. The output signal or output can be adjusted in such a way that an inhibitory output signal becomes stimulatory and vice versa. The invention provides a method for the modulation of HVEM signalling, comprising administering to said subject a therapeutically effective amount of an antibody as disclosed herein. Without being bound by theory, it is believed that HVEM delivers coinhibitory signals to a T cell expressing BTLA or CD160. LIGHT and TNFβ, on the other hand deliver costimulatory signals to a T cell when interacting with HVEM expressed on the T cell. When LIGHT and/or TNFβ, BTLA and/or CD160 simultaneously interact with HVEM, the net result is an inhibitory signal for T-cell activation. This interaction is bidirectional: HVEM induces inhibitory signals in T cells after interaction with BTLA and CD160 on T cells, while both BTLA and CD160 act as activating ligands for HVEM resulting in NFκB activation. Furthermore, LIGHT delivers costimulatory signals to a T cell when interacting with HVEM expressed on the T cell, and HVEM has also been implicated to transmit costimulatory signals to a T cell when interacting with LIGHT expressed by the T cell. However, LIGHT does not contain an obvious signalling motif and its mechanism for signalling is incompletely defined.

Costimulatory and co-inhibitory signalling relayed by HVEM and BTLA in a T cell can be measured in levels of NFκB or NFAT, as well as the release of IL-2, TNFα and IFNγ. Methods to measure levels of NFAT are known in the art. An exemplary method is described, for instance, in example 3c, of which the results are depicted in FIG. 4A-B. Methods to measure levels of NFκB are known in the art. An exemplary method is described, for instance in example 6f, of which the results are depicted in FIG. 8A-C. Methods to measure levels of IL-2, TNFα and IFNγ are known in the art. An exemplary method is described, for instance, in example 6k, of which the results are depicted in FIG. 11A-C.

In one aspect the disclosure provides a method for modulating HVEM signalling activity, comprising contacting HVEM expressing cells with an antibody or antigen binding fragment thereof, a nucleic acid molecule or a vector as disclosed herein. In one aspect the disclosure provides a method for increasing an immune response in a subject comprising administering to the subject in need thereof a therapeutically effective amount of a composition comprising an antibody or antigen binding fragment thereof, a nucleic acid molecule or a vector as disclosed herein.

In one aspect the disclosure provides a method for reducing tumor growth in a subject comprising administering to the subject in need thereof a therapeutically effective amount of a composition comprising an antibody or antigen binding fragment thereof, a nucleic acid molecule or a vector as disclosed herein.

As used herein, an "subject" is a human or an animal. Subjects include, but are not limited to, mammals such as humans, pigs, ferrets, seals, rabbits, cats, dogs, cows and horses, and birds such as chickens, ducks, geese and turkeys. In a preferred embodiment of the invention, a subject is a mammal. In a particularly preferred embodiment, the subject is a human.

The term "antigen-binding fragment" of an antibody refers to one or more portions of a full-length antibody that retain the ability to bind to the same antigen (i.e., human HVEM) that the antibody binds to. The term "antigen-binding fragment" also encompasses a portion of an antibody that is part of a larger molecule formed by non-covalent or covalent association or of the antibody portion with one or more additional molecular entities. Examples of additional molecular entities include amino acids, peptides, or proteins, such as the streptavidin core region, which may be used to make a tetrameric scFv molecule (Kipriyanov et al. Hum Antibodies Hybridomas 1995; 6(3):93-101). An exemplary antigen-binding fragment is a VH and/or a VL of an antibody. Antigen-binding fragments include Fab, F(ab'), F(ab')$_2$, complementarity determining region (CDR) fragments, single-chain antibodies (scFv), bivalent single-chain antibodies, and other antigen recognizing immunoglobulin fragments. In some instances, the term "antibody" as used herein can be understood to also include an antigen binding fragment thereof.

The term "human antibody" refers to an antibody consisting of amino acid sequences of human immunoglobulin sequences only. A human antibody may contain murine carbohydrate chains if produced in a mouse, in a mouse cell or in a hybridoma derived from a mouse cell. Human antibodies may be prepared in a variety of ways known in the art.

The term "epitope" refers to the part of an antigen that is capable of specific binding to an antibody, or T-cell receptor or otherwise interacting with a molecule. "Epitope" is also referred to in the art as the "antigenic determinant". An epitope generally consists of chemically active surface groupings of molecules such as amino acids or carbohydrate or sugar side chains. An epitope may be "linear" or "non-linear/conformational". Once a desired epitope is determined (e.g., by epitope mapping), antibodies to that epitope can be generated. The generation and characterization of antibodies may also provide information about desirable epitopes. From this information, it is then possible to screen antibodies for those which bind to the same epitope e.g. by conducting cross-competition studies to find antibodies that competitively bind with one another, i.e., the antibodies compete for binding to the antigen.

As used herein, "to comprise" and its conjugations is used in its non-limiting sense to mean that items following the word are included, but items not specifically mentioned are not excluded. In addition, the verb "to consist" may be replaced by "to consist essentially of" meaning that a compound or adjunct compound as defined herein may comprise additional component(s) than the ones specifically identified, said additional component(s) not altering the unique characteristic of the invention.

The articles "a" and "an" are used herein to refer to one or to more than one (i.e., to at least one) of the grammatical object of the article. By way of example, "an element" means one element or more than one element.

The word "approximately" or "about" when used in association with a numerical value (approximately 10, about 10) preferably means that the value may be the given value of 10 more or less 1% of the value.

As used herein, the terms "treatment," "treat," and "treating" refer to reversing, alleviating, delaying the onset of, or inhibiting the progress of a disease or disorder, or one or more symptoms thereof, as described herein. In some embodiments, treatment may be administered after one or more symptoms have developed. In other embodiments, treatment may be administered in the absence of symptoms. For example, treatment may be administered to a susceptible individual prior to the onset of symptoms (e.g., in light of a history of symptoms and/or in light of genetic or other susceptibility factors). Treatment may also be continued after symptoms have resolved, for example to prevent or delay their recurrence.

For the purpose of clarity and a concise description features are described herein as part of the same or separate embodiments. However, it will be appreciated that the scope of the invention may include embodiments having combinations of all or some of the features described.

All patent and literature references cited in the present specification are hereby incorporated by reference in their entirety.

The invention is further explained in the following examples. These examples do not limit the scope of the invention, but merely serve to clarify the invention.

BRIEF DESCRIPTION OF THE DRAWINGS

FIG. 6. Effect of purified BTLA/HVEM blocking mouse versus chimeric mouse/human anti-human HVEM antibodies on binding of (A) soluble human BTLA, of (B) soluble human CD160, of (C) soluble human LIGHT, and of (D) soluble human TNFβ to membrane-bound full-length human HVEM on HEK293F cells. Dashed line represents negative controls (i.e., ligand/receptor binding with addition of a mouse IgG1 or a human IgG4 negative isotype control=100% binding of ligands to HVEM receptor). Mean±SD (n=2-3) are shown from one (D), two (A and B), or three (C) independent performed experiments.

FIG. 7. Effect of purified BTLA/HVEM chimeric mouse/human anti-human HVEM antibodies on displacement of pre-bound (A) soluble human BTLA, of (B) soluble human CD160, of (C) soluble human LIGHT, and of (D) soluble human TNFβ from membrane-bound full-length human HVEM on HEK293F cells. Dashed line represents negative controls (i.e., ligand/receptor binding with addition of a human IgG4 negative isotype control=100% binding of ligands to HVEM receptor). Mean±SD (n=2) are shown.

FIG. 9. (A) Effect of soluble human TNFβ ligand on NFκB signalling in membrane-bound human HVEM expressing cells. (B) Effect of purified BTLA/HVEM blocking chimeric mouse/human anti-human HVEM antibodies on soluble human TNFβ (~EC80)-induced NFκB signalling in membrane-bound human HVEM expressing cells. Mean±SD (n=3) are shown.

FIG. 10. Effect of purified BTLA/HVEM blocking chimeric mouse/human anti-human HVEM antibodies on membrane-bound human BTLA/human HVEM-mediated inhibition of TCR-induced NFAT signalling in membrane-bound human BTLA/human TCR expressing Jurkat Effector T cells. Mean±SD (n=2) are shown from two independent performed experiments.

EXAMPLES

Figure 1:
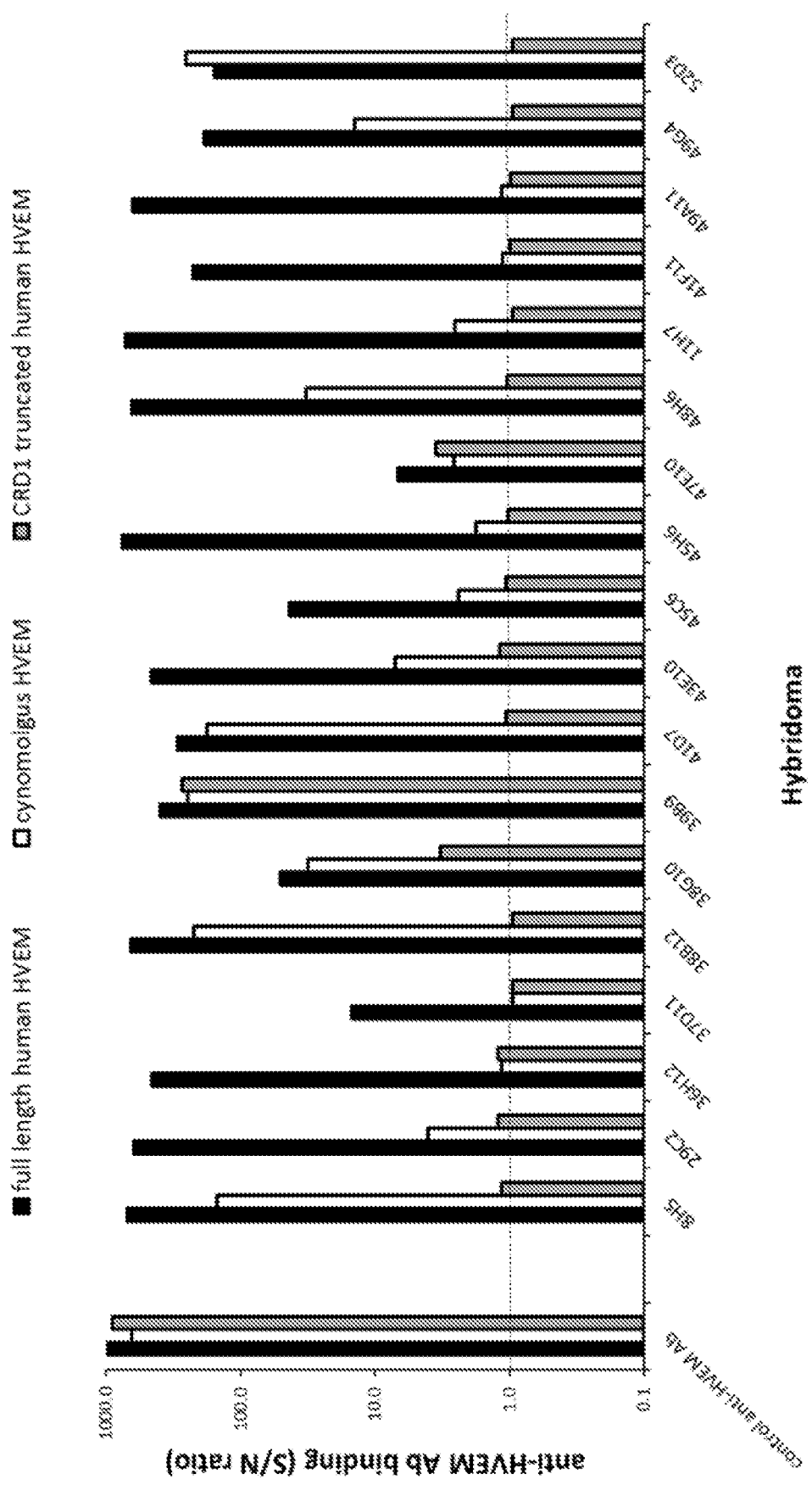
FIG. 1. Flow-cytometric binding characteristics of mouse anti-human HVEM antibodies to membrane-bound full-length human HVEM, to membrane-bound human HVEM deleted for CRD1, or to membrane-bound full-length cynomolgus HVEM on HEK293F cells. Dashed line represents background (i.e., no binding of mouse anti-human HVEM antibodies).

Example 1. Generation of Mouse Anti-Human HVEM Monoclonal Antibodies (a). Generation of Sf9 Insect Cells and HEK293F Cells Expressing Surface Human HVEM cDNA encoding for human HVEM protein (Swiss-Prot no. Q92956.3; see SEQ ID NO. 1) was optimized for mammalian expression and synthesized by GENEART, Regensburg, Germany (see SEQ ID NO. 2). This cDNA was subcloned in baculovirus transfer plasmid pVL1393 (BD transfection kit cat no. 560129; BD Biosciences). Subsequently, Sf9 insect cells (*Spodoptera frugiperda*) were transfected with transfer plasmid pVL1393 containing cDNA encoding human HVEM using the baculoCOMPLETE all-in-one kit (Oxford Expression Technologies), and then incubated at 27° C. for 4-5 days. After this transfection step, supernatant was collected and stored at 4° C., and used to infect more Sf9 insect cells for virus amplification. For this purpose, Sf9 insect cells were transfected with amplified recombinant baculovirus, and then incubated at 27° C. for 3-5 days. These Sf9 insect cells were harvested, washed with sterile PBS, and aliquoted at $20.0 \times 10^6$ cells/mL in PBS and stored at −80° C. to obtain cell lysates. Prior to storage, human HVEM surface expression on transfected Sf9 insect cells was confirmed using 1:20 diluted phycoerythrin (PE)-conjugated mouse anti-human HVEM antibody (clone eBioHVEM-122; eBioscience) and flow cytometry.

cDNA encoding for human HVEM protein (Swiss-Prot no. Q92956.3; see SEQ ID NO. 1) was optimized for mammalian expression and synthesized by GENEART, Regensburg, Germany (see SEQ ID NO. 2). This cDNA was subcloned in a pcDNA3.1-derived expression plasmid. This full-length human HVEM plasmid was transfected in FreeStyle™ 293F cells (Life Technologies) using the FreeStyle™ 293 Expression System (Life Technologies). Stable human full-length HVEM-transfected HEK293F cells (clone no. 128) were selected using 125 μg/mL G418 (Gibco). These HEK293F cells were harvested, washed with sterile PBS, and aliquoted at $19.0 \times 10^6$ cells/mL in PBS and stored at −80° C. to obtain cell lysates. Prior to storage, human HVEM surface expression on transfected HEK293F cells was confirmed using 1:20 diluted phycoerythrin (PE)- conjugated mouse anti-human HVEM antibody (clone eBioHVEM-122; eBioscience) and flow cytometry.

(b). Immunization and Generation of Mouse Anti-Human HVEM Monoclonal Antibodies

Two Immunization Protocols were Applied:

During the first immunization protocol, BALB/c mice (females, 6-8 weeks of age; Charles River Laboratories) were subcutaneously injected with ≈500 μL soluble recombinant C-terminal polyhistidine-tagged human extracellular HVEM domain (NCBI Ref SEQ NP_003811.2; Sino Biological Inc) in water-in-oil emulsified Complete Freund's Adjuvant (CFA; Sigma) or in oil-in-water emulsified Sigma Adjuvant System® (SAS; Sigma) on Day 0; each mouse was injected with 25 ug recombinant human HVEM in 250 μL PBS mixed with 250 μL CFA or SAS. On Day 21, antibody responses were boosted by subcutaneous injections with recombinant human HVEM in Incomplete Freund's Adjuvant (IFA; Sigma) or SAS; each mouse was injected with 25 ug recombinant human HVEM in 250 μL PBS mixed with 250 μL IFA or SAS. On Day 42 and on Day 87, mice were boosted again by subcutaneous injections with recombinant human HVEM and human HVEM-transfected Sf9 insect cell lysate in IFA or SAS; each mouse was injected with 25 ug recombinant human HVEM and human HVEM-transfected Sf9 insect cell lysate (prepared from $1.8 \times 10^6$ viable and membrane-bound HVEM expressing cells) in 250 μL PBS mixed with 250 μL IFA or SAS. Finally, mice were intraperitoneally injected with recombinant human HVEM and human HVEM-transfected Sf9 insect cell lysate without adjuvant on Day 98 and on Day 99; each mouse was injected with 25 ug recombinant human HVEM and human HVEM-transfected Sf9 insect cell lysate (prepared from $1.8 \times 10^6$ viable and membrane-bound HVEM expressing cells) in 250 μL PBS. On Day 102, splenocytes from immunized mice were fused with SP2/0-Ag14 myeloma cells (DSMZ) using standard hybridoma technology originally described by Köhler and Milstein (Nature 1975, 256:495) as described below.

During the second immunization protocol, BALB/c mice (females, 6-8 weeks of age; Charles River Laboratories) were subcutaneously injected with ≈500 μL soluble recombinant C-terminal polyhistidine-tagged human extracellular HVEM domain (NCBI Ref SEQ NP_003811.2; Sino Biological Inc) and human HVEM-transfected Sf9 insect cell lysate or human HVEM-transfected HEK293F cell lysate in CFA or SAS or without adjuvant on Day 0; each mouse was injected with 10-20 ug recombinant human HVEM and human HVEM-transfected Sf9 insect cell or HEK293F cell lysate (both prepared from $5.0 \times 10^6$ viable and membrane-bound HVEM expressing cells) in 250 μL PBS mixed with or without 250 μL CFA or SAS. On Day 21 and on Day 42, antibody responses were boosted by subcutaneous injections with recombinant human HVEM and human HVEM-transfected Sf9 insect cell lysate or human HVEM-transfected HEK293F cell lysate in IFA or SAS or without adjuvant; each mouse was injected with 10-20 ug recombinant human HVEM and human HVEM-transfected Sf9 insect cell or HEK293F cell lysate (both prepared from $5.0 \times 10^6$ viable and membrane-bound HVEM expressing cells) in 250 μL PBS mixed with or without 250 μL IFA or SAS. Finally, mice were intraperitoneally injected with recombinant human HVEM and human HVEM-transfected Sf9 insect cell lysate or human HVEM-transfected HEK293F cell lysate without adjuvant on Day 59 and on Day 64; each mouse was injected with 10-20 ug recombinant human HVEM and human HVEM-transfected Sf9 insect cell or HEK293F cell lysate (both prepared from $5.0 \times 10^6$ viable and membrane-bound HVEM expressing cells) in 250 μL PBS. On day 67, splenocytes from immunized mice were fused with SP2/0-Ag14 myeloma cells (DSMZ) using standard hybridoma technology originally described by Köhler and Milstein (Nature 1975, 256:495). Briefly, immunized mice were sacrificed. Splenocytes were teased from spleens, and washed in serum-free opti-MEM® I with GlutaMax medium (SF medium; Invitrogen). Logarithmically growing SP2/0-Ag14 myeloma cells were washed in SF medium, and added to the splenocytes yielding a 5:1 ratio of splenocytes-to-myeloma cells. The cells were then pelleted, and the supernatant was removed. One ml of a 37% (v/v) solution of polyethylene glycol 4000 (Merck) was then added dropwise over a 60-sec period, after which the cells were incubated for another 60-sec at 37° C. Eight ml SF medium, followed by 5 ml opti-MEM® I with GlutaMax/10% (v/v) fetal calf serum (FCS; Bodinco), was then slowly added with gentle agitation. After 30 minutes at room temperature (RT), the cells were pelleted, washed in opti-MEM® I with Gluta-Max/10% FCS to remove residual polyethylene glycol, and finally plated at a concentration of $0.1 \times 10^6$ cells/200 μL per well in aminopterin selection medium, i.e., opti-MEM® I with GlutaMax/10% FCS that was supplemented with 50× Hybri-Max™ aminopterin (a de novo DNA synthesis inhibitor; Sigma). From Day 7, aminopterin selection medium was replenished every 2-3 days, and on Day 13-14, aminopterin selection medium was replaced by opti-MEM I with GlutaMax/10% FCS.

(c). Screening for the Presence Mouse Anti-Human HVEM Monoclonal Antibodies

From Day 13 after fusion, supernatants from growing hybridomas were screened for the presence of mouse anti-human HVEM antibodies (i.e., 'high affinity' IgGs, as opposed to 'low affinity' IgMs) using an ELISA with soluble recombinant C-terminal polyhistidine-tagged human HVEM (rhuHVEM; Sino Biological) as target protein. To this end, rhuHVEM was coated at 1 μg/mL in PBS (50 ng/50 μL/well) using half-area flat-bottomed 96-wells EIA plates (Corning) during 16-24 hours at 4-8° C. After extensive washing with PBS/0.05%, w/v, Tween 20, plates were blocked with PBS/0.05% Tween 20/1%, w/v, bovine serum albumin (BSA; Roche) for 1 hour at RT. Subsequently, plates were incubated with 50 μL undiluted hybridoma supernatant/well for 1 hour at RT. After extensive washing in PBS/0.05% Tween 20, binding of antibodies was determined with 1:5000 diluted horseradish peroxidase-conjugated goat anti-mouse IgG Fcγ-specific antibodies (Jackson ImmunoResearch) for 1 hour at RT, followed by a ready-to-use solution of TMB substrate (Invitrogen) for colorimetric detection. After adding 1 M $H_2SO_4$, binding of antibodies was measured at wavelength of 450 nm (reference wavelength of 655 nm) using a microplate reader (model iMark; BioRad).

From Day 13 after fusion, supernatants from growing hybridomas were also screened and confirmed for mouse anti-human HVEM antibodies (i.e., 'high affinity' IgGs, as opposed to 'low affinity' IgMs) production using a cell-based ELISA with membrane-bound human HVEM as target protein. To this end, stable human full-length HVEM-transfected HEK293F cells (clone no. 128; see above Example 1a) were coated at $2 \times 10^6$ viable cells/mL in PBS ($0.1 \times 10^6$ viable cells/50 μL/well) using half-area flat-bottomed 96-wells EIA plates (Corning) during 16-24 hours at 4-8° C. Non-transfected (i.e., negative for membrane-bound human HVEM expression) wild type (WT) HEK293F coated cells were run in parallel as a negative control. After extensive washing with PBS/0.05%, w/v, Tween 20, plates were blocked with PBS/0.05% Tween 20/1%, w/v, BSA (Roche) for 1 hour at RT. Subsequently, plates were incubated with 50 µL undiluted hybridoma supernatant/well for 1 hour at RT. After extensive washing in PBS/0.05% Tween 20, binding of antibodies was determined with 1:5000 diluted horseradish peroxidase-conjugated goat anti-mouse IgG Fcγ-specific antibodies (Jackson ImmunoResearch) for 1 hour at RT, followed by a ready-to-use solution of TMB substrate (Invitrogen) for colorimetric detection. After adding 1 M $H_2SO_4$, binding of antibodies was measured at wavelength of 450 nm (reference wavelength of 655 nm) using a microplate reader (model iMark; BioRad).

From Day 13 after fusion, supernatants from growing hybridomas were also screened and confirmed for mouse anti-human HVEM antibodies (i.e., 'high affinity' IgGs, as opposed to 'low affinity' IgMs) production using FACS with membrane-bound human HVEM as target protein. To this end, stable human full-length HVEM-transfected HEK293F cells (clone no. 128; see above Example 1a) were put at $10 \times 10^6$ cells/mL in ice-chilled phosphate-buffered saline containing 0.1% BSA (Sigma)/0.05% $NaN_3$ (PBS/BSA/$NaN_3$) supplemented with 50 µg/mL human IgGs (blocking of possible Fcγ receptors; Sigma) for 10 minutes at 4° C. Then, 10 µL/tube (i.e., $0.1 \times 10^6$ cells) of these cells were incubated with 100 µL undiluted hybridoma supernatant/tube for 30 minutes at 4° C. Non-transfected (i.e., negative for membrane-bound human HVEM expression) WT HEK293F cells were run in parallel as a negative control to determine antibody specificity. After extensive washing in PBS/BSA/$NaN_3$, cells were subsequently incubated with 1:200 diluted PE-conjugated goat anti-mouse IgG Fcγ-specific antibodies (Jackson ImmunoResearch) for 30 minutes at 4° C. After extensive washing in PBS/BSA/$NaN_3$, cells were fixed in 2% formaldehyde in PBS/BSA/$NaN_3$ for 30 minutes at 4° C. Binding of antibodies was measured using a flow cytometer (model FACSCalibur; BD Biosciences).

Triple HVEM positive (i.e., rhuHVEM+ in ELISA, membrane HVEM+ HEK293F cells in ELISA, and membrane HVEM+ HEK293F cells in FACS) hybridomas were expanded and cryopreserved. Supernatants from these triple HVEM positive hybridomas showed no reactivity with non-transfected (i.e., negative for membrane-bound human HVEM expression) WT HEK293F cells. Using this approach yielded 18 anti-human HVEM-specific antibody-producing hybridomas. Mouse antibodies were purified from these anti-human HVEM-specific antibody-producing hybridoma supernatants using protein G columns (GE Healthcare). Heavy and light chains were typed for isotype class using the IsoStrip™ Mouse Monoclonal Antibody Isotyping kit (Roche). Subsequently, supernatants and/or purified antibodies from these anti-human HVEM-specific antibody-producing hybridomas were tested for their effect on human HVEM-ligand (i.e., human BTLA and human LIGHT) binding to membrane-bound human HVEM, for their binding to membrane-bound human HVEM deleted for cysteine-rich domain 1 (CRD1), and for their cross-reactivity to membrane-bound cynomolgus monkey HVEM, as described in Example 2. In addition, a selection of these purified antibodies from these anti-human HVEM-specific antibody-producing hybridomas were tested for their effect on NFκB signalling in membrane human HVEM expressing cells, on soluble human LIGHT-induced NFκB signalling in membrane human HVEM expressing cells, and on membrane human BTLA/human HVEM-mediated inhibition of TCR-induced NFAT signalling in membrane human BTLA/human TCR expressing cells, as described in Example 3.

Example 2. Flow Cytometric Characterization of Mouse Anti-Human HVEM Monoclonal Antibodies (a). Binding of Mouse Anti-Human HVEM Antibodies to Membrane-Bound Full-Length Human HVEM and to Membrane-Bound Human HVEM Deleted for CRD1

In order to analyse the fine specificity of mouse anti-human HVEM antibodies, the location of epitope(s) recognized by the generated mouse anti-human HVEM antibodies was determined by domain mapping. The ability of mouse anti-human HVEM antibodies to bind to the CRD1 truncated human HVEM, expressed on the surface of (HEK-derived) 293F cells, was determined by FACS analysis.

Based on literature (Swiss-Prot no. Q92956.3; Montgomery et al. Cell 1996; 87:427-436; Hsu et al. J Biochem Chem 1997; 272:13471-13474; Naismith et al. Trends Biochem Sci 1998; 23:74-79; Carfi et al. Molecul Cell 2001; 8:169-179; Bodmer et al. Trends Biochem Sci 2002; 27:19-26; Compaan et al. J Biochem Chem 2005; 280:39553-39561), cysteine-rich domains (CRD) in the extracellular region of human HVEM were identified, and are coded CRD1, CRD2, CRD3, and (truncated) CRD4. CRDs contain topologically distinct types of modules, called an A-module and a B-module. A-modules are C-shaped structures, and B-modules are S-shaped structures. A typical CRD is usually composed of A1-B2-modules or A2-B1-modules (or, less frequently, a different pair of modules, like A1-B1) with 6 conserved cysteine residues, wherein the numeral denotes the number of disulphide bridges within each module. Human HVEM-CRD1 comprises A1-B2-modules (42-75, see SEQ ID NO. 1), human HVEM-CRD2 comprises A1-B2-modules (78-119, see SEQ ID NO. 1), human HVEM-CRD3 comprises an A2-module and a non-canonical (reminiscent of a B1-module) B0-module (121-162, see SEQ ID NO. 1), and human truncated HVEM-CRD4 comprises only an A1-module (165-179, see SEQ ID NO. 1). Two different human HVEM constructs were generated and expressed: (1) full-length human HVEM construct, which starts with N-terminal CRD1 (i.e., CRD1 A1-B2-modules cover amino acids 42-75, see SEQ ID NO. 1), and therefore denoted as 'full-length', and comprised amino acids 1-283 (see SEQ ID NO. 1), and (2) 'CRD1 truncated' construct, which starts with N-terminal CRD2 (i.e., CRD2 A1-B2-modules cover amino acids 22-63, see SEQ ID NO. 3), and comprised amino acids 20-227 linked to a mouse Ig signal peptide amino acids 1-19 (see SEQ ID NO. 3). cDNA encoding for CRD1 truncated human HVEM protein (Swiss-Prot no. Q92956.3) was optimized for mammalian expression and synthesized by GENEART, Regensburg, Germany (see SEQ ID NO. 4). This cDNA was subcloned in a pcDNA3.1-derived expression plasmid.

Generation of human 'full-length' HVEM-transfected HEK293F cells (clone no. 128) is described in Example 1a. Using the FreeStyle™ 293 Expression System (Invitrogen), FreeStyle™ 293F cells (Invitrogen) were transiently transfected with the 'CRD1 truncated' variants of human HVEM. After 72 hours, surface human HVEM expression on transfected cells was analysed by FACS analysis. To this end, stable human full-length HVEM-transfected HEK293F cells and transient human 'CRD1 truncated' HVEM-transfected HEK293F cells were put at $10 \times 10^6$ cells/mL in ice-chilled phosphate-buffered saline containing 0.1% BSA (Sigma)/0.05% $NaN_3$ (PBS/BSA/$NaN_3$) supplemented with 50 µg/mL human IgGs (blocking of possible Fcγ receptors;

Sigma) for 10 minutes at 4° C. Then, 10 µL/tube (i.e., 0.1×10⁶ cells) of these cells were incubated with 100 µL undiluted hybridoma supernatant/tube for 30 minutes at 4° C. Phycoerythrin (PE)-conjugated mouse anti-human HVEM antibody (clone eBioHVEM-122; eBioscience) at 1:20 was run as a positive control antibody. After extensive washing in PBS/BSA/NaN$_3$, cells were subsequently incubated with 1:200 diluted PE-conjugated goat anti-mouse IgG Fcγ-specific antibodies (Jackson ImmunoResearch) for 30 minutes at 4° C. After extensive washing in PBS/BSA/NaN$_3$, cells were fixed in 2% formaldehyde in PBS/BSA/NaN$_3$ for 30 minutes at 4° C. Binding of antibodies was measured using a flow cytometer (model FACSCalibur; BD Biosciences).

As shown in FIG. 1, all 18-examined mouse anti-human HVEM antibodies recognized full-length human HVEM on transfected HEK293F cells, whereas most (15/18) of these mouse anti-human HVEM antibodies showed no binding on 'CRD1 truncated' human HVEM on transfected HEK293F cells. In contrast, mouse anti-human HVEM antibodies no. 38G10, 39B9 and 47E10 recognized 'CRD1 truncated' human HVEM on transfected HEK293F cells.

These results demonstrated that mouse anti human HVEM antibodies no. 38G10, 39B9 and 47E10 seemed to recognize linear and/or non-linear/conformational epitopes in CRD2, CRD3, CRD4, and/or the 'linker' fragment (aa sequence 124-146, see SEQ ID NO. 3) of the extracellular domain of human HVEM, whereas all other generated mouse anti-human HVEM antibodies (15/18) seemed to recognize linear and/or non-linear/conformational epitopes in CRD1 of the extracellular domain of human HVEM.

(b). Binding of Mouse Anti-Human HVEM Antibodies to Membrane-Bound Cynomolgus Monkey HVEM In order to analyse the multispecies cross-reactivity of mouse anti-human HVEM antibodies, the ability of mouse anti-human HVEM antibodies to bind to the cynomolgus monkey HVEM, expressed on the surface of (HEK-derived) 293F cells, was determined by FACS analysis.

cDNA encoding for cynomolgus monkey HVEM protein (see SEQ ID NO. 5; NCBI Reference Sequence XP_005545061.1) was optimized for mammalian expression and synthesized by GENEART, Regensburg, Germany (see SEQ ID NO. 6). This cDNA was subcloned in a pcDNA3.1-derived expression plasmid.

Generation of human 'full-length' HVEM-transfected HEK293F cells (clone no. 128) is described in Example 1a. Using the FreeStyle™ 293 Expression System (Invitrogen), FreeStyle™ 293F cells (Invitrogen) were transiently transfected with cynomolgus monkey (full-length) HVEM. After 72 hours, surface cynomolgus monkey HVEM expression on transfected cells was analysed by FACS analysis. To this end, stable human full-length HVEM-transfected HEK293F cells and transient cynomolgus monkey full-length HVEM-transfected HEK293F cells were put at 10×10⁶ cells/mL in ice-chilled phosphate-buffered saline containing 0.1% BSA (Sigma)/0.05% NaN$_3$ (PBS/BSA/NaN$_3$) supplemented with 50 µg/mL human IgGs (blocking of possible Fcγ receptors; Sigma) for 10 minutes at 4° C. Then, 10 µL/tube (i.e., 0.1×10⁶ cells) of these cells were incubated with 100 µL undiluted hybridoma supernatant/tube for 30 minutes at 4° C. Phycoerythrin (PE)-conjugated mouse anti-human HVEM antibody (clone eBioHVEM-122; eBioscience) at 1:20 was run as a positive control antibody. After extensive washing in PBS/BSA/NaN$_3$, cells were subsequently incubated with 1:200 diluted PE-conjugated goat anti-mouse IgG Fcγ-specific antibodies (Jackson ImmunoResearch) for 30 minutes at 4° C. After extensive washing in PBS/BSA/NaN$_3$, cells were fixed in 2% formaldehyde in PBS/BSA/NaN$_3$ for 30 minutes at 4° C. Binding of antibodies was measured using a flow cytometer (model FACSCalibur; BD Biosciences).

As shown in FIG. 1, all 18-examined mouse anti-human HVEM antibodies recognized full-length human HVEM on transfected HEK293F cells and most (14/18) of these mouse anti-human HVEM antibodies showed cross-reactivity—to a variable degree-against cynomolgus monkey full-length HVEM on transfected HEK293F cells. In contrast, mouse anti-human HVEM antibodies no. 36H12, 37D11, 41F11 and 49A11 did not recognize cynomolgus monkey full-length HVEM on transfected HEK293F cells.

These results demonstrated that most (14/18) of generated mouse anti-human HVEM antibodies seemed to recognize linear and/or non-linear/conformational epitopes in CRD1, CRD2, CRD3, CRD4, and/or the 'linker' fragment (aa sequence 180-203, see SEQ ID NO. 5) of the extracellular domain of cynomolgus monkey full-length HVEM.

Predicted amino acid sequence of full-length cynomolgus monkey HVEM protein (Met1-Ser280; NCBI Reference Sequence: XP_005545061.1) shows 82% homology with amino acid sequence of human HVEM protein (Met1-His283; Swiss-Prot no. Q92956.3), and predicted amino acid sequence of extracellular region of cynomolgus monkey HVEM (i.e., Leu39-Val203; NCBI Reference Sequence: XP_005545061.1) shows 87% homology with amino acid sequence of extracellular region human HVEM protein (i.e., Leu39-Val202; Swiss-Prot no. Q92956.3). These results demonstrated that most (14/18) of the generated mouse anti-human HVEM monoclonal antibodies cross-reacted with homologous cynomolgus monkey HVEM on transfected HEK293F cells.

(c). Effect of Mouse Anti-Human HVEM Antibodies on Binding of Human BTLA and Human LIGHT to Membrane-Bound Human HVEM Extracellular HVEM has two spatially ligand-binding regions (Cai et al. Immunol Rev 2009; 229:244-258; Steinberg et al. Immunol Rev 2011; 244:169-187; Pasero et al. Curr Opin Pharmacol 2012; 12:478-485), one region for canonical ligands, which belong to the TNF superfamily (i.e., LIGHT and TNFβ), and another region for non-canonical ligands, which belong to the Ig superfamily (i.e., BTLA and CD160). Mutational analysis and molecular modelling revealed that BTLA and CD160 interact with CRD1, whereas LIGHT and TNFβ binding reside in CRD2 and CRD3 on the opposite face of HVEM.

In order to analyse the effect of mouse anti-human HVEM antibodies on binding of human BTLA and human LIGHT to membrane-bound human HVEM, the ability of mouse anti-human HVEM antibodies to sterically hinder the interaction of human BTLA and of human LIGHT on human full-length HVEM, expressed on the surface of (HEK-derived) 293F cells, was determined by FACS analysis.

Generation of human 'full-length' HVEM-transfected HEK293F cells (clone no. 128) is described in Example 1a. Binding of soluble human BTLA of soluble human CD160, and of soluble human LIGHT on surface human HVEM-transfected cells was analysed by FACS analysis. To this end, stable human full-length HVEM-transfected HEK293F cells were put at 10×10⁶ cells/mL in ice-chilled phosphate-buffered saline containing 0.1% BSA (Sigma)/0.05% NaN$_3$ (PBS/BSA/NaN$_3$) supplemented with 50 µg/mL human IgGs (blocking possible Fcγ receptors; Sigma) for 10 minutes at 4° C. Then, 10 µL/tube (i.e., 0.1×10⁶ cells) of these cells were incubated with or without 100 µL protein G purified mouse anti-HVEM antibody at 10 µg/mL/tube or a negative control mouse IgG1 (BD Biosciences) at 10 µg/mL/tube for 30 minutes at 4° C. After this (i.e., without washing), cells were subsequently incubated with 1 µg/mL soluble human BTLA-human Fcγ fusion protein (Sino Biological Inc) or with 0.1 ug/mL soluble his-tagged human LIGHT (R&D Systems) in PBS/BSA/NaN$_3$ for 30 minutes at 4° C. After extensive washing in PBS/BSA/NaN$_3$, cells were incubated with biotinylated mouse anti-human IgG Fcγ-specific antibody (detection BTLA; Southern Biotech) at 10 µg/mL or with biotinylated mouse anti-his antibody (detection LIGHT; R&D Systems) at 5 µg/mL for 30 minutes at 4° C. After extensive washing in PBS/BSA/NaN$_3$, cells were incubated with 1:200 diluted PE-conjugated streptavidin (Jackson ImmunoResearch) for 30 minutes at 4° C. After extensive washing in PBS/BSA/NaN$_3$, cells were fixed in 2% formaldehyde in PBS/BSA/NaN$_3$ for 30 minutes at 4° C. Binding of ligands BTLA and LIGHT on membrane human HVEM was measured using a flow cytometer (model FACSCalibur; BD Biosciences).

Figure 2A:
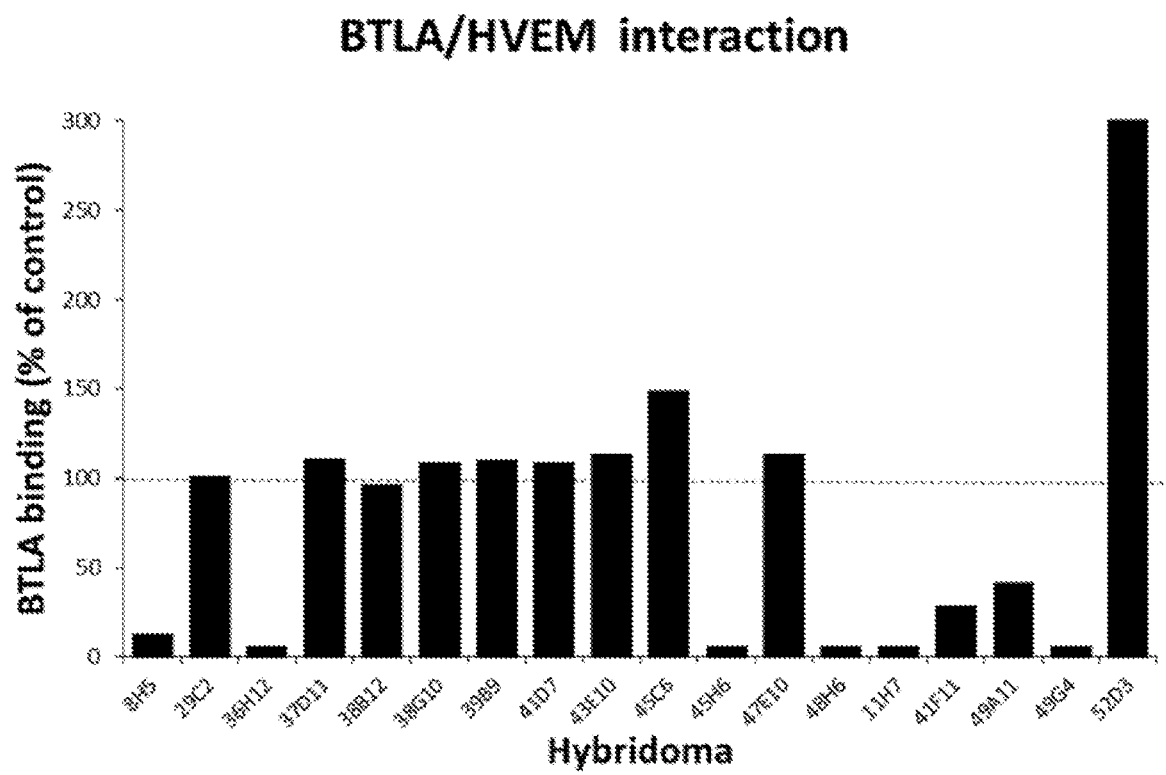
FIG. 2. Effect of mouse anti-human HVEM antibodies on binding of (A) soluble human BTLA and of (B) soluble human LIGHT to membrane-bound full-length human HVEM on HEK293F cells. Dashed line represents negative controls (i.e., ligand/receptor binding without addition of mouse anti-human antibody or with addition of a mouse IgG1 negative isotype control=100% binding of ligands to HVEM receptor).
Figure 2B:
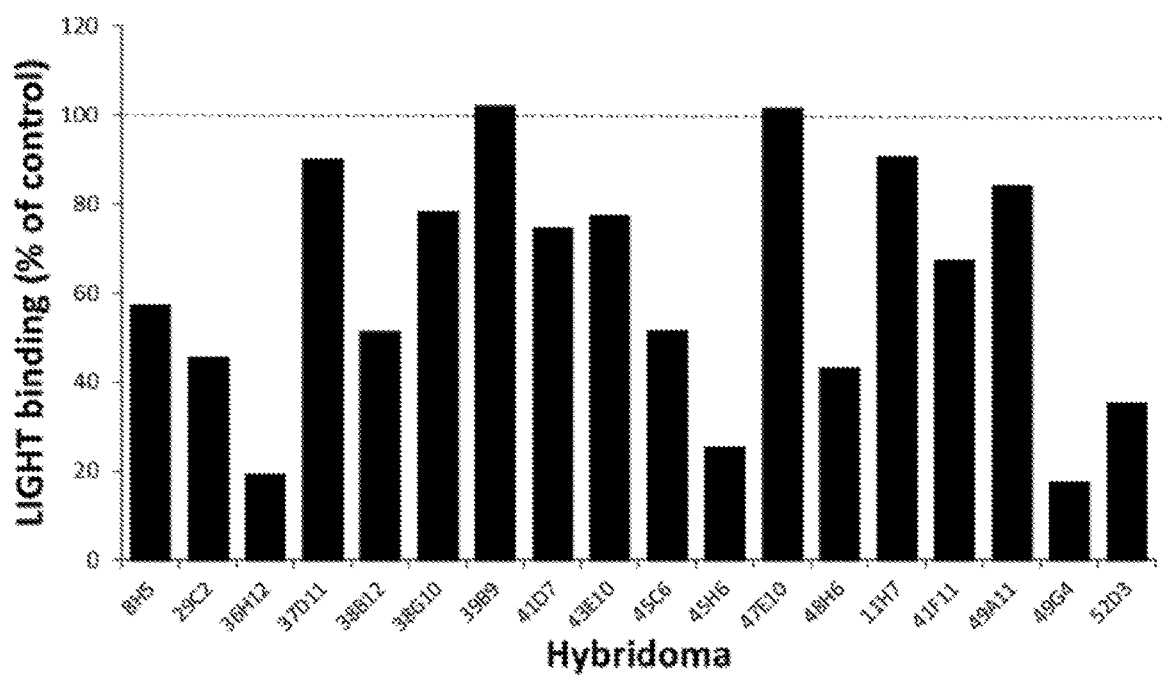

As shown in FIG. 2 and Table 1, four types of mouse anti-human HVEM antibodies were found: (type 1 antibodies; 6/18) non-blocking BTLA/HVEM and LIGHT/HVEM interactions, (type 2 antibodies; 3/18) blocking BTLA/HVEM interaction and non-blocking LIGHT/HVEM interaction, (type 3 antibodies; 4/18) non-blocking BTLA/HVEM interaction and blocking LIGHT/HVEM interaction, and (type 4 antibody; 5/18) blocking BTLA/HVEM and LIGHT/HVEM interactions.

TABLE 1

Summary of mouse anti-human HVEM antibody blocking effects on soluble human BTLA (sBTLA) ligand, soluble human CD160 (sCD160) and soluble human LIGHT (sLIGHT) ligand binding to human HVEM membrane receptor (mHVEM).

| Anti-HVEM Ab | Blocking ligand-mHVEM interaction | | | binding to CRD1 truncated HVEM |
|---|---|---|---|---|
| | sBTLA | sCD160 | sLIGHT | |
| 8H5 | +++ | ++ | + | − |
| 29C2 | − | −* | ++ | − |
| 36H12 | +++ | +++ | +++ | − |
| 37D11 | − | − | − | − |
| 38B12 | − | − | + | − |
| 38G10 | − | − | − | −/+ |
| 39B9 | − | − | − | + |
| 41D7 | − | − | − | − |
| 43E10 | − | − | − | − |
| 45C6 | −* | − | + | − |
| 45H6 | +++ | +++ | +++ | − |
| 47E10 | − | − | − | −/+ |
| 48H6 | +++ | +++ | ++ | − |
| 11H7 | +++ | +++ | − | − |
| 41F11 | ++ | ++ | −/+ | − |
| 49A11 | ++ | ++ | − | − |
| 49G4 | +++ | +++ | +++ | − |
| 52D3 | −* | −* | ++ | − |

− = no blocking (−* = enhanced binding of ligand to human HVEM) of ligand-receptor interaction, + = weak blocking of ligand-receptor interaction, ++ = intermediate blocking of ligand-receptor interaction, +++ = strong blocking of ligand-receptor interaction; last column binding to CRD1 truncated human HVEM.
All antibodies bind to full length human HVEM.

These results demonstrated that a panel of human ligand-blocking and ligand-non-blocking mouse anti-human HVEM antibodies with multiple characteristics (i.e., type 1-4 mouse anti-human HVEM antibodies (see above)) was generated. Of note, antibodies that bind CRD1 like (36H12, 45H6) may or may not (52D3) block binding of sBTLA or sCD160. CRD1 antibody 52D3 indeed appears to enhance binding of the ligand(s). In addition, it clearly shows the different functional activity of the CRD1 targeting antibodies.

Example 3. Biological Characterization of Mouse Anti-Human HVEM Monoclonal Antibodies (a). Effect of Mouse Anti-Human HVEM Antibodies on NFκB Signalling in Membrane Human HVEM Expressing Cells HVEM signalling can induce the activation of NFκB in multiple HVEM expressing cells from the immune system, like T and B lymphocytes, and dendritic cells, which turns on several genes important to their cell function. Ligation of HVEM on T lymphocytes by LIGHT provides positive co-stimulatory signals, which leads to survival, proliferation, and differentiation of and IFNγ secretion from T lymphocytes (Del Rio et al. Journal Leukocyte Biology 2010; 87:223-235). Ligation of HVEM on B lymphocytes by LIGHT co-stimulates CD40L-mediated proliferation and antibody secretion, thereby enhancing humoral responses (Del Rio et al. Journal Leukocyte Biology 2010; 87:223-235). Ligation of HVEM on immature dendritic cells by LIGHT co-stimulates CD40L-mediated maturation, cytokine secretion (IL-12, IL-6, and TNF-α), and priming of specific anti-tumour CTLs and their production of IFN-γ (Del Rio et al. Journal Leukocyte Biology 2010; 87:223-235).

In order to analyse the effect of mouse anti-human HVEM antibodies on membrane-bound human HVEM-mediated NFκB signalling, the NFκB-response element-luciferase (RE-luc) human HVEM Bioassay Reporter Cells (HEK293; Promega) were used to examine the ability of mouse anti-human HVEM antibodies to activate HVEM-mediated NFκB signalling.

Briefly, human HVEM expressing NFκB-RE-luc cells were plated at 35,000 cells/well in flat-bottomed TC-treated white-solid 96-wells plates (Corning), and were incubated overnight at 37° C./5% CO$_2$. Next day, these cells were washed, and subsequently incubated with or without 0.0015-10 µg/mL (3-fold dilution steps) mouse anti-human HVEM antibodies. Titrated (i.e., 0, 0.0015-10 µg/mL (3-fold dilution steps)) soluble his-tagged human LIGHT (R&D Systems) was run in parallel for reference purposes. After 6 hours incubation at 37° C./5% CO$_2$, luciferase production in human HVEM expressing NFκB-NFκB-RE-luc cells was measured using the Bio-Glo™ Luciferase Assay System (Promega) in a luminometer.

As shown in FIG. 3A and Table 2, several examined (7/12) mouse anti-human HVEM antibodies induced dose-dependent NFκB activation in human HVEM expressing NFκB-RE-luc cells (i.e., compared to soluble LIGHT-mediated NFκB induction) to a variable degree (rank order; no. 48H6>36H12>29C2>8H5=45H6=49G4>52D3), which demonstrated their agonistic activity. Control soluble human LIGHT also showed dose-dependent NFκB activation in these human HVEM expressing NFκB-RE-luc cells. In contrast, mouse anti-human HVEM antibodies no. 11H7, 41F11, 43E10, 47E10, and 49A11 showed no agonistic activity in human HVEM expressing NFκB-RE-luc cells (i.e., compared to soluble LIGHT-mediated NFκB induction). Interestingly, there seemed to be a relationship (see Table 2) between the ability of these examined mouse anti-human HVEM antibodies to sterically block the soluble human LIGHT/human HVEM interaction (see Example 2c) and their agonistic activity (i.e., NFκB induction) on membrane human HVEM expressing cells.

TABLE 2

Relationship of mouse anti-human HVEM antibody blocking effects on soluble human LIGHT (sLIGHT) ligand binding to human HVEM membrane receptor (mHVEM; see Example 2c) and their agonistic activity (i.e., compared to sLIGHT-mediated NFκB induction) on membrane human HVEM expressing cells.

| Anti-HVEM Ab | NFκB induction | Blocking interaction sLIGHT/mHVEM |
| --- | --- | --- |
| 8H5 | + | + |
| 29C2 | +/++ | ++ |
| 36H12 | ++/+++ | +++ |
| 43E10 | − | − |
| 45H6 | + | +++ |
| 47E10 | − | − |
| 48H6 | +++ | ++ |
| 11H7 | − | − |
| 41F11 | − | −/+ |
| 49A11 | − | − |
| 49G4 | + | +++ |
| 52D3 | −/+ | ++ |

− = no blocking of LIGHT/HVEM interaction or agonistic activity, + = weak blocking of LIGHT/HVEM interaction or agonistic activity, ++ = intermediate blocking of LIGHT/HVEM interaction or agonistic activity, +++ = strong blocking of LIGHT/HVEM interaction or agonistic activity.

These results demonstrated that mouse anti-human HVEM antibodies, which blocked the human LIGHT/human HVEM interaction (see Example 2c) were able to mimic soluble human LIGHT/human HVEM-mediated NKκB signalling. Noteworthy, soluble human LIGHT has been shown to be much less potent than membrane-bound LIGHT expressing cells for activating human HVEM expressed on cells (Cheung et al. PNAS 2009; 106:6244-6249).

(b). Effect of Mouse Anti-Human HVEM Antibodies on Soluble Human LIGHT-Induced NFκB Signalling in Membrane Human HVEM Expressing Cells In order to analyse the effect of mouse anti-human HVEM antibodies on soluble human LIGHT-induced NFκB signalling in membrane human HVEM expressing cells, the NFκB-RE-luc human HVEM Bioassay Reporter Cells (HEK293; Promega) were used to examine the ability of mouse anti-human HVEM antibodies to interfere (e.g., blocking, additive or synergistic effect) with soluble LIGHT/membrane HVEM-mediated NFκB signalling.

Briefly, human HVEM expressing NFκB-RE-luc cells were plated at 35,000 cells/well in flat-bottomed TC-treated white-solid 96-wells plates (Corning), and were incubated overnight at 37° C./5% CO$_2$. Next day, these cells were washed, and subsequently incubated with or without 0.0015-10 μg/mL (3-fold dilution steps) mouse anti-human HVEM antibodies in combination with soluble his-tagged human LIGHT (R&D Systems) at 0.3 μg/mL (≈EC80; see Example 2a and FIG. 3A). After 6 hours incubation at 37° C./5% CO$_2$, luciferase production in human HVEM expressing NFκB-NFκB-RE-luc cells was measured using the Bio-Glo™ Luciferase Assay System (Promega) in a luminometer.

Figure 3B:
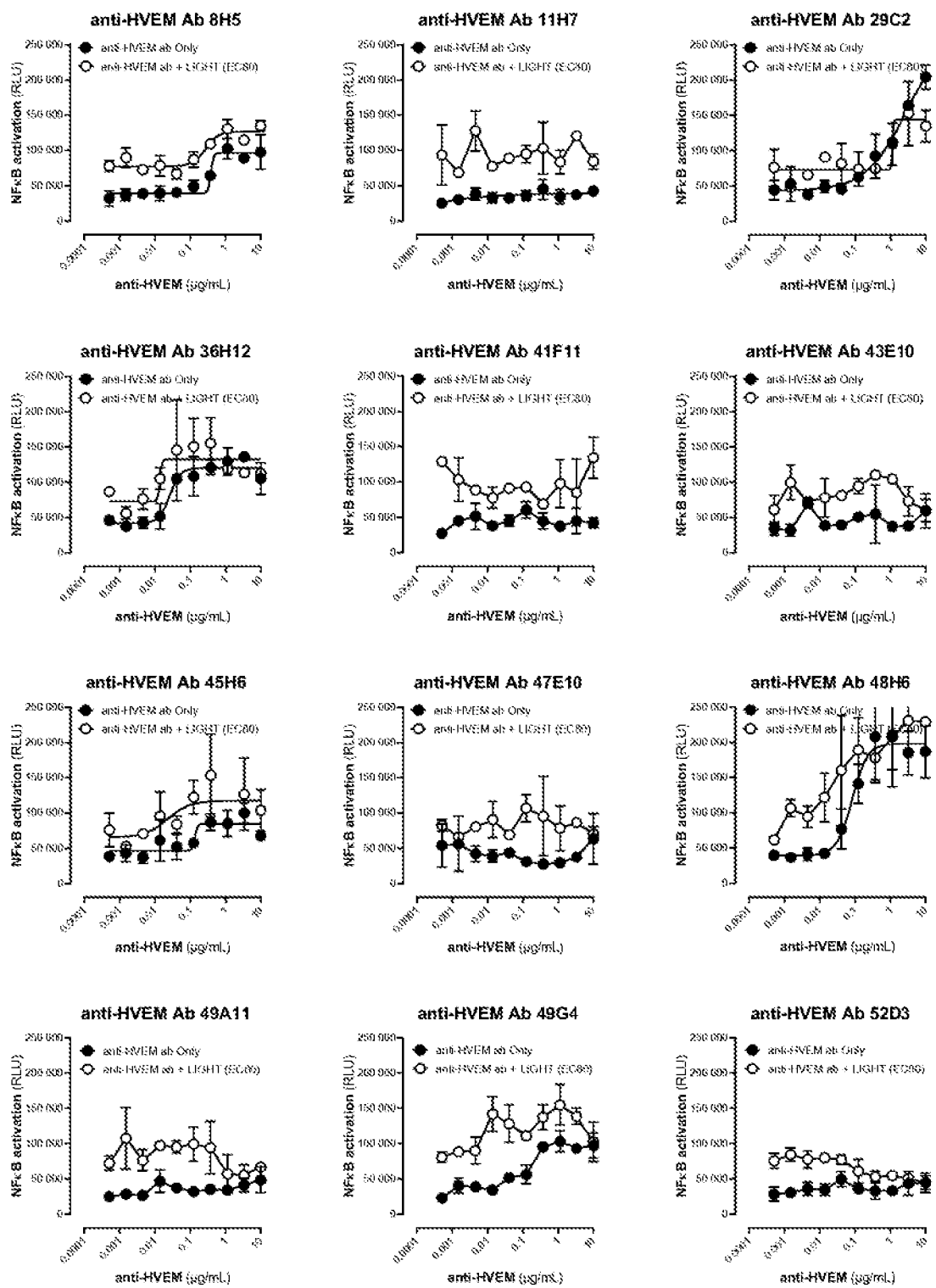
FIG. 3. (A) Effect of mouse anti-human HVEM antibodies on NFκB signalling in membrane-bound human HVEM expressing cells. Soluble human LIGHT ligand was included as reference. (B) Effect of mouse anti-human HVEM antibodies on soluble human LIGHT (≈EC80)-induced NFκB signalling in membrane-bound human HVEM expressing cells. Mean±SD (n=2) are shown.

As shown in FIG. 3B and Table 3, a very weak agonist but intermediate LIGHT/HVEM interaction blocker (see Table 2) mouse anti-human HVEM antibody no. 52D3 was able to weakly but dose-dependently inhibit soluble human LIGHT-mediated NFκB activation in human HVEM expressing NFκB-RE-luc cells. Surprisingly, non-agonist and LIGHT/HVEM interaction non-blocker (see Table 2) mouse anti-human HVEM antibody no. 49A11 was also able to weakly but dose-dependently inhibit soluble human LIGHT-mediated NFκB activation in human HVEM expressing NFκB-RE-luc cells. In addition, non-agonists and LIGHT/HVEM interaction non-blockers (see Table 2) mouse anti-human HVEM antibodies no. 11H7, 41F11, 43E10, and 47E10 showed no effect on soluble human LIGHT-mediated NFκB activation in human HVEM expressing NFκB-RE-luc cells, whereas weak/intermediate/strong agonists and weak/intermediate/strong LIGHT/HVEM interaction blockers (see Table 2) mouse anti-human HVEM antibodies no. 8H5, 29C2, 36H12, 45H6, 48H6 and 49G4 showed possible additive but no synergistic effects on soluble human LIGHT-mediated NFκB activation in human HVEM expressing NFκB-RE-luc cells.

TABLE 3

Summary of mouse anti-human HVEM antibody effects on soluble human LIGHT (sLIGHT) ligand binding to human HVEM membrane receptor (mHVEM; see Example 2c) and their effect on soluble human LIGHT-induced agonistic activity (i.e., NFκB induction) on membrane human HVEM expressing cells.

| Anti-HVEM Ab | Blocking sLIGHT NFκB induction | Blocking interaction sLIGHT/mHVEM |
| --- | --- | --- |
| 8H5 | −* | + |
| 29C2 | −* | ++ |
| 36H12 | −* | +++ |
| 43E10 | − | − |
| 45H6 | −* | +++ |
| 47E10 | − | − |
| 48H6 | −* | ++ |
| 11H7 | − | − |
| 41F11 | − | −/+ |
| 49A11 | + | − |
| 49G4 | −* | +++ |
| 52D3 | + | ++ |

− = no blocking of LIGHT/HVEM interaction or of LIGHT-induced agonistic activity, + = weak blocking of LIGHT/HVEM interaction or of LIGHT-induced agonistic activity, ++ = intermediate blocking of LIGHT/HVEM interaction or of LIGHT-induced agonistic activity, +++ = strong blocking of LIGHT/HVEM interaction or of LIGHT-induced agonistic activity.
*= Agonistic effect of either LIGHT and/or mouse anti-human HVEM antibody.

These results demonstrated that mouse anti-human HVEM antibodies, which block the human LIGHT/human HVEM interaction (except for LIGHT/HVEM interaction non-blocker mouse anti-human HVEM antibody no. 49A11; see also Example 2c) were either able to block or to mimic soluble human LIGHT/human HVEM-mediated NKκB signalling.

(c). Effect of Mouse Anti-Human HVEM Antibodies on Membrane Human BTLA/Membrane Human HVEM-Mediated Inhibition of TCR-Induced NFAT Signalling in Membrane Human BTLA/Membrane Human TCR Expressing T Cells Like described above, ligation of HVEM on T lymphocytes by LIGHT delivers positive co-stimulatory signals through HVEM, whereas engagement of BTLA on T lymphocytes by HVEM provides negative co-inhibitory signals to T lymphocytes via BTLA (Del Rio et al. Journal Leukocyte Biology 2010; 87:223-235). This BTLA/HVEM pathway down-regulates TCR-mediated signalling in both CD4 and CD8 T lymphocytes, and results in decreased T lymphocyte proliferation and cytokine production. Engagement of BTLA on B lymphocytes by HVEM reduces activation of signalling molecules downstream of the BCR and attenuates B cell proliferation (Vendel et al. Journal Immunology 2009; 182:1509-1517). Unlike PD-1 and CTLA4, BTLA is not expressed on regulator T (Treg) lymphocytes (Del Rio et al. Journal Leukocyte Biology 2010; 87:223-235).

In order to analyse the effect of mouse anti-human HVEM antibodies on membrane human BTLA/membrane human HVEM-mediated inhibition of membrane human TCR-induced NFAT signalling, the NFAT-response element-luciferase (RE-luc) human BTLA/HVEM Blockade Bioassay (containing a combination of (1) membrane human HVEM and a proprietary membrane human TCR activator expressing CHO-K1 Activator cells (artificial antigen-presenting cells), and of (2) membrane human BTLA and membrane human TCR expressing NFAT-RE-luc Jurkat Effector T cells; Promega) was used to examine the ability of mouse anti-human HVEM antibodies to block the BTLA/HVEM-mediated inhibition of TCR-induced NFAT signalling.

Figure 4A:
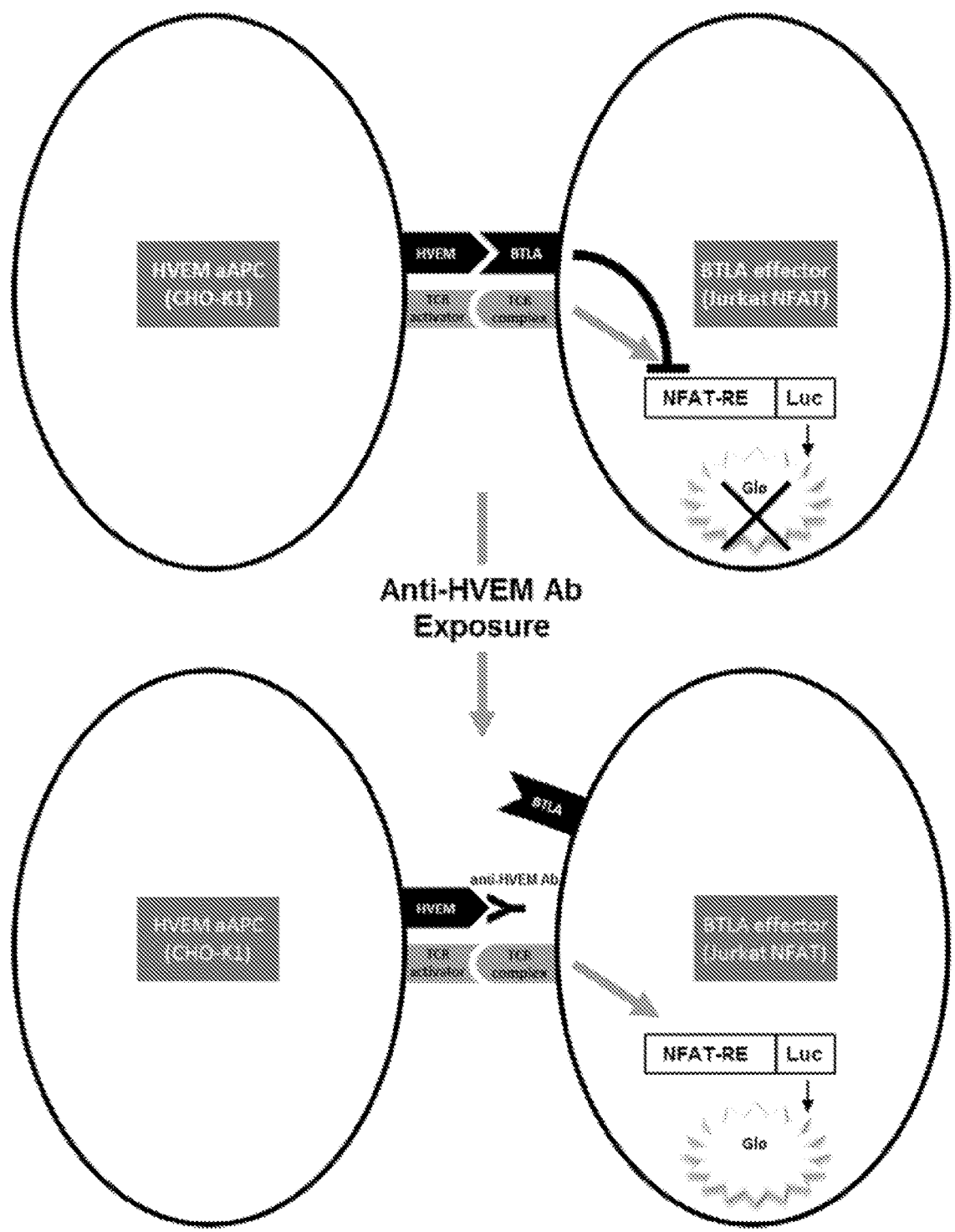
FIG. 4. (A) Assay principle of the NFAT-response element-luciferase (RE-luc) human BTLA/HVEM Blockade Bioassay: a combination of (1) membrane human HVEM and proprietary membrane human T cell receptor (TCR) activator expressing CHO-K1 Activator cells (i.e., artificial antigen-presenting cells (aAPC)) and of (2) membrane human BTLA and membrane human TCR complex expressing NFAT-RE-luc Jurkat Effector T cells is used to examine the ability of mouse anti-human HVEM antibodies to block the BTLA/HVEM-mediated inhibition of TCR-induced NFAT signalling. (B) Effect of mouse anti-human HVEM antibodies on membrane-bound human BTLA/human HVEM-mediated inhibition of TCR-induced NFAT signalling in membrane-bound human BTLA/human TCR expressing Jurkat Effector T cells. Mean±SD (n=2) are shown.

In this BTLA/HVEM Blockade Bioassay, membrane human BTLA and membrane human TCR expressing NFAT-RE-luc Jurkat Effector T cells are used as effector cells, and membrane human HVEM and a proprietary membrane human TCR activator expressing CHO-K1 Activator cells are used as artificial antigen-presenting cells. When these two cells are co-cultivated, TCR complexes on effector cells are activated by TCR activator expressing artificial antigen-presenting cells, resulting in expression of the NFAT luciferase reporter. However, BTLA and HVEM ligation prevents TCR activation and suppresses the NFAT-responsive luciferase activity. This inhibition can be specifically reversed by exposure to blocking anti-HVEM antibodies. Neutralizing anti-HVEM antibodies block BTLA/HVEM interaction and promote T cell activation (i.e., "releasing the brake"), resulting in reactivation of the NFAT responsive luciferase reporter (see FIG. 4A).

Briefly, human HVEM and proprietary human TCR activator expressing CHO-K1 Activator cells were plated at 40,000 cells/well in flat-bottomed TC-treated white-solid 96-wells plates (Corning), and were incubated overnight at 37° C./5% $CO_2$. Next day, these cells were washed, and subsequently incubated with or without 0.0015-10 µg/mL (3-fold dilution steps) mouse anti-human HVEM antibodies. Then, human BTLA and human TCR expressing NFAT-RE-luc Jurkat Effector T cells were added at 50,000 cells/well. After 6 hours incubation at 37° C./5% $CO_2$, luciferase production in human BTLA and human TCR expressing NFAT-RE-luc Jurkat Effector T cells was measured using the Bio-Glo™ Luciferase Assay System (Promega) in a luminometer.

As shown in FIG. 4B and Table 4, several examined (8/12) mouse anti-human HVEM antibodies dose-dependently blocked the BTLA/HVEM-mediated inhibition of TCR-induced NFAT signalling in human BTLA and human TCR expressing NFAT-RE-luc Jurkat Effector T cells to a variable degree (rank order; no. 45H6>49G4>36H12>11H7>8H5=41F11=48H6=49A11). In contrast, mouse anti-human HVEM antibodies no. 29C2, 43E10, 47E10, and 52D3 showed no effect on the BTLA/HVEM-mediated inhibition of TCR-induced NFAT signalling in human BTLA and human TCR expressing NFAT-RE-luc Jurkat Effector T cells. Interestingly, there seemed to be a relationship (see Table 4) between the ability of these examined mouse anti-human HVEM antibodies to sterically block the soluble human BTLA/human HVEM interaction (see Example 2c) and their blocking capacity (i.e., abrogation of BTLA/HVEM-mediated inhibition of TCR-induced NFAT signalling) in the NFAT-RE-luc human BTLA/HVEM Blockade Bioassay.

TABLE 4

Relationship of mouse anti-human HVEM antibody blocking effects on soluble human BTLA (sBTLA) ligand binding to human HVEM membrane receptor (mHVEM; see Example 2c) and their blocking effect on membrane human BTLA/membrane human HVEM-induced (mBTLA/mHVEM) inhibition of TCR-induced NFAT signalling in membrane human BTLA/TCR expressing Effector T cells.

| Anti-HVEM Ab | Blocking mBTLA/mHVEM TCR-NFAT inhibition | Blocking interaction sBTLA/mHVEM |
| --- | --- | --- |
| 8H5 | + | +++ |
| 29C2 | − | − |
| 36H12 | ++ | +++ |
| 43E10 | − | − |
| 45H6 | +++ | +++ |
| 47E10 | − | − |
| 48H6 | + | +++ |
| 11H7 | +/++ | +++ |
| 41F11 | + | ++ |
| 49A11 | + | ++ |
| 49G4 | ++/+++ | +++ |
| 52D3 | − | −* |

− = no blocking of BTLA/HVEM interaction or of BTLA/HVEM-induced TCR-NFAT inhibition, + = weak blocking of BTLA/HVEM interaction or of BTLA/HVEM-induced TCR-NFAT inhibition, ++ = intermediate blocking of BTLA/HVEM interaction or of BTLA/HVEM-induced TCR-NFAT inhibition, +++ = strong blocking of BTLA/HVEM interaction or of BTLA/HVEM-induced TCR-NFAT inhibition.
*= Enhanced binding of BTLA to human HVEM.

These results demonstrated that mouse anti-human HVEM antibodies, which blocked the human BTLA/human HVEM interaction (see Example 2c) were able to block the human BTLA/human HVEM-mediated inhibition of TCR-induced NFAT signalling Example 4. Molecular Genetic Characterization of BTLA/HVEM Blocking Mouse Anti-Human HVEM Monoclonal Antibodies No. 36H12, 45H6, 48H6, 11H7, and 49G4

Hybridoma cells producing BTLA/HVEM blocking mouse anti-human HVEM antibody no. 36H12, 45H6, 48H6, 11H7, and 49G4 were washed with PBS, and aliquoted in microvials containing $5 \times 10^6$ cells, and stored as pellets at −80° C. These cell pellets were used to isolate RNA by using RNeasy Mini Isolation Kit (QIAGEN). RNA concentration was determined (A260 nm), and RNA was stored at −80° C. By reverse transcriptase, cDNA was synthesized from 1 µg of RNA using the RevertAid™ H Minus First Strand cDNA Synthesis Kit (Fermentas), and stored at −80° C. Based on the isotype mouse IgG1/kappa, primers as shown in Table 5 were designed to amplify the variable (V) regions of BTLA/HVEM blocking mouse anti-human HVEM antibody no. 36H12, 45H6, 48H6, 11H7, and 49G4.

TABLE 5

PCR primers used to amplify cDNA of BTLA/HVEM blocking mouse anti-human HVEM antibody no. 36H12, 45H6, 48H6, 11H7, and 49G4.

| No.* | Sequence | s/as | Gene |
| --- | --- | --- | --- |
| 383 | ATGAAGTTGCCTGTTAGGCTGTT GGTGCTG (SEQ ID NO. 7) | s | VL |
| 387 | ATGGATTTWCAGGTGCAGATTWT CAGCTTC (SEQ ID NO. 8) | s | VL |
| 389 | ATGGGCWTCAAAGATGGAGTCACA (SEQ ID NO. 9) | s | VL |

TABLE 5-continued

PCR primers used to amplify cDNA of
BTLA/HVEM blocking mouse anti-human
HVEM antibody no. 36H12, 45H6, 48H6,
11H7, and 49G4.

| No.* | Sequence | s/as | Gene |
|------|----------|------|------|
| 394 | ACTGGATGGTGGGAAGATGG (SEQ ID NO. 10) | as | Ck |
| 404 | ATGAAATGCAGCTGGGGCATSTT CTTC (SEQ ID NO. 11) | s | VH |
| 407 | ATGRACTTTGGGYTCAGCTTGRTTT (SEQ ID NO. 12) | s | VH |
| 408 | ATGGGACTCCAGGCTCAATTTAGTT TTCCTT (SEQ ID NO. 13) | s | VH |
| 409 | ATGGCTTGTCYTTRGSGCTRCTCTT CTGC (SEQ ID NO. 14) | s | VH |
| 416 | CAGTGGATAGACAGATGGGGG (SEQ ID NO. 15) | as | CH | s = sense; as = antisense; VL = variable light chain region; VH = variable heavy chain region; Ck = constant mouse kappa (κ) light chain region; CH = constant mouse IgG1 heavy chain region;
*Numbering according to Bioceros BV internal coding system; degenerated primers: K = G or T, S = G or C, R = A or G, M = A or C, W = A or T, Y = C or T, H = A or C or T, and N = any base.

Primers 383, 387, and 389 are sense primers designed to anneal with the signal peptide of the light chain of a mouse antibody; primer 394 is an antisense primer annealing with the constant region of mouse k light chain. Primers 404, 407, 408, and 409 are sense primers annealing with the signal peptide of the heavy chain of a mouse antibody; primer 416 is antisense primer designed to anneal with the constant region of mouse IgG1 heavy chain. Various PCRs were done using primer combinations shown in Table 5. Generated PCR products were subcloned in pCR™-Blunt II-TOPO® vector. Subsequently, cloned inserts were sequenced.

From heavy chain and light chain sequence reactions, a total of 8 and 4 informative sequences, respectively, were obtained of amino acid sequences of mouse anti-human HVEM antibody 36H12. Based on this information, consensus amino acid sequences of VH and VL regions of mouse anti-human HVEM antibody 36H12 were determined, and are set forth in SEQ ID NO. 16 and 17, respectively. The amino acid sequences of the CDRs of VH and VL regions of mouse anti-human HVEM antibody 36H12 are set forth in SEQ ID NO. 18-20 and 21-23, respectively.

From both heavy chain and light chain sequence reactions, a total of 4 informative sequences were obtained of mouse anti-human HVEM antibody 45H6. Based on this information, consensus amino acid sequences of VH and VL regions of mouse anti-human HVEM antibody 45H6 were determined, and are set forth in SEQ ID NO. 24 and 25, respectively. The amino acid sequences of the CDRs of VH and VL regions of mouse anti-human HVEM antibody 45H6 are set forth in SEQ ID NO. 26-28 and 29-31, respectively.

From heavy chain and light chain sequence reactions, a total of 5 and 4 informative sequences, respectively, were obtained of mouse anti-human HVEM antibody 48H6. Based on this information, consensus amino acid sequences of VH and VL regions of mouse anti-human HVEM antibody 48H6 were determined, and are set forth in SEQ ID NO. 32 and 33, respectively. The amino acid sequences of the CDRs of VH and VL regions of mouse anti-human HVEM antibody 48H6 are set forth in SEQ ID NO. 34-36 and 37-39, respectively.

From heavy chain and light chain sequence reactions, a total of 9 and 3 informative sequences, respectively, were obtained of mouse anti-human HVEM antibody 11H7. Based on this information, consensus amino acid sequences of VH and VL regions of mouse anti-human HVEM antibody 11H7 were determined, and are set forth in SEQ ID NO. 40 and 41, respectively. The amino acid sequences of the CDRs of VH and VL regions of mouse anti-human HVEM antibody 11H7 are set forth in SEQ ID NO. 42-44 and 45-47, respectively.

From heavy chain and light chain sequence reactions, a total of 5 and 3 informative sequences, respectively, were obtained of mouse anti-human HVEM antibody 49G4. Based on this information, consensus amino acid sequences of VH and VL regions of mouse anti-human HVEM antibody 49G4 were determined, and are set forth in SEQ ID NO. 48 and 49, respectively. The amino acid sequences of the CDRs of VH and VL regions of mouse anti-human HVEM antibody 49G4 are set forth in SEQ ID NO. 50-52 and 53-55, respectively.

Example 5. Generation of BTLA/HVEM Blocking Chimeric Mouse/Human IgG4/Kappa (i.e., Exchanging Mouse Constant IgG1/Kappa Regions for Human Constant IgG4/Kappa Regions) Anti-Human HVEM Monoclonal Antibodies No. 36H12, 45H6, 48H6, 11H7, and 49G4

Based on determined mouse V-regions (see Example 4 above) of BTLA/HVEM blocking mouse anti-human HVEM antibodies, a design was made to generate chimeric mouse/human anti-human HVEM antibody versions. To this end, for mammalian expression-optimized cDNA sequences, SEQ ID NO. 56 (coding for chimeric mouse/human heavy IgG4 chain 36H12), NO. 57 (coding for chimeric mouse/human heavy IgG4 chain 45H6), NO. 58 (coding for chimeric mouse/human heavy IgG4 chain 48H6), NO. 59 (coding for chimeric mouse/human heavy IgG4 chain 11H7), and NO. 60 (coding for chimeric mouse/human heavy IgG4 chain 49G4), and SEQ ID NO. 61 (coding for chimeric mouse/human light κ chain 36H12), NO. 62 (coding for chimeric mouse/human light k chain 45H6), NO. 63 (coding for chimeric mouse/human light k chain 48H6), NO. 64 (coding for chimeric mouse/human light k chain 11H7), and NO. 65 (coding for chimeric mouse/human light κ chain 49G4), were ordered at GENEART (Regensburg, Germany), which encoded a human signal peptide followed by either the mouse VH chain linked to the human stabilized IgG4 constant region (i.e., S239P; according Angal et al in Mol. Immunol., Vol. 30, No. 1, pp. 105-108, 1993), or followed by the mouse VL chain linked to the human kappa constant region. Using suitable restriction enzymes, generated cDNAs were subcloned in pcDNA3.1-derived expression plasmids. Subsequently, chimeric antibodies were transiently expressed in 293-F cells (Invitrogen) using the FreeStyle™ 293 Expression System (Invitrogen). Expressed chimeric anti-human HVEM antibodies were purified from supernatants using conventional affinity chromatography protein A columns. After this, LPS levels were determined using the LAL chromogenic endpoint assay (Hycult Biotech), and all our purified chimeric mouse/human anti-human HVEM antibodies (i.e., 36H12, 45H6, 48H6, 11H7, and 49G4) contained <0.0005 EU LPS/µg chimeric IgG.

For chimeric amino acid sequences, see SEQ ID NO. 66 (chimeric mouse/human heavy IgG4 chain 36H12), NO. 67 (chimeric mouse/human heavy IgG4 chain 45H6), NO. 68 (chimeric mouse/human heavy IgG4 chain 48H6), NO. 69 (chimeric mouse/human heavy IgG4 chain 11H7), and NO. 70 (chimeric mouse/human heavy IgG4 chain 49G4), and SEQ ID NO. 71 (chimeric mouse/human light κ chain 36H12), NO. 72 (chimeric mouse/human light κ chain 45H6), NO. 73 (chimeric mouse/human light κ chain 48H6), NO. 74 (chimeric mouse/human light κ chain 11H7), and NO. 75 (chimeric mouse/human light κ chain 49G4).

Example 6. Binding and Biological Characterization of BTLA/HVEM Blocking Chimeric Mouse/Human Anti-Human HVEM Antibodies No. 36H12, 45H6, 48H6, 11H7, and 49G4

(a). Relative Binding Affinity of BTLA/HVEM Blocking Chimeric Mouse/Human Anti-Human HVEM Antibodies for Membrane-Bound Human HVEM In order to determine the relative binding affinity of purified BTLA/HVEM blocking chimeric mouse/human anti-human HVEM antibodies no. 36H12, 45H6, 48H6, 11H7, and 49G4 for human HVEM, FACS analysis was used.

To this end, stable human full-length HVEM-transfected HEK293F cells (clone no. 128; see Example 1 (a) above) were put at $10 \times 10^6$ cells/mL in ice-chilled PBS containing 0.1% BSA (Sigma)/0.05% NaN$_3$ (PBS/BSA/NaN$_3$) supplemented with 50 μg/mL human IgGs (blocking possible Fcγ receptors; Sigma) for 10 minutes at 4° C. Then, 10 μL/tube (i.e., $0.1 \times 10^6$ cells) of these cells were incubated with or without 100 μL titrated (in PBS/BSA/NaN$_3$) purified BTLA/HVEM blocking chimeric mouse/human anti-human HVEM antibody/tube for 30 minutes at 4° C. After extensive washing in PBS/BSA/NaN$_3$, cells were subsequently incubated with 1:200 diluted PE-conjugated goat anti-human IgG Fcγ-specific antibodies (Jackson ImmunoResearch) for 30 minutes at 4° C. After extensive washing in PBS/BSA/NaN$_3$, cells were fixed in 4% formaldehyde in PBS/BSA/NaN$_3$ for 30 minutes at 4° C. Binding (geo-mean fluorescence intensity) of chimeric mouse/human anti-human HVEM antibodies no. 36H12, 45H6, 48H6, 11H7, and 49G4 on membrane human HVEM was measured using a flow cytometer (FACSCalibur; BD Biosciences). For comparison, purified BTLA/HVEM blocking mouse anti-human HVEM antibody counterparts no. 36H12, 45H6, 48H6, 11H7, and 49G4 were run in parallel, and their binding was monitored as described in Example 2 (a).

Figure 5:
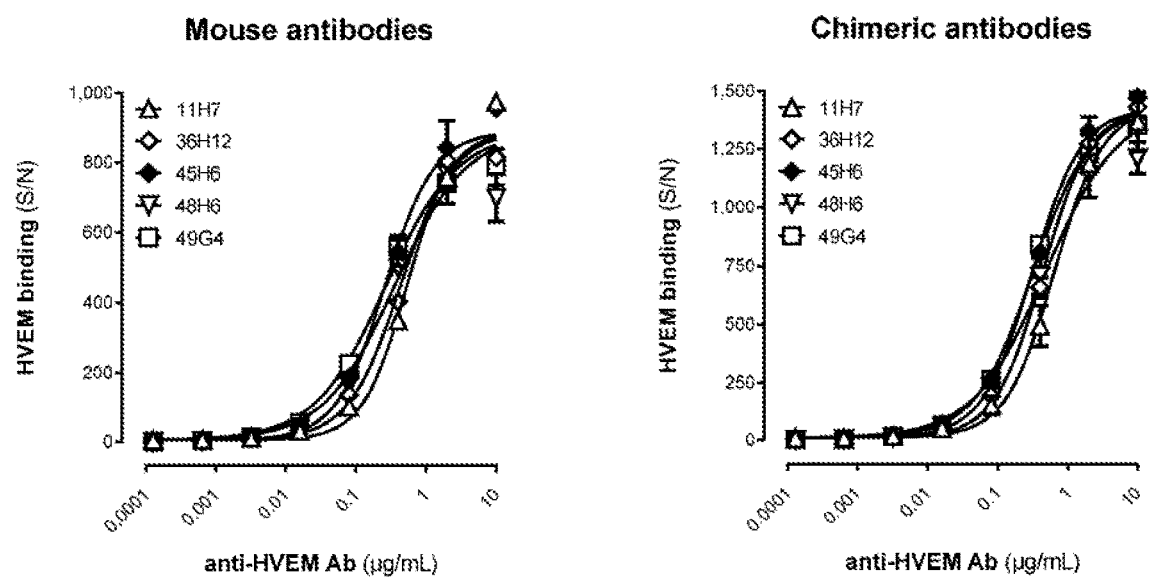
FIG. 5. Flow-cytometric binding characteristics of purified BTLA/HVEM blocking mouse versus chimeric mouse/human anti-human HVEM antibodies to membrane-bound (full-length) human HVEM on HEK293F cells. Mean±SD (n=2) are shown.

As shown in FIG. 5, BTLA/HVEM blocking chimeric mouse/human anti-human HVEM antibodies no. 36H12, 45H6, 48H6, 11H7, and 49G4 dose-dependently bound to membrane human HVEM. Based on their binding profile, the following relative affinity ranking was found (from high to lower affinity): 45H6=49G4>36H12=48H6>11H7. For comparison, their BTLA/HVEM blocking mouse anti-human HVEM antibody counterparts no. 36H12, 45H6, 48H6, 11H7, and 49G4 also showed dose-dependent binding to membrane human HVEM and demonstrated a very similar relative affinity ranking, i.e., 45H6=49G4>36H12=48H6>11H7. More specifically, chimeric mouse/human anti-human HVEM antibody no. 45H6, 49G4, 36H12, 48H6, and 11H7 resulted in the following relative affinities (i.e., half-maximum binding EC50) of 306, 312, 433, 472, and 630 ng/mL, respectively, while corresponding mouse anti-human HVEM antibody no. 45H6, 49G4, 36H12, 48H6, and 11H7 resulted in relative affinities of 260, 266, 430, 356, and 532 ng/mL, respectively, which indicated that binding affinities of the BTLA/HVEM blocking chimeric mouse/human anti-human HVEM antibody no. 36H12, 45H6, 48H6, 11H7, and 49G4 against membrane-bound HVEM seemed to remain unaltered during the chimerization process.

b). Effect of BTLA/HVEM Blocking Chimeric Mouse/Human Anti-Human HVEM Antibodies on Binding of Human BTLA, Human CD160, Human LIGHT, and Human TNFβ to Membrane-Bound Human HVEM Extracellular HVEM has two spatially ligand-binding regions (Cai et al. Immunol Rev 2009; 229:244-258; Steinberg et al. Immunol Rev 2011; 244:169-187; Pasero et al. Curr Opin Pharmacol 2012; 12:478-485), one region for canonical ligands, which belong to the TNF superfamily (i.e., LIGHT and TNFβ), and another region for non-canonical ligands, which belong to the Ig superfamily (i.e., BTLA and CD160). Mutational analysis and molecular modelling revealed that BTLA and CD160 interact with CRD1, whereas LIGHT and TNFβ binding reside in CRD2 and CRD3 on the opposite face of HVEM.

In order to analyse the effect of purified BTLA/HVEM blocking chimeric mouse/human anti-human HVEM antibodies no. 36H12, 45H6, 48H6, 11H7, and 49G4 on binding of human BTLA, human CD160, human LIGHT, and human TNFβ to membrane-bound human HVEM, the ability of chimeric mouse/human anti-human HVEM antibodies to sterically hinder the interaction of human BTLA, of human CD160, of human LIGHT, and of human TNFβ (or also called LTα) on human full-length HVEM, expressed on the surface of (HEK-derived) 293F cells, was determined by FACS analysis.

Generation of human 'full-length' HVEM-transfected HEK293F cells (clone no. 128) is described in Example 1a. Binding of soluble human BTLA, of soluble human CD160, of soluble human LIGHT, and of soluble human TNFβ on surface human HVEM-transfected cells was analysed by FACS analysis. To this end, stable human full-length HVEM-transfected HEK293F cells were put at $10 \times 10^6$ cells/mL in ice-chilled phosphate-buffered saline containing 0.1% BSA (Sigma)/0.05% NaN$_3$ (PBS/BSA/NaN$_3$) supplemented with 50 μg/mL human IgGs (blocking possible Fcγ receptors; Sigma) for 10 minutes at 4° C. Then, 10 μL/tube (i.e., $0.1 \times 10^6$ cells) of these cells were incubated with or without 100 μL purified chimeric mouse/human anti-HVEM antibody at 10 μg/mL/tube or a human IgG4/K (Sigma) negative isotype control at 10 μg/mL/tube for 30 minutes at 4° C. After this (i.e., without washing), cells were subsequently incubated with 1 μg/mL soluble biotinylated human BTLA (Sino Biological Inc), with 10 μg/mL soluble his-tagged human CD160 (Sino Biological Inc), with 1 μg/mL soluble his-tagged human LIGHT (Sino Biological Inc), or with 0.1 μg/mL soluble biotinylated human TNFβ (Sino Biological Inc) in PBS/BSA/NaN$_3$ for 30 minutes at 4° C. After extensive washing in PBS/BSA/NaN$_3$, cells were incubated with 1:200 diluted PE-conjugated streptavidin (detection BTLA and TNFβ; Jackson ImmunoResearch) or with biotinylated mouse anti-his antibody (detection CD160 and LIGHT; R&D Systems) at 10 μg/mL for 30 minutes at 4° C. After extensive washing in PBS/BSA/NaN$_3$, cells were incubated with 1:200 diluted PE-conjugated streptavidin (detection CD 160 and LIGHT; Jackson ImmunoResearch) for 30 minutes at 4° C. After extensive washing in PBS/BSA/NaN$_3$, cells were fixed in 4% formaldehyde in PBS/BSA/NaN$_3$ for 30 minutes at 4° C. Binding of ligands BTLA, CD160, LIGHT and TNFβ on membrane human HVEM was measured using a flow cytometer (model FACSCalibur; BD Biosciences). For comparison, purified BTLA/HVEM blocking mouse anti-human HVEM antibody counterparts no. 36H12, 45H6, 48H6, 11H7, and 49G4 at 10 μg/mL/tube and a mouse IgG1 (BD Biosciences) negative isotype control at 10 μg/mL/tube were run in parallel.

As shown in FIG. 6A, BTLA/HVEM blocking chimeric mouse/human anti-human HVEM antibodies no. 36H12, 45H6, 48H6, 11H7, and 49G4 prevented (i.e., >95% blocking) human BTLA binding to membrane human HVEM, which was comparable to their BTLA/HVEM blocking mouse anti-human HVEM antibody counterparts no. 36H12, 45H6, 48H6, 11H7, and 49G4 (i.e., >95% blocking).

As shown in FIG. 6B, BTLA/HVEM blocking chimeric mouse/human anti-human HVEM antibodies no. 36H12, 45H6, 48H6, 11H7, and 49G4 partially prevented (i.e., ≈60-65% blocking) human CD160 binding to membrane human HVEM, which was comparable to their BTLA/HVEM blocking mouse anti-human HVEM antibody counterparts no. 36H12, 45H6, 48H6, 11H7, and 49G4 (i.e., ≈45-55% blocking).

As shown in FIG. 6C, BTLA/HVEM blocking chimeric mouse/human anti-human HVEM antibodies no. 36H12, 45H6, 48H6, and 49G4 partially prevented (i.e., ≈30-50% blocking) human LIGHT binding to membrane human HVEM, which was comparable to their BTLA/HVEM blocking mouse anti-human HVEM antibody counterparts no. 36H12, 45H6, 48H6, and 49G4 (i.e., ≈40-50% blocking). In contrast, BTLA/HVEM blocking chimeric mouse/human anti-human HVEM antibody no. 11H7 did not prevent but surprisingly seemed to enhance or stabilize (i.e., ≈20% enhancement) human LIGHT binding to membrane human HVEM, which was comparable to their BTLA/HVEM blocking mouse anti-human HVEM antibody counterpart no. 11H7 (i.e., ≈10% enhancement).

As shown in FIG. 6D, BTLA/HVEM blocking chimeric mouse/human anti-human HVEM antibodies no. 36H12, 45H6, 48H6, 11H7, and 49G4 (partially) prevented human TNFβ binding to membrane human HVEM to a variable degree (order; no. 36H12=45H6=48H6 (i.e., >94% blocking)>49G4 (i.e., >80% blocking)>11H7 (i.e., >55% blocking)), which was comparable to their BTLA/HVEM blocking mouse anti-human HVEM antibody counterparts no. 36H12, 45H6, 48H6, 11H7, and 49G4 (rank order; no. 36H12=45H6=48H6 (i.e., >95% blocking)>49G4 (i.e., >85% blocking)>11H7 (i.e., >60% blocking)).

c). Effect of BTLA/HVEM Blocking Chimeric Mouse/Human Anti-Human HVEM Antibodies on Displacement of Pre-Bound Human BTLA, Human CD160, Human LIGHT, and Human TNFβ from Membrane-Bound Human HVEM In order to analyse whether purified BTLA/HVEM blocking chimeric mouse/human anti-human HVEM antibodies no. 36H12, 45H6, 48H6, 11H7, and 49G4 were able to displace pre-bound human BTLA, human CD160, human LIGHT, and human TNFβ from membrane-bound human HVEM, the effect of chimeric mouse/human anti-human HVEM antibodies on human BTLA, on human CD160, on human LIGHT, and on human TNFβ (or also called LTα) displacement from human full-length HVEM, expressed on the surface of (HEK-derived) 293F cells, was determined by FACS analysis.

Generation of human 'full-length' HVEM-transfected HEK293F cells (clone no. 128) is described in Example 1a. Displacement of pre-bound soluble human BTLA, soluble human CD160, soluble human LIGHT, and soluble human TNFβ from surface human HVEM-transfected cells was analysed by FACS analysis. To this end, stable human full-length HVEM-transfected HEK293F cells were put at $10 \times 10^6$ cells/mL in ice-chilled phosphate-buffered saline containing 0.1% BSA (Sigma)/0.05% NaN$_3$ (PBS/BSA/NaN$_3$) supplemented with 50 μg/mL human IgGs (blocking possible Fcγ receptors; Sigma) for 10 minutes at 4° C. Then, 10 μL/tube (i.e., $0.1 \times 10^6$ cells) of these cells were incubated without or with 50 μL soluble biotinylated human BTLA-human Fcγ fusion protein (Sino Biological Inc) at 2 μg/mL/tube, with soluble his-tagged human CD160 (Sino Biological Inc) at 20 μg/mL/tube, with soluble his-tagged human LIGHT (Sino Biological Inc) at 2 μg/mL/tube, or with soluble biotinylated human TNFβ (Sino Biological Inc) at 0.2 μg/mL/tube in PBS/BSA/NaN$_3$ for 30 minutes at 4° C. After this (i.e., without washing), cells were subsequently incubated with 50 μL purified chimeric mouse/human anti-HVEM antibody at 20 μg/mL/tube or a human IgG4/K (Sigma) negative isotype control at 20 μg/mL/tube for 30 minutes at 4° C. After extensive washing in PBS/BSA/NaN$_3$, cells were incubated with 1:200 diluted PE-conjugated streptavidin (detection BTLA and TNFβ; Jackson ImmunoResearch) or with biotinylated mouse anti-his antibody (detection CD160 and LIGHT; R&D Systems) at 10 μg/mL for 30 minutes at 4° C. After extensive washing in PBS/BSA/NaN$_3$, cells were incubated with 1:200 diluted PE-conjugated streptavidin (detection BTLA and TNFβ; Jackson ImmunoResearch) or with biotinylated mouse anti-his antibody (detection CD160 and LIGHT; R&D Systems) at 10 μg/mL for 30 minutes at 4° C. After extensive washing in PBS/BSA/NaN$_3$, cells were incubated with 1:200 diluted PE-conjugated streptavidin (detection CD160 and LIGHT; Jackson ImmunoResearch) for 30 minutes at 4° C. After extensive washing in PBS/BSA/NaN$_3$, cells were fixed in 4% formaldehyde in PBS/BSA/NaN$_3$ for 30 minutes at 4° C. Residual binding of ligands BTLA, CD160, LIGHT and TNFβ on membrane human HVEM was measured using a flow cytometer (model FACSCalibur; BD Biosciences). For comparison, purified BTLA/HVEM blocking mouse anti-human HVEM antibody counterparts no. 36H12, 45H6, 48H6, 11H7, and 49G4 at 10 μg/mL/tube and a mouse IgG1 (BD Biosciences) negative isotype control at 10 μg/mL/tube were run in parallel.

As shown in FIG. 7A, BTLA/HVEM blocking chimeric mouse/human anti-human HVEM antibodies no. 36H12, 45H6, 48H6, 11H7, and 49G4 displaced (i.e., >95% displacement) pre-bound human BTLA from membrane human HVEM.

As shown in FIG. 7B, BTLA/HVEM blocking chimeric mouse/human anti-human HVEM antibodies no. 36H12, 45H6, 48H6, 11H7, and 49G4 partially displaced (i.e., ≈50-60% displacement) pre-bound human CD160 from membrane human HVEM.

As shown in FIG. 7C, BTLA/HVEM blocking chimeric mouse/human anti-human HVEM antibodies no. 36H12, 45H6, 48H6, and 49G4 did not displace (i.e., <20% displacement) pre-bound human LIGHT from membrane human HVEM. In contrast, BTLA/HVEM blocking chimeric mouse/human anti-human HVEM antibody no. 11H7 did not displace pre-bound human LIGHT from membrane human HVEM but surprisingly seemed to enhance or stabilize pre-bound (i.e., ≈30% enhancement) human LIGHT to membrane human HVEM.

As shown in FIG. 7D, BTLA/HVEM blocking chimeric mouse/human anti-human HVEM antibodies no. 36H12, 45H6, 48H6, and 49G4 (partially) displaced pre-bound human TNFβ from membrane human HVEM to a variable degree (rank order; no. 36H12=45H6=48H6 (i.e., >90% displacement)>49G4 (i.e., >55% displacement)). In contrast, BTLA/HVEM blocking chimeric mouse/human anti-human HVEM antibody no. 11H7 did not seem to displace pre-bound human TNFβ from membrane human HVEM (i.e., <20% displacement).

(d). Effect of BTLA/HVEM Blocking Chimeric Mouse/Human Anti-Human HVEM Antibodies on NFκB Signalling in Membrane Human HVEM Expressing Cells In order to analyse the effect of chimeric mouse/human anti-human HVEM antibodies no. 36H12, 45H6, 48H6, 11H7, and 49G4 on membrane-bound human HVEM-mediated NFκB signalling, the NFκB-response element-luciferase (RE-luc) human HVEM Bioassay Reporter Cells (HEK293; Promega) were used to examine the ability of mouse anti-human HVEM antibodies to activate HVEM-mediated NFκB signalling.

Briefly, human HVEM expressing NFκB-RE-luc cells were plated at 35,000 cells/well in flat-bottomed TC-treated white-solid 96-wells plates (Corning), and were incubated overnight at 37° C./5% $CO_2$. Next day, these cells were washed, and subsequently incubated with or without 0.0015-10 µg/mL (3-fold dilution steps) chimeric mouse/human anti-human HVEM antibodies no. 36H12, 45H6, 48H6, 11H7, and 49G4. Titrated (i.e., 0, 0.0015-10 µg/mL (3-fold dilution steps)) soluble his-tagged human LIGHT (R&D Systems) was run in parallel for reference purposes. After 6 hours incubation at 37° C./5% $CO_2$, luciferase production in human HVEM expressing NFκB-NFκB-RE-luc cells was measured using the Bio-Glo™ Luciferase Assay System (Promega) in a luminometer.

As shown in FIG. 8A, only chimeric mouse/human mouse anti-human HVEM antibody no. 48H6 induced a weak dose-dependent NFκB activation in human HVEM expressing NFκB-RE-luc cells (i.e., compared to soluble LIGHT-mediated NFκB induction), whereas chimeric mouse/human mouse anti-human HVEM antibodies no. 36H12, 45H6, 11H7, and 49G4 showed no or very weak agonistic activity in human HVEM expressing NFκB-RE-luc cells (i.e., compared to soluble LIGHT-mediated NFκB induction). Control soluble human LIGHT also showed dose-dependent NFκB activation in these human HVEM expressing NFκB-RE-luc cells. Noteworthy, soluble human LIGHT has been shown to be much less potent than membrane-bound LIGHT expressing cells for activating human HVEM expressed on cells (Cheung et al. PNAS 2009; 106:6244-6249).

Although the binding affinities of BTLA/HVEM blocking chimeric mouse/human anti-human HVEM antibody no. 36H12, 45H6, 48H6, 11H7, and 49G4 against membrane-bound HVEM seemed to remain unaltered during the chimerization process (see Example 6a), it was surprising that BTLA/HVEM blocking chimeric mouse/human anti-human HVEM antibody no. 36H12, 45H6, 48H6, and 49G4 with their human constant IgG4 Fc-tail were not or only weakly able to mimic soluble human LIGHT/human HVEM-mediated NKκB signalling as opposed to their mouse anti-human HVEM antibody IgG1 counterparts, which clearly showed NFκB signalling activity (see Example 3a).

(e). Effect of Cross-Linked BTLA/HVEM Blocking Chimeric Mouse/Human Anti-Human HVEM Antibodies on NFκB Signalling in Membrane Human HVEM Expressing Cells It is well known that cross-linking of antibodies against human CD40 and OX40/CD134 (both members of the TNF receptor superfamily, like human HVEM/CD270) can enhance their agonistic activity (i.e., mimicking CO40L and OX40L mediating effects, respectively) upon binding to membrane-bound CD40 and OX40 expressing cells (Xu et al. Cancer Cell 2018; 33:664-675; Zhang et al. J Biol Chem 2016; 291:27134-27146). Because of above-described surprising results with BTLA/HVEM blocking chimeric mouse/human anti-human HVEM antibody no. 36H12, 45H6, 48H6, and 49G4 (i.e., not or weakly able to mimic soluble human LIGHT/human HVEM-mediated NKκB signalling as opposed to their mouse anti-human HVEM antibody counterparts, which clearly showed NFκB signalling activity (see Example 6b and 3a, respectively)), the degree of antibody aggregation of (1) chimeric mouse/human and (2) fully mouse versions anti-human HVEM antibody no. 36H12, 45H6, 48H6, 11H7, and 49G4 was determined using size exclusion chromatography analysis, and demonstrated the following: (1) 2.3%, 0.7%, 1.2%, 1.6%, and 9.4% aggregation for chimeric mouse/human anti-human HVEM antibody no. 36H12, 45H6, 48H6, 11H7, and 49G4, respectively, and (2) 36.3%, 25.8%, 19.9%, 12.4%, and 14.8% aggregation for fully mouse anti-human HVEM antibody no. 36H12, 45H6, 48H6, 11H7, and 49G4, respectively. This relatively high degree of antibody aggregation in mouse anti-human HVEM antibody no. 36H12, 45H6, 48H6, and 49G4 preparations strongly suggested that the agonistic activity of mouse anti-human HVEM antibody no. 36H12, 45H6, 48H6, and 49G4 in NFκB-response element-luciferase (RE-luc) human HVEM Bioassay Reporter Cells was an artefactual effect caused by antibody aggregation (i.e, mimicking antibody cross-linking effect). To substantiate this hypothesis, non-cross-linked and cross-linked BTLA/HVEM blocking chimeric mouse/human anti-human HVEM antibody no. 36H12, 45H6, 48H6, 11H7, and 49G4 (with a relatively low degree of antibody aggregation) were examined using the NFκB-response element-luciferase (RE-luc) human HVEM Bioassay Reporter Cells.

Briefly, human HVEM expressing NFκB-RE-luc cells were plated at 35,000 cells/well in flat-bottomed TC-treated white-solid 96-wells plates (Corning), and were incubated overnight at 37° C./5% CO2. Next day, these cells were washed, and subsequently incubated with or without 0.016-10 µg/mL (5-fold dilution steps) chimeric mouse/human anti-human HVEM antibodies no. 36H12, 45H6, 48H6, 11H7, and 49G4, which were pre-treated with or without 10 µg/mL cross-linking goat anti-human IgG Fcγ-specific antibodies (Jackson ImmunoResearch) for 15-30 minutes at RT. Titrated (i.e., 0, 0.016-10 µg/mL (5-fold dilution steps)) soluble his-tagged human LIGHT (Sino Biological Inc) was run in parallel for reference purposes. After 6 hours incubation at 37° C./5% CO2, luciferase production in human HVEM expressing NFκB-NFκB-RE-luc cells was measured using the Bio-Glo™ Luciferase Assay System (Promega) in a luminometer.

Figure 8B:
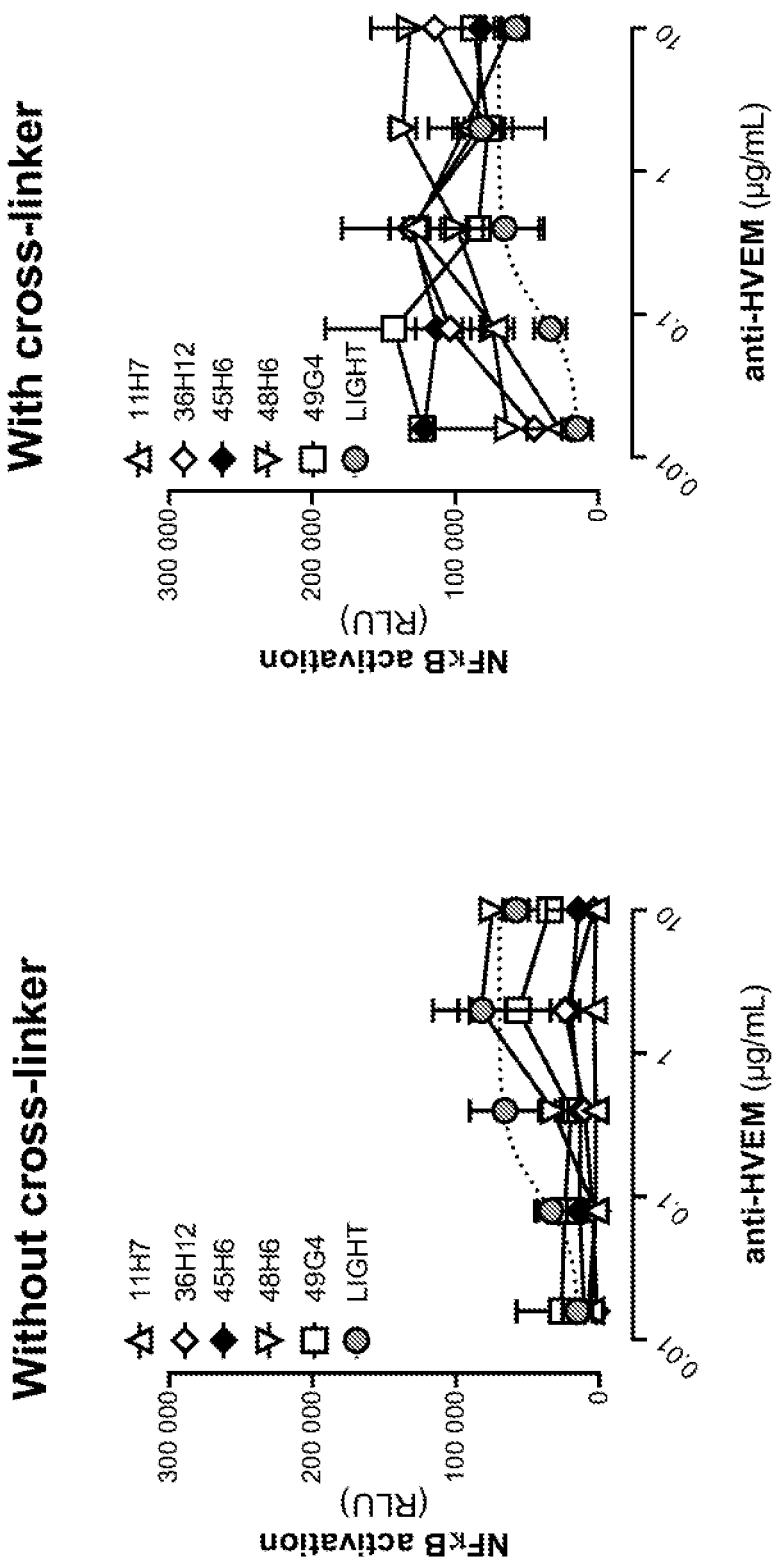
FIG. 8. (A) Effect of purified BTLA/HVEM blocking chimeric mouse/human anti-human HVEM antibodies on NFκB signalling in membrane-bound human HVEM expressing cells. Soluble human LIGHT ligand was included as reference. (B) Effect of non-cross-linked versus cross-linked purified BTLA/HVEM blocking chimeric mouse/human anti-human HVEM antibodies on NFκB signalling in membrane-bound human HVEM expressing cells. Soluble human LIGHT ligand was included as reference. (C) Effect of purified BTLA/HVEM blocking chimeric mouse/human anti-human HVEM antibodies on soluble human LIGHT (~EC80)-induced NFκB signalling in membrane-bound human HVEM expressing cells. Mean±SD (n=2) are shown from one (B) or two (A and C) independent performed experiments.

As shown in FIG. 8B, only non-cross-linked chimeric mouse/human mouse anti-human HVEM antibody no. 48H6 induced a weak dose-dependent NFκB activation in human HVEM expressing NFκB-RE-luc cells (i.e., compared to soluble LIGHT-mediated NFκB induction), whereas non-cross-linked chimeric mouse/human mouse anti-human HVEM antibodies no. 36H12, 45H6, 11H7, and 49G4 showed no or very weak agonistic activity in human HVEM expressing NFκB-RE-luc cells (i.e., compared to soluble LIGHT-mediated NFκB induction). In contrast, all examined cross-linked chimeric mouse/human mouse anti-human HVEM antibodies induced dose-dependent NFκB activation in human HVEM expressing NFκB-RE-luc cells (i.e., compared to soluble LIGHT-mediated NFκB induction). Control soluble human LIGHT also showed dose-dependent NFκB activation in these human HVEM expressing NFκB-RE-luc cells. Noteworthy, soluble human LIGHT has been shown to be much less potent than membrane-bound LIGHT expressing cells for activating human HVEM expressed on cells (Cheung et al. PNAS 2009; 106:6244-6249).

These results demonstrated that non-cross-linked chimeric mouse/human anti-human HVEM antibodies no. 36H12, 45H6, 48H6, 11H7, and 49G4 (with a relatively low degree of antibody aggregation) were not or only weakly able to mimic soluble human LIGHT/human HVEM-mediated NKκB signalling, whereas, upon cross-linking, these chimeric mouse/human anti-human HVEM antibodies no. 36H12, 45H6, 48H6, 11H7, and 49G4 were able to mimic soluble human LIGHT/human HVEM-mediated NKκB signalling. Noteworthy, soluble human LIGHT has been shown to be much less potent than membrane-bound LIGHT expressing cells for activating human HVEM expressed on cells (Cheung et al. PNAS 2009; 106:6244-6249).

(f). Effect of BTLA/HVEM Blocking Chimeric Mouse/Human Anti-Human HVEM Antibodies on Soluble Human LIGHT-Induced NFκB Signalling in Membrane Human HVEM Expressing Cells In order to analyse the effect of chimeric mouse/human anti-human HVEM antibodies no. 36H12, 45H6, 48H6, 11H7, and 49G4 on soluble human LIGHT-induced NFκB signalling in membrane human HVEM expressing cells, the NFκB-RE-luc human HVEM Bioassay Reporter Cells (HEK293; Promega) were used to examine the ability of mouse anti-human HVEM antibodies to interfere (e.g., blocking, additive or synergistic effect) with soluble LIGHT/membrane HVEM-mediated NFκB signalling.

Briefly, human HVEM expressing NFκB-RE-luc cells were plated at 35,000 cells/well in flat-bottomed TC-treated white-solid 96-wells plates (Corning), and were incubated overnight at 37° C./5% CO2. Next day, these cells were washed, and subsequently incubated with or without 0.0015-10 µg/mL (3-fold dilution steps) chimeric mouse/human anti-human HVEM antibodies no. 36H12, 45H6, 48H6, 11H7, and 49G4 with soluble his-tagged human LIGHT (Sino Biological Inc) at 0.3 µg/mL (≈EC80; see Example 2a and FIG. 3A). After 6 hours incubation at 37° C./5% CO2, luciferase production in human HVEM expressing NFκB-NFκB-RE-luc cells was measured using the Bio-Glo™ Luciferase Assay System (Promega) in a luminometer.

As shown in FIG. 8C, chimeric mouse/human anti-human HVEM antibodies no. 36H12, 45H6, 48H6, 11H7, and 49G4 showed no effect on soluble human LIGHT-mediated NFκB activation in human HVEM expressing NFκB-RE-luc cells.

These results demonstrated that chimeric mouse/human anti-human HVEM antibodies no. 36H12, 45H6, 48H6, 11H7, and 49G4 were not able to affect soluble human LIGHT/human HVEM-mediated NKκB signalling.

(g). Effect of BTLA/HVEM Blocking Chimeric Mouse/Human Anti-Human HVEM Antibodies on Soluble Human TNFβ-Induced NFκB Signalling in Membrane Human HVEM Expressing Cells TNFβ/LTα has been reported to have a weak binding to HVEM, and its exact functional role in the HVEM pathway is still unclear (Cai et al. Immunol Rev 2009; 229:244-258), although there is a general consensus that the TNFβ/HVEM pathway (as with the LIGHT/HVEM pathway) provides costimulatory signals, which results in enhanced immune responses (Cai et al. Immunol Rev 2009; 229:244-258; Steinberg et al. Immunol Rev 2011; 244:169-187; Pasero et al. Curr Opin Pharmacol 2012; 12:478-485; Del Rio et al. Am J Transplant 2013; 13:541-551; Schaer et al. J Immunother Cancer 2014; 2:7).

In order to analyse the effect of chimeric mouse/human anti-human HVEM antibodies no. 36H12, 45H6, 48H6, 11H7, and 49G4 on soluble human TNFβ-induced NFκB signalling in membrane human HVEM expressing cells, the NFκB-RE-luc human HVEM Bioassay Reporter Cells (HEK293; Promega) were used to examine the ability of mouse anti-human HVEM antibodies to interfere (e.g., blocking, additive or synergistic effect) with soluble TNFβ/membrane HVEM-mediated NFκB signalling.

Briefly, human HVEM expressing NFκB-RE-luc cells were plated at 32,000 cells/well in flat-bottomed TC-treated white-solid 96-wells plates (Corning), and were incubated overnight at 37° C./5% CO2. Next day, these cells were washed, and subsequently incubated with or without 0.0015-10 µg/mL (3-fold dilution steps) chimeric mouse/human anti-human HVEM antibodies no. 36H12, 45H6, 48H6, 11H7, and 49G4 with soluble recombinant human TNFβ (Sino Biological) at 0.05 µg/mL (≈EC80; see FIG. 9A). Titrated (i.e., 0, 0.000026-2 µg/mL (5-fold dilution steps)) soluble recombinant human TNFβ was run in parallel for reference purposes. After 6 hours incubation at 37° C./5% CO2, luciferase production in human HVEM expressing NFκB-NFκB-RE-luc cells was measured using the Bio-Glo™ Luciferase Assay System (Promega) in a luminometer.

As shown in FIG. 9B, chimeric mouse/human anti-human HVEM antibodies no. 36H12, 45H6, 48H6, 11H7, and 49G4 showed no effect on soluble human TNFβ-mediated NFκB activation in NFκB-RE-luc cells, which expressed relatively low levels of membrane-bound human HVEM (i.e., a signal to noise ratio of <5 using PE-conjugated mouse anti-human HVEM antibody (clone eBioHVEM-122; eBioscience) at 1:20). This observation was surprising because chimeric mouse/human anti-human HVEM antibodies no. 36H12, 45H6, 48H6, 11H7, and 49G4 prevented soluble human TNFβ binding to and/or displaced pre-bound soluble human TNFβ (see Example 5 (b) and Example 5 (c), respectively) from HEK293F cells clone no. 128, which expressed relatively high levels of membrane-bound human HVEM (i.e., overexpression; a signal to noise ratio of =1000 using PE-conjugated mouse anti-human HVEM antibody (clone eBioHVEM-122; eBioscience) at 1:20); see FIG. 1). However, human TNFβ has been reported to have a high affinity binding to human TNFR1/CD120a and human TNFR2/CD120b (Medvedev et al. J Biol Chem 1996; 16:9778-9784). Interesting, HEK293 cells endogenously express low levels of human TNFR1/CD120a (Murphy et al. Cell Death Differ. 1998; 5:497-505; McFarlane et al. FEBS Letters 2002; 515:119-126; Razonable et al. Antimicrob Agents Chemother 2005; 49:1617-1621). Most likely, human TNFβ preferentially binds to these 'high affinity' human TNFR1 (as opposed to 'low/weak affinity' human HVEM) on these low HVEM+/TNFR1+ co-expressing cells, thereby triggering preferentially soluble human TNFβ/human TNFR1-mediated (as opposed to soluble human TNFβ/human HVEM-mediated) NFκB activation. Under such condition, chimeric mouse/human anti-human HVEM antibodies will be ineffective.

These results demonstrated that chimeric mouse/human anti-human HVEM antibodies no. 36H12, 45H6, 48H6, 11H7, and 49G4 were not able to affect soluble human TNFβ-mediated NKκB signalling when membrane-bound human HVEM and membrane-bound human TNFR1 are co-expressed at relatively low levels on cells.

(h). Effect of BTLA/HVEM Blocking Chimeric Mouse/Human Anti-Human HVEM Antibodies on Membrane Human BTLA/Membrane Human HVEM-Mediated Inhibition of TCR-Induced NFAT Signalling in Membrane Human BTLA/Membrane Human TCR Expressing T Cells In order to analyse the effect of chimeric mouse/human anti-human HVEM antibodies no. 36H12, 45H6, 48H6, 11H7, and 49G4 on membrane human BTLA/membrane human HVEM-mediated inhibition of membrane human TCR-induced NFAT signalling, the NFAT-response element-luciferase (RE-luc) human BTLA/HVEM Blockade Bioassay (see Example 3 (c) above) was used to examine the ability of mouse anti-human HVEM antibodies to block the BTLA/HVEM-mediated inhibition of TCR-induced NFAT signalling.

Briefly, human HVEM and proprietary human TCR activator expressing CHO-K1 Activator cells were plated at 40,000 cells/well in flat-bottomed TC-treated white-solid 96-wells plates (Corning), and were incubated overnight at 37° C./5% CO2. Next day, these cells were washed, and subsequently incubated with or without 0.0015-10 µg/mL (3-fold dilution steps) chimeric mouse/human anti-human HVEM antibodies no. 36H12, 45H6, 48H6, 11H7, and 49G4. Then, human BTLA and human TCR expressing NFAT-RE-luc Jurkat Effector T cells were added at 50,000 cells/well. After 6 hours incubation at 37° C./5% CO2, luciferase production in human BTLA and human TCR expressing NFAT-RE-luc Jurkat Effector T cells was measured using the Bio-Glo™ Luciferase Assay System (Promega) in a luminometer.

As shown in FIG. 10, all examined chimeric mouse/human anti-human HVEM antibodies dose-dependently blocked the BTLA/HVEM-mediated inhibition of TCR-induced NFAT signalling in human BTLA and human TCR expressing NFAT-RE-luc Jurkat Effector T cells to a variable degree (in this order; no. 45H6 >49G4>11H7>36H12>>48H6).

These results demonstrated that chimeric mouse/human anti-human HVEM antibodies no. 36H12, 45H6, 48H6, 11H7, and 49G4 were able to block the human BTLA/human HVEM-mediated inhibition of TCR-induced NFAT signalling.

(k). Effect of BTLA/HVEM Blocking Chimeric Mouse/Human Anti-Human HVEM Antibodies on Membrane Human BTLA/Membrane Human HVEM-Mediated Inhibition of TCR-Induced Cytokine Release from Membrane Human BTLA/Membrane Human TCR Expressing Primary Naïve Human T Cells Like described above, ligation of HVEM on T lymphocytes by LIGHT delivers positive co-stimulatory signals through HVEM, whereas engagement of BTLA on T lymphocytes by HVEM provides negative co-inhibitory signals to T lymphocytes via BTLA (Del Rio et al. Journal Leukocyte Biology 2010; 87:223-235). This BTLA/HVEM pathway down-regulates TCR-mediated signalling in both CD4 and CD8 T lymphocytes, and results in decreased T lymphocyte proliferation and cytokine production.

In order to analyse the effect of chimeric mouse/human anti-human HVEM antibodies no. 36H12, 45H6, 48H6, 11H7, and 49G4 on membrane human BTLA/membrane human HVEM-mediated inhibition of membrane human TCR-induced cytokine release, a co-culture of (1) stable human full-length HVEM-transfected HEK293F cells (clone no. 128; see above Example 1a), which were transiently transfected with membrane-bound anti-human CD3 (OKT3) single-chain variable fragment (scFv) TCR activator as described previously (Chen et al. Front Immunol 2017; 8:793; artificial antigen-presenting cells) with slight modifications, and of (2) membrane human BTLA and membrane human TCR complex expressing primary human naïve T cells (responder cells) was used to examine the ability of mouse anti-human HVEM antibodies to attenuate/reverse the BTLA/HVEM-mediated inhibition of TCR-induced cytokine release (for assay principle, see also FIG. 4A, except human HVEM expressing CHO-K1 artificial antigen-presenting cells and human BTLA expressing Jurkat Effector T cells were exchanged for human HVEM expressing HEK293F artificial antigen-presenting cells and human BTLA expressing primary human naïve T cells, respectively).

Briefly, cDNA encoding membrane-bound anti-human CD3 (OKT3) scFv TCR activator protein (SEQ ID NO. 76) was optimized for mammalian expression and synthesized by GENEART, Regensburg, Germany (see SEQ ID NO. 77). This cDNA was subcloned in a pcDNA3.1-derived expression plasmid. This anti-human CD3 (OKT3) scFv TCR activator protein plasmid was transfected in stable human full-length HVEM-transfected HEK293F cells (clone no. 128; see above Example 1a) using the FreeStyle™ 293 Expression System (Life Technologies). After 2 days, these HEK293F cells were harvested and resuspended at $1.0 \times 10^6$ cells/mL in RPMI-1640 culture medium (Gibco) containing 10% fetal calf serum (Capricorn) and 50 µg/mL gentamycin (Gibco). Prior to co-culturing, anti-human CD3 (OKT3) scFv TCR activator protein surface expression on transiently transfected human HVEM expressing HEK293F cells (i.e., used as artificial antigen-presenting cells) was confirmed using 1:200 diluted PE-conjugated goat anti-human IgG Fcγ-specific antibodies (Jackson ImmunoResearch) and flow cytometry.

Human peripheral blood mononuclear cells (PBMC) from healthy donors (informed consent) were isolated by density centrifugation on Lymphoprep™ (1.077 g/mL; Nycomed). Subsequently, human T lymphocytes (i.e., CD4 and CD8) were enriched from this PBMC fraction using the Dynabeads™ Untouched™ Human T Cells Kit (Invitrogen), and resuspended at $1.0 \times 10^6$ cells/mL in RPMI-1640 culture medium (Gibco) containing 10% fetal calf serum (Capricorn) and 50 µg/mL gentamycin (Gibco). Prior to co-culturing, human BTLA surface expression on enriched human naïve T lymphocytes (i.e., used as responder cells) was confirmed using 1:20 diluted PE-conjugated mouse anti-human BTLA-specific antibody (BD Biosciences) and flow cytometry.

Human HVEM expressing artificial antigen-presenting HEK293F cells at $1.0 \times 10^6$ cells/mL were pre-treated with 40 µg/mL chimeric mouse/human anti-human HVEM antibodies no. 36H12, 45H6, 48H6, 11H7, and 49G4 for 15-30 minutes at RT. In parallel, 40 µg/mL human IgG4/κ (Sigma) was run as a negative isotype control. After this (i.e., without washing), these chimeric mouse/human anti-human HVEM antibody pre-treated artificial antigen-presenting HEK293F cells and enriched human naïve T lymphocytes were co-cultured at an 1:1 ratio (i.e., 50,000 T cells/50,000 artificial antigen-presenting cells/200 µL/well) in flat-bottomed TC-treated transparent 96-wells plates (Corning) with and without 0.5 µg/mL co-stimulatory mouse anti-human CD28 antibody (clone CD28.2; BD Biosciences) in the presence of 20 µg/mL chimeric mouse/human anti-human HVEM antibodies no. 36H12, 45H6, 48H6, 11H7, and 49G4 or 20 µg/mL human IgG4/κ (Sigma) negative isotype control at 37° C./5% $CO_2$ for 2 days. After a 2-day culture, supernatants were harvested and frozen at −80° C. until use.

Release of human IL-2, human TNFα, and human IFNγ from primary human naïve T lymphocytes was determined in these supernatants using in-house developed conventional sandwich ELISAs, i.e., (I) for IL-2 ELISA, a combination of rat anti-human IL-2 monoclonal coating antibody (clone MQ1-17H12; eBioscience), titrated rhuIL-2 standards (PeproTech), and biotinylated rabbit anti-human IL-2 polyclonal detection antibodies (eBioscience) was used, (II) for TNFα ELISA, a combination of mouse anti-human TNFα monoclonal antibody coating (clone MAb11; Biolegend), titrated rhuTNFα standards (PeproTech), and biotinylated mouse anti-human TNFα monoclonal detection antibody (clone MAb11; Biolegend) was used, and (III) for IFNγ ELISA, a combination of mouse anti-human IFNγ monoclonal coating antibody (clone NIB42; eBioscience), titrated rhuIFNγ standards (PeproTech), and biotinylated mouse anti-human IFNγ monoclonal detection antibody (clone 4S.B3; eBioscience) was used.

Supernatants from artificial antigen-presenting HEK293F cells or enriched human naïve T lymphocytes, which are not co-cultured but are cultured separately for 2 days (i.e., 50,000 artificial antigen-presenting cells/200 μL/well or 50,000 T cells//200 μL/well), show no measurable human IL-2, human TNFα, or human IFNγ levels.

Figure 11A:
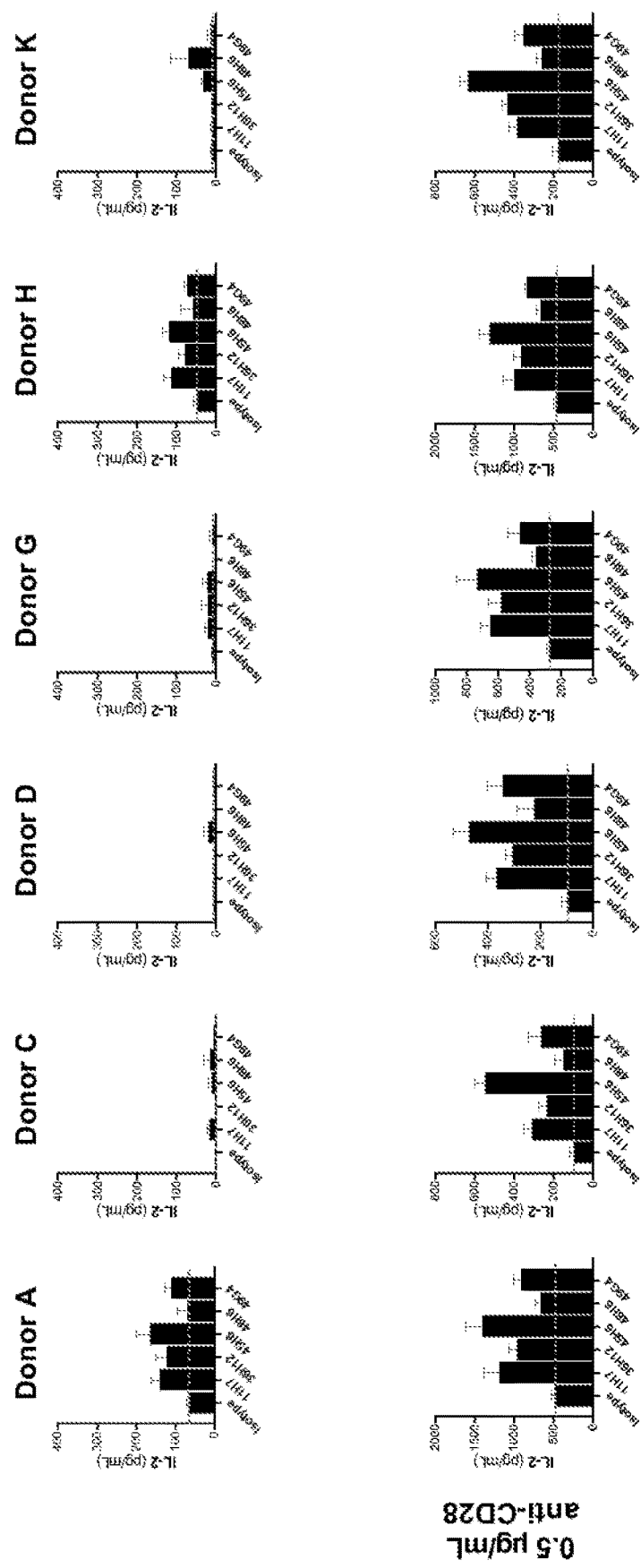
FIG. 11. Effect of purified BTLA/HVEM blocking chimeric mouse/human anti-human HVEM antibodies on membrane-bound human BTLA/human HVEM-mediated inhibition of TCR-induced (figures upper row) and of TCR/CD28-induced (figures lower row) IL-2 (A), TNFα (B) or IFNγ (C) release from membrane-bound human BTLA/human TCR expressing primary naïve human T cells enriched from 6 healthy donors (donor A, C, D, G, H and K). Dashed line represents basal cytokine release (i.e., exposure to human IgG4/K negative isotype control). Mean±SD (n=5) are shown.

As shown in FIG. 11A, all examined chimeric mouse/human anti-human HVEM antibodies attenuated/reversed the BTLA/HVEM-mediated inhibition of TCR/CD28-induced IL-2 release from co-cultured human BTLA expressing primary human naïve T lymphocytes enriched from all 6 healthy donors to a variable degree (rank order; no. 45H6>11H7>36H12>49G4>>48H6). In addition, chimeric mouse/human anti-human HVEM antibodies no. 36H12, 45H6, 11H7, and 49G4 attenuated/reversed the BTLA/HVEM-mediated inhibition of TCR-induced IL-2 release (if any) from co-cultured human BTLA expressing primary human naïve T lymphocytes enriched from 2/6 healthy donors (i.e., donor A and H) to a variable degree (rank order; no. 45H6>11H7>36H12>49G4).

Figure 11B:
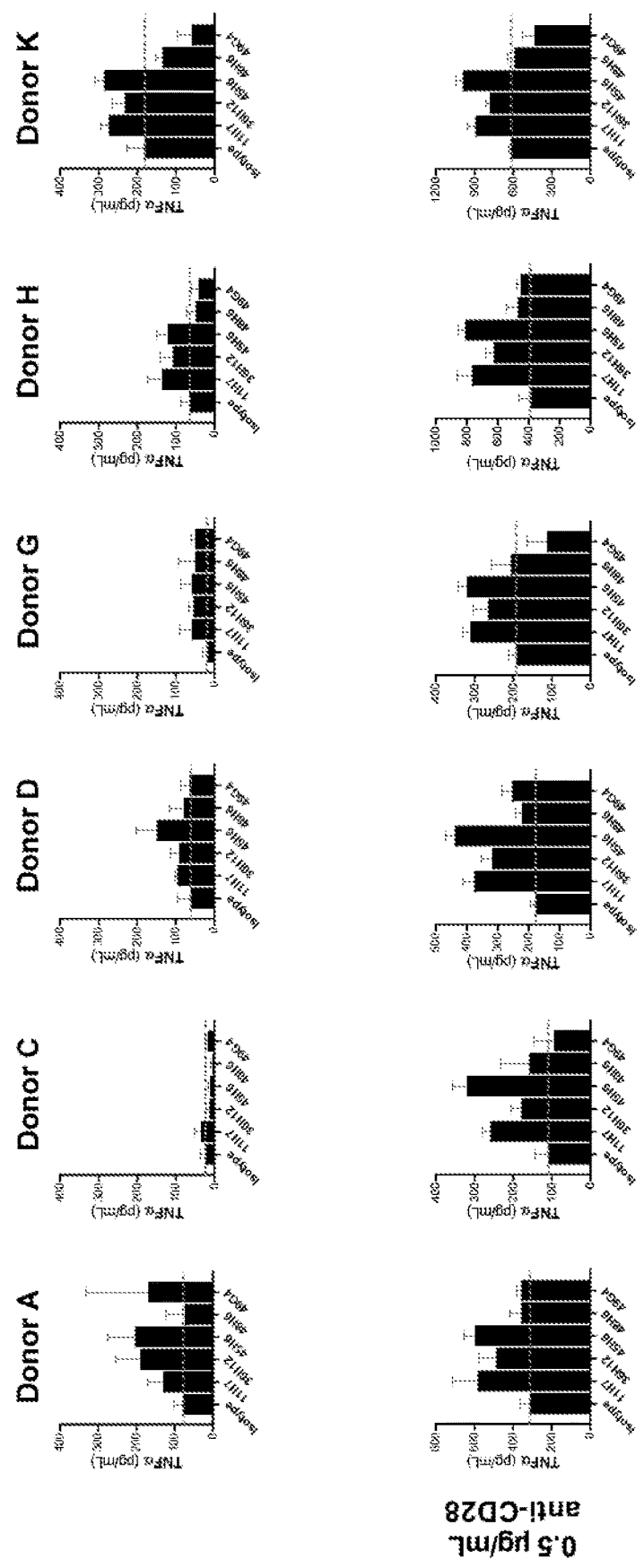

As shown in FIG. 11B, chimeric mouse/human anti-human HVEM antibodies no. 36H12, 45H6, and 11H7 attenuated/reversed the BTLA/HVEM-mediated inhibition of TCR/CD28-induced TNFα release from co-cultured human BTLA expressing primary human naïve T lymphocytes enriched from all 6 healthy donors to a variable degree (rank order; no. 45H6>11H7>36H12). In addition, chimeric mouse/human anti-human HVEM antibodies no. 36H12, 45H6, and 11H7 attenuated/reversed the BTLA/HVEM-mediated inhibition of TCR-induced TNF& release (if any) from co-cultured human BTLA expressing primary human naïve T lymphocytes enriched from 4/6 healthy donors (i.e., donor A, D, H and K) to a variable degree (rank order; no. 45H6>11H7=36H12).

Figure 11C:
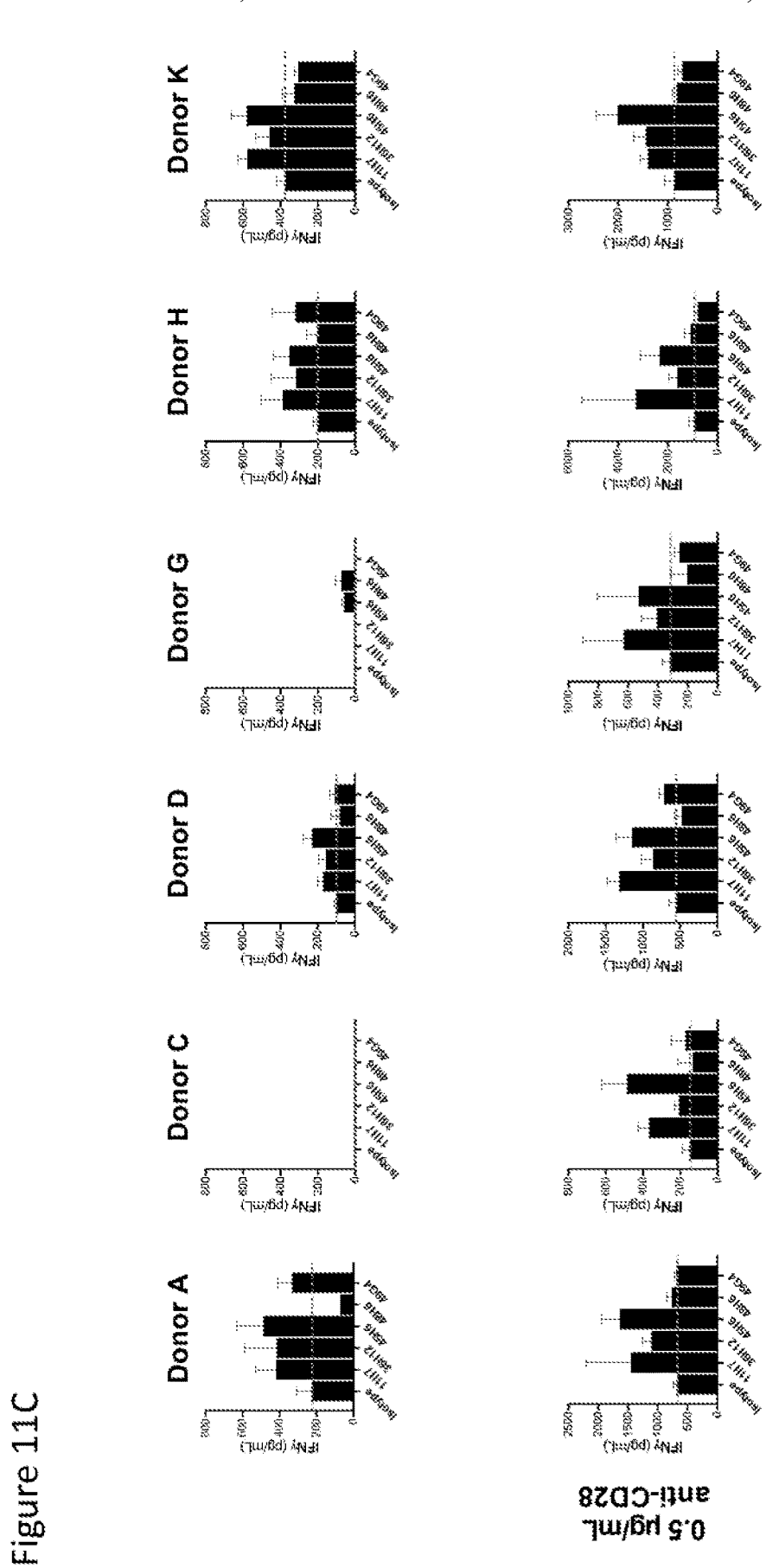

As shown in FIG. 11C, chimeric mouse/human anti-human HVEM antibodies no. 36H12, 45H6, and 11H7 attenuated/reversed the BTLA/HVEM-mediated inhibition of TCR/CD28-induced IFNγ release from co-cultured human BTLA expressing primary human naïve T lymphocytes enriched from all 6 healthy donors to a variable degree (rank order; no. 45H6>11H7>36H12). In addition, chimeric mouse/human anti-human HVEM antibodies no. 36H12, 45H6, and 11H7 attenuated/reversed the BTLA/HVEM-mediated inhibition of TCR-induced IFNγ release (if any) from co-cultured human BTLA expressing primary human naïve T lymphocytes enriched from 4/6 healthy donors (i.e., donor A, D, H and K) to a variable degree (rank order; no. 45H6=11H7>36H12).

These results demonstrated that chimeric mouse/human anti-human HVEM antibodies no. 36H12, 45H6, and 11H7 were able to attenuate/reverse the human BTLA/human HVEM-mediated inhibition of TCR/CD28-induced IL-2, TNFα and IFNγ release from human BTLA expressing primary naïve human T cells. In addition, these results demonstrated that chimeric mouse/human anti-human HVEM antibodies no. 36H12, 45H6, and 11H7 were able to attenuate/reverse the human BTLA/human HVEM-mediated inhibition of TCR-induced IL-2, TNFα and IFNγ release (if any) from human BTLA expressing primary naïve human T cells.

```
DESCRIPTION OF SEQUENCES
Amino acid sequence human HVEM (Swiss-Prot no. Q92956.3; aa 1-283)
                                                      SEQ ID NO. 1
  1 MEPPGDWGPP PWRSTPKTDV LRLVLYLTFL GAPCYAPALP SCKEDEYPVG SECCPKCSPG

61 YRVKEACGEL TGTVCEPCPP GTYIAHLNGL SKCLQCQMCD PAMGLRASRN CSRTENAVCG

121 CSPGHFCIVQ DGDHCAACRA YATSSPGQRV QKGGTESQDT LCQNCPPGTF SPNGTLEECQ

181 HQTKCSWLVT KAGAGTSSSH WVWWFLSGSL VIVIVCSTVG LIICVKRRKP RGDVVKVIVS

241 VQRKRQEAEG EATVIEALQA PPDVTTVAVE ETIPSFTGRS PNH
Signal peptide (aa sequence 1-38), extracellular domain (aa sequence 39-
202, comprising CRD1 (aa sequence 42-75), CRD2 (aa sequence 78-119),
CRD3 (aa sequence 121-162), and truncated CRD4 (aa sequence 165-179),
'linker' (aa sequence 180-202)), transmembrane domain (aa sequence 203-
223), and cytoplasmic domain (aa sequence 224-283)

cDNA sequence coding for human HVEM protein (optimized for mammalian
expression)
                                                      SEQ ID NO. 2
  1 ATGGAGCCCC CTGGCGATTG GGGACCTCCA CCTTGGAGAA GCACCCCCAA GACCGACGTG

61 CTGCGGCTGG TGCTGTACCT GACCTTTCTG GGCGCTCCCT GTTACGCCCC TGCCCTGCCT

121 AGCTGCAAAG AGGACGAGTA CCCTGTGGGC AGCGAGTGCT GCCCTAAGTG CAGCCCTGGC

181 TACAGAGTGA AAGAGGCCTG CGGCGAGCTG ACCGGCACCG TGTGTGAACC TTGTCCCCCT

241 GGCACCTATA TCGCCCACCT GAACGGCCTG AGCAAGTGCC TGCAGTGCCA GATGTGCGAC

301 CCCGCTATGG GCCTGAGAGC CAGCAGAAAC TGCAGCCGGA CCGAGAATGC CGTGTGCGGC

361 TGTTCTCCTG GCCACTTCTG CATCGTGCAG GACGGCGATC ACTGCGCCGC CTGTAGAGCC
```

```
421 TACGCCACAT CTAGCCCAGG CCAGAGAGTG CAGAAGGGCG GCACCGAGAG CCAGGATACC

481 CTGTGCCAGA ATTGCCCTCC CGGCACCTTC AGCCCCAACG GCACACTGGA AGAGTGCCAG

541 CACCAGACCA AGTGCAGCTG GCTCGTGACC AAAGCCGGCG CTGGCACAAG CAGCTCTCAC

601 TGGGTGTGGT GGTTTCTGAG CGGCAGCCTC GTGATCGTGA TTGTGTGCAG CACCGTGGGC

661 CTGATCATCT GCGTGAAGCG GAGAAAGCCC AGAGGCGACG TCGTGAAAGT GATCGTGTCC

721 GTGCAGCGGA AGCGGCAGGA AGCCGAAGGC GAGGCCACAG TGATTGAGGC CCTGCAGGCT

781 CCCCCTGACG TGACAACAGT GGCCGTGGAA GAGACAATCC CCAGCTTCAC CGGCAGATCC

841 CCCAACCAC
```

Amino acid sequence CRD1 truncated human HVEM

SEQ ID NO. 3

```
  1 MEWSGVFMFL LSVTAGVHSE PCPPGTYIAH LNGLSKCLQC QMCDPAMGLR ASRNCSRTEN

61 AVCGCSPGHF CIVQDGDHCA ACRAYATSSP GQRVQKGGTE SQDTLCQNCP PGTFSPNGTL

121 EECQHQTKCS WLVTKAGAGT SSSHWVWWFL SGSLVIVIVC STVGLIICVK RRKPRGDWK

181 VIVSVQRKRQ EAEGEATVIE ALQAPPDVTT VAVEETIPSF TGRSPNH
```

Mouse Ig signal peptide (aa sequence 1-19), extracellular domain (aa sequence 20-146, comprising CRD2 (aa sequence 22-63), CRD3 (aa sequence 65-106), and truncated CRD4 (aa sequence 109-123), linker' fragment (aa sequence 124-146)), transmembrane domain (aa sequence 147-167), and cytoplasmic domain (aa sequence 168-227)

cDNA sequence coding for CRD1 truncated human HVEM protein (optimized for mammalian expression)

SEQ ID NO. 4

```
  1 ATGGAGTGGA GCGGCGTGTT CATGTTCCTG CTGAGCGTGA CAGCCGGCGT GCACAGCGAA

61 CCTTGTCCCC CTGGCACCTA TATCGCCCAC CTGAACGGCC TGAGCAAGTG CCTGCAGTGC

121 CAGATGTGCG ACCCCGCTAT GGGCCTGAGA GCCAGCAGAA ACTGCAGCCG GACCGAGAAT

181 GCCGTGTGCG GCTGTTCTCC TGGCCACTTC TGCATCGTGC AGGACGGCGA TCACTGCGCC

241 GCCTGTAGAG CCTACGCCAC ATCTAGCCCT GGCCAGAGAG TGCAGAAGGG CGGCACCGAG

301 AGGCAGGATA CCCTGTGCCA GAATTGCCCT CCCGGCACCT TCAGCCCCAA CGGCACACTG

361 GAAGAGTGCC AGGACCAGAC CAAGTGCAGC TGGCTCGTGA CCAAAGCCGG CGCTGGCACA

421 AGCAGCTCTC ACTGGGTGTG GTGGTTTCTG AGCGGCAGCC TCGTGATCGT GATTGTGTGC

481 AGCACCGTGG GCCTGATCAT CTGCGTGAAG CGGAGAAAGC CCAGAGGCGA CGTCGTGAAA

541 GTGATCGTGT CCGTGCAGCG GAAGCGGCAG GAAGCCGAAG GCGAGGCCAC AGTGATTGAG

601 GCCCTGCAGG CTCCCCCTGA CGTGACAACA GTGGCCGTGG AAGAGACAAT CCCCAGCTTC

661 ACCGGCAGAT CCCCCAACCA C
```

Amino acid sequence cynomolgus monkey HVEM (NCBI Reference Sequence: XP_005545061.1; aa 1-280)

SEQ ID NO. 5

```
  1 MEPPGGWGSP PRRPAPKADI LTLVLYLTFL GSPCYAPALP SCKEDEYPVG SECCPKCGPG

61 FHVRQACGEQ TGTVCEPCSP GTYIAHFNGL SKCLQCQMCD PAMGLRTSRN CSTTANALCG

121 CSPGHFCIIQ DGDHCAACRA YATSSPGQRV QKGGTESQDT LCQNCPPGTF SSNGTLEECQ

181 HGTKCSKWLV TEAGPGTSSF RWVWWLLSGT LIVIIVGLIL GLIYVKRRKS RGDWKVIVS

241 VQRKRQEAEG EAIVTEALQA PPDITTVAVE ETEPAFTGRS
``` cDNA sequence coding for cynomolgus monkey HVEM protein (optimized for mammalian expression)

SEQ ID NO. 6

```
  1 ATGGAGCCTC CAGGCGGATG GGGATCTCCC CCAAGAAGGC CTGCCCCCAA GGCCGATATC

61 CTGACCCTGG TGCTGTACCT GACCTTCCTG GGCAGCCCTT GTTACGCCCC TGCCCTGCCT

121 AGCTGCAAAG AGGACGAGTA CCCTGTGGGC AGCGAGTGCT GCCCTAAGTG CGGCCCTGGA

181 TTTCATGTGC GGCAGGCCTG TGGCGAGCAG ACCGGCACAG TGTGCGAGCC TTGTAGCCCC
```

-continued

```
241 GGCACCTATA TCGCCCACTT CAACGGCCTG AGCAAGTGCC TGCAGTGCCA GATGTGCGAC

301 CCCGCTATGG GCCTGCGGAC CAGCAGAAAT TGCAGCACCA CCGCCAATGC CCTGTGCGGC

361 TGTTCTCCTG GCCACTTCTG CATTATTGAG GACGGCGACC ACTGCGCCGC CTGCAGAGCC

421 TATGCCACAT CTAGCCCTGG CCAGCGGGTG CAGAAGGGCG AACAGAGTC TCAGGACACC

481 CTGTGCCAGA ACTGCCCCCC TGGCACCTTC AGCAGCAACG GCACCCTGGA GAGTGCCAG

541 CACGGCACCA AGTGCAGCAA GTGGCTCGTG ACAGAGGCCG ACCTGGCAC CAGCAGCTTC

601 AGATGGGTGT GGTGGCTGCT GAGCGGCACA CTGATCGTGA TCATCGTGGG CCTGATCCTG

661 GGACTGATCT AGGTGAAGGG GCGGAAGTCC AGAGGCGACG TCGTGAAAGT GATCGTGTCC

721 GTGCAGCGGA AGAGACAGGA AGCCGAGGGC GAGGCCATTG TGACCGAAGC CCTGCAGGCC

781 CCTCCCGACA TTACAACCGT GGCCGTGGAA GAAACCGAGC CCGCCTTTAC CGGCAGATCC
```

PCR primer
                                                        SEQ ID NO. 7
ATGAAGTTGCCTGTTAGGCTGTTGGTGCTG PCR primer
                                                        SEQ ID NO. 8
ATGGATTTWCAGGTGCAGATTWTCAGCTTC PCR primer
                                                        SEQ ID NO. 9
ATGGGCWTCAAAGATGGAGTGAGA PCR primer
                                                        SEQ ID NO. 10
ACTGGATGGTGGGAAGATGG PCR primer
                                                        SEQ ID NO. 11
ATGAAATGCAGCTGGGGCATSTTCTTC PCR primer
                                                        SEQ ID NO. 12
ATGRACTTTGGGYTCAGCTTGRTTT PCR primer
                                                        SEQ ID NO. 13
ATGGGACTCCAGGCTCAATTTAGTTTTCCTT PCR primer
                                                        SEQ ID NO. 14
ATGGCTTGTCYTTRGSGCTRCTCTTCTGC PCR primer
                                                        SEQ ID NO. 15
CAGTGGATAGACAGATGGGGG Consensus amino acid sequence of heavy chain variable region of mouse
anti-human HVEM antibody 36H12
                                                        SEQ ID NO. 16
  1 EVQLQQSGAG LVKPGASVKL SCTASGFNIK DTYMHWVRQR PEQGLEWIGR IDPATANTKY

61 DPKFQGKATL TTDTSSNTAY LQLSSLTSED TAVYYCVTYG YDVSWFAYWG LGALVTVSA

Consensus amino acid sequence of light chain variable region of mouse anti-
human HVEM antibody 36H12
                                                        SEQ ID NO. 17
  1 DVLMTQTPLS LPVSLGDQAS ISCRSSQSIV HSNGITYLEW YLQKPGQSPK LLIYKVSNRF

61 SGVPDRFSGS GSGTDFTLKI SRVEAEDLGV YYCFQGSHVP LTFGAGTKLE LK

Complementarity determining regions (CDRs) of mouse anti-human
HVEM antibody 36H12: SEQ ID NO. 18-23

Amino acid sequence heavy chain CDR1 of 36H12
                                                        SEQ ID NO. 18
DTYMH Amino acid sequence heavy chain CDR2 of 36H12
                                                        SEQ ID NO. 19
RIDPATANTKYDPKFQG Amino acid sequence heavy chain CDR3 of 36H12
SEQ ID NO. 20
YGYDVSWFAY Amino acid sequence light chain CDR1 of 36H12
SEQ ID NO. 21
RSSQSIVHSNGITYLE Amino acid sequence light chain CDR2 of 36H12
SEQ ID NO. 22
KVSNRFS Amino acid sequence light chain CDR3 of 36H12
SEQ ID NO. 23
FQGSHVPLT Consensus amino acid sequence of heavy chain variable region of mouse anti-human HVEM antibody 45H6
SEQ ID NO. 24
```
  1 DVQLVESGGG LVQPGGSRKL SCAASGFTFS SFGMHWVRQA PEKGLEWVAY ISSGNSNIYY

61 VDTVKGRFTI SRDNPKNTLF LQMTSLRSED TAMYYCARKR AYGDYSGFSM DYWGQGTSVT

121 VSS
```

Consensus amino acid sequence of light chain variable region of mouse anti-human HVEM antibody 45H6
SEQ ID NO. 25
```
  1 DIVMTQSQKF MSTSVGDRVS VTCKASQNVD TNVAWYQQKP GQSPKALIYS ASYRYSGVPD

61 RFTGSGSGTD FTLTISNVQS EDLAEYFCQQ YNKFPLTFGG GTKLEIK
```

Complementarity determining regions (CDRs) of mouse anti-human HVEM antibody 45H6:

SEQ ID NO. 26-31
Amino acid sequence heavy chain CDR1 of 45H6
SEQ ID NO. 26
SFGMH Amino acid sequence heavy chain CDR2 of 45H6
SEQ ID NO. 27
YISSGNSNIYYVDTVKG Amino acid sequence heavy chain CDR3 of 45H6
SEQ ID NO. 28
KRAYGDYSGFSMDY Amino acid sequence light chain CDR1 of 45H6
SEQ ID NO. 29
KASQNVDTNVA Amino acid sequence light chain CDR2 of 45H6
SEQ ID NO. 30
SASYRYS Amino acid sequence light chain CDR3 of 45H6
SEQ ID NO. 31
QQYNKFPLT Consensus amino acid sequence of heavy chain variable region of mouse anti-human HVEM antibody 48H6
SEQ ID NO. 32
```
  1 EVKLVESGGG LVKPGGSLKL SCAASGFTFS GYAMSWVRQT PEKRLEWVAS ISSGGSTYYP

61 DSVKGRFTIP RDDARNILYL QMSSLRSEDT AIYYCARGGH GSSYVYWGQG TTLTVSS
```

Consensus amino acid sequence of light chain variable region of mouse anti-human HVEM antibody 48H6
SEQ ID NO. 33
```
  1 DIVMSQSPSS LAVSVGEKVT MSCKSSQSLL YSSNQKNYLA WYQQKPGQSP KLLIYWASTR

61 ESGVPDRFTG SGSGTDFTLT ISSVKAEDLA VYYCHQYYSY PLTFGAGTKL ELN
```

-continued

Complementarity determining regions (CDRs) of mouse anti-human HVEM antibody 48H6:

SEQ ID NO. 34-39
Amino acid sequence heavy chain CDR1 of 48H6
SEQ ID NO. 34
GYAMS Amino acid sequence heavy chain CDR2 of 48H6
SEQ ID NO. 35
SISSGGSTYYPDSVKG Amino acid sequence heavy chain CDR3 of 48H6
SEQ ID NO. 36
GGHGSSYVY Amino acid sequence light chain CDR1 of 48H6
SEQ ID NO. 37
KSSQSLLYSSNQKNYLA Amino acid sequence light chain CDR2 of 48H6
SEQ ID NO. 38
WASTRES Amino acid sequence light chain CDR3 of 48H6
SEQ ID NO. 39
HQYYSYPLT Consensus amino acid sequence of heavy chain variable region of mouse anti-human HVEM antibody 11H7
SEQ ID NO. 40
```
  1 QVQLKQSGPG LVQPSQSLSI TCTVSGFSLT IYGVHWVRQS PGKGLEWLGV IWSGGSTDYN
 61 AAFISRLSIS KDNSKSQVFF KMNSLQANDT AIYYCARRDY GSRSFYYAMD YWGQGTSVTV
121 SS
```

Consensus amino acid sequence of light chain variable region of mouse anti-human HVEM antibody 11H7
SEQ ID NO: 41
```
  1 EIVLTQSPAL MAASPGEKVT ITCSVSSSIS SSNLHWYQQK SETSPKPWIY GTSNLASGVP
 61 VRFSGSGSGT SYSLTISSME AEDAATYYCQ QWSSYPLTFG GGTKLEIK
```

Complementarity determining regions (CDRs) of mouse anti-human HVEM antibody 11H7:

SEQ ID NO. 42-47
Amino acid sequence heavy chain CDR1 of 11H7
SEQ ID NO. 42
IYGVH Amino acid sequence heavy chain CDR2 of 11H7
SEQ ID NO. 43
VIWSGGSTDYNAAFIS Amino acid sequence heavy chain CDR3 of 11H7
SEQ ID NO. 44
RDYGSRSFYYAMDY Amino acid sequence light chain CDR1 of 11H7
SEQ ID NO. 45
SVSSSISSSNLH Amino acid sequence light chain CDR2 of 11H7
SEQ ID NO. 46
GTSNLAS Amino acid sequence light chain CDR3 of 11H7
SEQ ID NO. 47
QQWSSYPLT Consensus amino acid sequence of heavy chain variable region of mouse anti-human HVEM antibody 49G4
SEQ ID NO. 48
```
  1 EVQLQQSGAE LVKPGASVKL SCRASGFNIK DTYMHWVKQR PEQGLEWIGR IDPARGNTKY
 61 DPKFQGKATI TADTSSNTAY LQLSSLTSED TAVYYCASAM DYWGQGTSVT VSS
```

-continued

Consensus amino acid sequence of light chain variable region of mouse anti-human HVEM antibody 49G4

SEQ ID NO. 49

```
  1 DVLMTQTPLS LPVSLGDQAS ISCRSSQSIV HSNGNTYLEW FLQKPGQSPK LLIYKVSNRF

61 SGVPDRFSGS GSGTDFTLKI SRVEAEDLGV YYCFQGSHVP LTFGAGTKLE LK
```

Complementarity determining regions (CDRs) of mouse anti-human HVEM antibody 49G4:
SEQ ID NO. 50-55

Amino acid sequence heavy chain CDR1 of 49G4

SEQ ID NO. 50

DTYMH

Amino acid sequence heavy chain CDR2 of 49G4

SEQ ID NO. 51

RIDPARGNTKYDPKFQG

Amino acid sequence heavy chain CDR3 of 49G4

SEQ ID NO. 52

AMDY

Amino acid sequence light chain CDR1 of 49G4

SEQ ID NO. 53

RSSQSIVHSNGNTYLE

Amino acid sequence light chain CDR2 of 49G4

SEQ ID NO. 54

KVSNRFS

Amino acid sequence light chain CDR3 of 49G4

SEQ ID NO. 55

FQGSHVPLT cDNA sequence coding for chimeric mouse VH 36H12 and human constant heavy IgG4 chain

SEQ ID NO. 56

```
   1 ATGGAGCTGG GCCTGAGCTG GATTTTTCTG CTGGCCATCC TGAAGGGCGT GCAGTGCGAA

61 GTTCAGCTGC AGCAATCTGG CGCCGGACTG GTTAAGCCTG CGCCTCTGT GAAGCTGAGC

121 TGTACCGCCA GCGGCTTCAA CATCAAGGAC ACCTACATGC ACTGGGTCCG ACAGAGGCCT

181 GAGCAGGGAC TCGAATGGAT CGGCAGAATC GATCCCGCCA CCGCCAACAC CAAATACGAC

241 CCCAAGTTCC AGGGCAAAGC CACACTGACC ACCGACACCA GCAGCAACAC AGCCTACCTG

301 CAGCTGTCTA GCCTGACCAG CGAAGATACC GCCGTGTACT ACTGCGTGAC CTACGGCTAC

361 GATGTGTCTT GGTTTGCCTA CTGGGGACTG GGCGCCCTGG TTACAGTTTC TGCCGCCTCT

421 ACAAAGGGCC CCAGCGTTTT CCCACTGGCT CCCTGTAGCA GAAGCACCAG CGAATCTACA

481 GCCGCTCTGG GCTGCCTGGT CAAGGACTAC TTTCCTGAGC CTGTGACCGT GTCCTGGAAC

541 TCTGGCGCTC TGACATCTGG CGTGCACACC TTTCCAGCCG TGCTGCAAAG CAGCGGCCTG

601 TACTCTCTGA GCAGCGTGGT CACAGTGCCT AGCTCTAGCC TGGGCACCAA GACCTACACC

661 TGTAATGTGG ACCACAAGCC TAGCAACACC AAGGTGGACA AGCGCGTGGA ATCTAAGTAC

721 GGCCCTCCTT GTCCTCCATG TCCTGCACCT GAGTTTCTCG GCGGACCCTC CGTGTTCCTG

781 TTTCCTCCAA AGCCTAAGGA CACCCTGATG ATCAGCAGAA CCCCTGAAGT GACCTGCGTG

841 GTGGTGGACG TTTCCCAAGA GGACCCTGAG GTGCAGTTCA ATTGGTACGT GGACGGCGTG

901 GAAGTGCACA ACGCCAAGAC CAAGCCTAGA GAGGAACAGT TCAACAGCAC CTACAGAGTG

961 GTGTCCGTGC TGACAGTGCT GCACCAGGAT TGGCTGAACG GCAAAGAGTA CAAGTGCAAG

1021 GTGTCCAACA AGGGCCTGCC TAGCAGCATC GAGAAACCA TCAGCAAGGC CAAGGGCCAG

1081 CCAAGAGAAC CCCAGGTGTA CACACTGCCT CCAAGCCAAG AGGAAATGAC CAAGAACCAG

1141 GTGTCCCTGA CCTGCCTCGT GAAGGGCTTC TACCCTTCCG ATATCGCCGT GGAATGGGAG

1201 AGCAATGGCC AGCCTGAGAA CAACTACAAG ACAACCCCTC CTGTGCTGGA CAGCGACGGC

1261 TCATTCTTCC TGTACAGGAG ACTGACCGTG GACAAGAGCA GATGGCAAGA GGGCAACGTG
```

-continued

```
1321 TTCTCCTGCA GCGTGATGCA CGAGGCCCTG CACAACCACT ACACCCAGAA GTCTCTGTCC

1381 CTGTCTCTGG GCAAG
``` cDNA sequence coding for chimeric mouse VH 45H6 and human constant
heavy IgG4 chain

SEQ ID NO. 57

```
   1 ATGGAGCTGG GCCTGAGCTG GATTTTTCTG CTGGCCATCC TGAAGGGCGT GCAGTGTGAT

61 GTGCAGCTGG TGGAATCTGG CGGAGGACTG GTTCAACCTG GCGGCAGCAG AAAGCTGTCT

121 TGTGCCGCCA GCGGCTTCAC CTTCAGCAGC TTTGGAATGC ACTGGGTCCG ACAGGCCCCT

181 GAGAAAGGCC TTGAGTGGGT CGCCTACATC AGCAGCGGCA ACAGCAACAT CTACTACGTG

241 GACACCGTGA AGGGCAGATT CACCATCTCC AGAGACAACC CCAAGAATAC CCTGTTCCTG

301 CAGATGACCA GCCTGCGGAG CGAGGATACC GCCATGTACT ACTGCGCCCG GAAAAGAGCC

361 TACGGCGACT ACAGCGGCTT TAGCATGGAT TACTGGGGCC AGGGCACCAG CGTGACAGTG

421 TCTAGCGCCT CTACAAAGGG CCCTAGCGTG TTCCCTCTGG CTCCTTGTAG CAGAAGCACC

481 AGCGAGTCTA CAGCCGCTCT GGGCTGTCTG GTCAAGGACT ACTTTCCCGA GCCTGTGACC

541 GTGTCCTGGA ATTCTGGCGC TCTGACAAGC GGCGTGCACA CCTTTCCAGC TGTGCTGCAA

601 AGCAGCGGCC TGTACTCTCT GAGCAGCGTG GTCACAGTGC CTAGCTCTAG CCTGGGCACC

661 AAGACCTACA CCTGTAATGT GGACCACAAG CCTAGCAACA CCAAGGTGGA CAAGCGCGTG

721 GAATCTAAGT ACGGCCCTCC TTGTCCTCCA TGTCCTGCTC AGAGTTTCT CGGCGGACCC

781 TCCGTGTTCC TGTTTCCTCC AAAGCCTAAG GACACCGTGA TGATCAGCAG AACCCCTGAA

841 GTGACCTGCG TGGTGGTGGA CGTTTCCCAA GAGGACCCTG AGGTGCAGTT CAATTGGTAC

901 GTGGACGGCG TGGAAGTGCA CAACGCCAAG ACCAAGCCTA GAGAGGAACA GTTCAACAGC

961 ACCTACAGAG TGGTGTCCGT GCTGACCGTG CTGCACCAGG ATTGGCTGAA CGGCAAAGAG

1021 TACAAGTGCA AGGTGTCCAA CAAGGGCCTG CCTAGCAGCA TCGAGAAAAC CATCAGCAAG

1081 GCCAAGGGCC AGCCAAGAGA ACCCCAGGTG TACACACTGC CTCCAAGCCA AGAGGAAATG

1141 ACCAAGAACC AGGTGTCCCT GACCTGCCTG GTTAAGGGCT TCTACCCCTC CGATATCGCC

1201 GTGGAATGGG AGAGCAATGG CCAGCCTGAG AACAACTACA AGACCACACC ACCTGTGCTG

1261 GACAGCGACG GCTCATTCTT CCTGTACAGC AGACTGACCG TGGACAAGAG CAGATGGCAA

1321 GAGGGCAACG TGTTCAGCTG CAGCGTGATG CACGAGGCCC TGCACAACCA CTACACCCAG

1381 AAGTCTCTGA GCCTGTCTCT GGGCAAG
``` cDNA sequence coding for chimeric mouse VH 48H6 and human constant
heavy IgG4 chain

SEQ ID NO. 58

```
   1 ATGGAGCTGG GCCTGAGCTG GATTTTTCTG CTGGCCATCC TGAAGGGCGT GCAGTGCGAA

61 GTGAAGCTGT GGAATCTGG CGGCGGACTG GTTAAGCCTG GCGGATCTCT GAAGCTGAGC

121 TGTGCCGCCA GCGGCTTTAC CTTTAGCGGC TACGCCATGA GCTGGGTCCG ACAGACACCC

181 GAGAAGAGAC TGGAATGGGT CGCCAGCATC AGCAGCGGCG GCAGCACATA TTACCCCGAC

241 TCTGTGAAGG GCGGCTTTAC AATCCCCAGA GATGACGCCC GGAACATCCT GTACCTGCAG

301 ATGAGCAGCC TGCGGAGCGA GGATACCGCC ATCTACTATT GTGCCAGAGG CGGCCACGGC

361 AGCAGCTATG TTTATTGGGG CCAGGGCACC AGACTGACCG TGTCTAGCGC CTCTACAAAG

421 GGCCCTAGCG TGTTCCCTCT GGCTCCTTGT AGCAGAAGCA CCAGCGAGTC TACAGCCGCT

481 CTGGGCTGTC TGGTCAAGGA CTACTTTCCC GAGCCTGTGA CAGTGTCCTG GAACTCTGGC

541 GCTCTGACAA GCGGCGTGCA CACATTTCCA GCCGTGCTGC AAAGCAGCGG CCTGTACTCT

601 CTGAGCAGCG TGGTCACAGT GCCTAGCTCT AGCCTGGGCA CCAAGACCTA CACCTGTAAT
```

-continued

```
 661 GTGGACCACA AGCCTAGCAA CACCAAGGTG GACAAGCGCG TGGAATCTAA GTACGGCCCT

721 CCTTGTCCTC CATGTCCTGC ACCTGAGTTT CTCGGCGGAC CCTCCGTGTT CCTGTTTCCT

781 CCAAAGCCTA AGGACACCCT GATGATCAGC AGAACCCCTG AAGTGACCTG CGTGGTGGTG

841 GACGTTTCCC AAGAGGACCC TGAGGTGCAG TTCAATTGGT ACGTGGACGG CGTGGAAGTG

901 CACAACGCCA AGACCAAGCC TAGAGAGGAA CAGTTCAACA GCACCTACAG AGTGGTGTCC

961 GTGCTGACAG TGCTGCACCA GGATTGGCTG AACGGCAAAG AGTACAAGTG CAAGGTGTCC

1021 AACAAGGGCC TGCCTAGCAG CATCGAGAAA ACCATCAGCA AGGCCAAGGG CCAGCCAAGA

1081 GAACCCCAGG TGTACACACT GCCTCCAAGC CAAGAGGAAA TGACCAAGAA CCAGGTGTCC

1141 CTGACCTGCC TCGTGAAGGG CTTCTACCCT TCCGATATCG CCGTGGAATG GGAGAGCAAT

1201 GGCCAGCCTG AGAACAACTA CAAGACAACC CCTCCTGTGC TGGACAGCGA CGGCTCATTC

1261 TTCCTGTACA GCAGGCTGAC CGTGGACAAG AGCAGATGGC AAGAGGGCAA CGTGTTCAGC

1321 TGCAGCGTGA TGCACGAGGC CCTGCACAAC CACTACACCC AGAAGTCTCT GAGCCTGTCT

1381 CTGGGCAAG
``` cDNA sequence coding for chimeric mouse VH 11H7 and human constant heavy IgG4 chain

SEQ ID NO. 59

```
   1 ATGGAGCTGG GCCTGAGCTG GATTTTTCTG CTGGCCATCC TGAAGGGCGT GCAGTGTCAG

61 GTGCAGCTGA AGCAGTCTGG ACCTGGACTG GTGCAGCCTA GCCAGAGCCT GAGCATCACC

121 TGTACCGTGT CCGGCTTCAG CCTGACCATC TATGGCGTGC ACTGGGTCCG ACAGAGCCCT

181 GGCAAAGGAC TGGAATGGCT GGGAGTGATT TGGAGCGGCG GCAGCACCGA TTACAACGCC

241 GCCTTTATCA GCAGACTGAG CATCTCCAAG GACAACAGGA GAGCCAGGT GTTCTTCAAG

301 ATGAACTCCC TGCAGGCCAA CGACACCGCC ATCTACTACT GCGCCAGAAG AGACTACGGC

361 AGCCGGTCCT TCTACTACGC TATGGACTAT TGGGGCCAGG GCACCAGCGT GACAGTGTCT

421 AGCGCCTCTA CAAAGGGCCC TAGCGTGTTC CCTCTGGCTC CTTGTAGCAG AAGCACCAGC

481 GAGTCTACAG CCGCTCTGGG CTGTCTGGTC AAGGACTACT TTCCCGAGCC AGTGACCGTG

541 TCCTGGAATT CTGGCGCTCT GACAAGCGGC GTGCACACCT TTCCAGCTGT GCTGGAAAGC

601 AGCGGCCTGT ACTCTCTGAG CAGCGTGGTC ACAGTGCCTA GCTCTAGCCT GGGCACCAAG

661 ACCTACACCT GTAATGTGGA CCACAAGCCT AGCAACACCA AGGTGGACAA GCGCGTGGAA

721 TCTAAGTACG GCCCTCCTTG TCCTCCATGT CCTGCTCCAG AGTTTCTCGG CGGACCCTCC

781 GTGTTCCTGT TTCCTCCAAA GCCTAAGGAC ACCCTGATGA TCAGCAGAAC CCCTGAAGTG

841 ACCTGCGTGG TGGTGGACGT TTCCCAAGAG GACCCTGAGG TGCAGTTCAA TTGGTACGTG

901 GACGGCGTGG AAGTGCACAA CGCCAAGACC AAGCCTAGAG AGGAACAGTT CAACAGCACC

961 TACAGAGTGG TGTCCGTGCT GACCGTGCTG CATCAGGATT GGCTGAACGG CAAAGAGTAC

1021 AAGTGCAAGG TGTCCAACAA GGGCCTGCCT AGCAGCATCG AGAAACCAT CAGCAAGGCC

1081 AAGGGCCAGC CAAGAGAACC CCAGGTGTAC ACACTGCCTC CAAGGCAAGA GGAAATGACC

1141 AAGAATCAGG TGTCCCTGAC CTGCCTCGTG AAGGGCTTCT ACCCTTCCGA TATCGCCGTG

1201 GAATGGGAGA GCAATGGCCA GCCTGAGAAC AACTACAAGA CAACCCCTCC TGTGCTGGAC

1261 AGCGACGGCT CATTCTTCCT GTACTCCAGA CTGACCGTGG ACAAGAGCAG ATGGCAAGAG

1321 GGCAACGTGT TCAGCTGCTC CGTGATGCAC GAGGCCCTGC ACAACCACTA CACCCAGAAG

1381 TCCCTGAGCC TGTCTCTGGG CAAA
``` cDNA sequence coding for chimeric mouse VH 49G4 and human constant
heavy IgG4 chain

SEQ ID NO. 60

```
   1 ATGGAGCTGG GCCTGAGCTG GATTTTTCTG CTGGCCATCC TGAAGGGCGT GCAGTGCGAA

61 GTTCAGCTGC AGCAGTCTGG CGCCGAGCTT GTGAAACCTG GCGCCTCTGT GAAGCTGAGC

121 TGTAGAGCCA GCGGCTTCAA CATCAAGGAC ACCTACATGC ACTGGGTCAA GCAGAGGCCT

181 GAGCAGGGCC TCGAATGGAT CGGCAGAATC GATCCCGCCA GAGGCAACAC CAAATAGGAC

241 CCCAAGTTCC AGGGCAAAGC CACCATCACC GCCGACACCT CTAGCAACAC AGCCTACCTG

301 CAGCTGTCCA GCCTGAGCTG TGAAGATACC GCCGTGTACT ACTGCGCCAG CGCTATGGAT

361 TATTGGGGCC AGGGCACAAG CGTGACCGTG TCTAGCGCCT CTACAAAGGG CCCTAGCGTG

421 TTCCCACTGG CTCCCTGTAG CAGAAGCACC AGCGAATCTA CAGCCGCTCT GGGCTGCCTG

481 GTCAAGGACT ACTTTCCTGA GCCTGTGACA GTGTCCTGGA ACTCTGGCGC TCTGACAAGC

541 GGCGTGCACA CATTTCCAGC CGTGCTGCAA AGCAGCGGCC TGTACTCTCT GAGCAGCGTG

601 GTCACAGTGC CTAGCTCTAG CCTGGGCACC AAGACCTACA CCTGTAATGT GGACCACAAG

661 CCTTCCAACA CCAAGGTGGA CAAGCGCGTG GAATCTAAGT ACGGCCCTCC TTGTCCTCCA

721 TGTCCTGCAC CTGAGTTTCT CGGCGGACCC TCCGTGTTCC TGTTTCCTCC AAAGCCTAAG

781 GACACCCTGA TGATCAGCAG AACCCCTGAA GTGACCTGCG TGGTGGTGGA CGTTTCCCAA

841 GAGGACCCTG AGGTGCAGTT CAATTGGTAC GTGGACGGCG TGGAAGTGCA CAACGCCAAG

901 ACCAAGCCTA GAGAGGAACA GTTCAACAGC ACCTACAGAG TGGTGTCCGT GCTGACAGTG

961 CTGCACCAGG ATTGGCTGAA CGGCAAAGAG TACAAGTGCA AGGTGTCCAA CAAGGGCCTG

1021 CCTAGCAGGA TCGAGAAAAC CATCAGCAAG GCCAAGGGCC AGCCAAGAGA ACCCCAGGTG

1081 TACACACTGC CTCCAAGCCA AGAGGAAATG ACCAAGAACC AGGTGTCCCT GACCTGCCTC

1141 GTGAAGGGCT TCTACCCTTC CGATATCGCC GTGGAATGGG AGAGCAATGG CCAGCCTGAG

1201 AACAACTACA AGACAACCCC TCCTGTGCTG GACTCCGACG GCTCATTCTT CCTGTACAGC

1261 AGACTGACCG TGGACAAGAG CAGATGGCAA GAGGGCAACG TGTTCTCCTG CAGCGTGATG

1321 CACGAAGCCC TGCACAACCA CTACACCCAG AAGTCTCTGT CCCTGTCTCT GGGCAAG
``` cDNA sequence coding for chimeric mouse VL 36H12 and human constant
light kappa chain

SEQ ID NO. 61

```
   1 ATGGACATGA GAGTTCCCGC TCAGCTGCTG GGACTGCTGC TGCTTTGGTT TCCTGGCGCT

61 AGATGCGACG TGCTGATGAC CCAGACACCT CTGAGCCTGC TGTGTCTCT GGGAGATCAG

121 GCCAGCATCA GCTGCAGATC CAGCCAGAGC ATCGTGCACA GCAACGGCAT CACCTACCTG

181 GAATGGTATC TGCAGAAGCC CGGACAGAGC CCCAAGCTGC TGATCTACAA GGTGTCCAAC

241 CGGTTCAGCG GCGTGCCCGA TAGATTTTCT GGCAGCGGCT CTGGCACCGA CTTCACCCTG

301 AAGATCTCCA GAGTGGAAGC CGAGGACCTG GGCGTGTACT ACTGCTTCCA AGGCTCTCAC

361 GTGCCCCTGA CATTTGGAGC CGGCACCAAG CTGGAACTGA AGAGAACAGT GGCCGCTCCT

421 AGCGTGTTCA TCTTCCCACC TTCCGACGAG CAGCTGAAAA GCGGCACAGC CTCTGTCGTG

481 TGCCTGCTGA ACAACTTCTA CCCCAGAGAA GCCAAGGTGC AGTGGAAGGT GGACAACGCC

541 CTGCAGAGCG GCAATAGCCA AGAGAGCGTG ACCGAGCAGG ACAGCAAGGA CTCTACCTAC

601 AGCCTGAGCA GCACCCTGAC ACTGAGCAAG GCCGACTACG AGAAGCACAA AGTGTACGCC

661 TGCGAAGTGA CCCACCAGGG CCTTTCTAGC CCTGTGACCA AGAGCTTCAA CCGGGGCGAA

721 TGT
```

-continued cDNA sequence coding for chimeric mouse VL 45H6 and human constant
light kappa chain

SEQ ID NO. 62

```
  1 ATGGACATGA GAGTTCCCGC TCAGCTGCTG GGACTGCTGC TGCTTTGGTT TCCTGGCGCT
 61 AGATGCGACA TCGTGATGAC CCAGAGCCAG AAATTCATGA GCACCAGCGT GGGCGACAGA
121 GTGTCCGTGA CATGTAAAGC CAGCCAGAAC GTGGACACCA ACGTGGCCTG GTATCAGCAG
181 AAGCCTGGAC AGAGCCCCAA GGCTCTGATC TACAGCGCCA GCTACAGATA CAGCGGCGTG
241 CCCGATAGAT TCACAGGCAG CGGCTCTGGC ACCGACTTCA CCCTGACAAT CAGCAACGTG
301 CAGAGCGAGG ACCTGGCCGA GTATTTCTGC AGCAGTACA ACAAGTTCCC TCTGACCTTC
361 GGCGGAGGCA CCAAGCTGGA AATCAAGAGA ACAGTGGCCG CTCCTAGCGT GTTCATCTTC
421 CCACCTTCCG ACGAGCAGCT GAAAAGCGGC ACAGCCTCTG TCGTGTGCCT GCTGAACAAC
481 TTCTACCCCA GAGAAGCCAA GGTGCAGTGG AAGGTGGACA ACGCCCTGCA GAGCGGCAAT
541 AGCCAAGAGA GCGTGACCGA GCAGGACAGC AAGGACTCTA CCTACAGCCT GAGCAGCACA
601 CTGACCCTGA GCAAGGCCGA CTACGAGAAG CACAAAGTGT ACGCCTGCGA AGTGACCCAC
661 CAGGGCCTTT CTAGCCCTGT GACCAAGAGC TTCAACCGGG GCGAATGT
``` cDNA sequence coding for chimeric mouse VL 48H6 and human constant
light kappa chain

SEQ ID NO. 63

```
  1 ATGGACATGA GAGTTCCCGC TCAGCTGCTG GGACTGCTGC TGCTTTGGTT TCCTGGCGCT
 61 AGATGCGACA TCGTGATGTC TCAGAGCCCT AGCAGCCTGG CCGTGTCTGT GGGAGAGAAA
121 GTGACCATGA GCTGCAAGAG CAGCCAGAGC CTGCTGTACT CCAGCAACCA GAAGAACTAC
181 CTGGCCTGGT ATCAGCAGAA GCCCGGACAG TCTCCCAAGC TGCTGATCTA CTGGGCCAGC
241 ACCAGAGAAA GCGGCGTGCC CGATAGATTC ACAGGCAGCG GCAGCGGAAC CGACTTCACC
301 CTGACAATCA GCAGCGTGAA GGCCGAGGAC CTGGCTGTGT ACTACTGCCA CCAGTATTAC
361 AGCTACCCTC TGACCTTCGG AGCCGGCACC AAGCTGGAAC TGAACAGAAC AGTGGCCGCT
421 CCTAGCGTGT TCATCTTCCC ACCTTCCGAC GAGCAGCTGA AGTCTGGCAC AGCCTCTGTC
481 GTGTGCCTGC TGAACAACTT CTACCCCAGA GAAGCCAAGG TGCAGTGGAA GGTGGACAAC
541 GCCCTGCAGA GCGGCAATAG CCAAGAGAGC GTGACCGAGC AGGACAGCAA GGACTCTACC
601 TACAGCCTGA GCAGCACACT GACCCTGAGC AAGGCCGACT ACGAGAAGCA CAAAGTGTAC
661 GCCTGCGAAG TGACCCACCA GGGCCTTTCT AGCCCTGTGA CCAAGAGCTT CAACCGGGGC
721 GAATGT
``` cDNA sequence coding for chimeric mouse VL 11H7 and human constant
light kappa chain

SEQ ID NO. 64

```
  1 ATGGACATGA GAGTTCCCGC TCAGCTGCTG GGACTGCTGC TGCTTTGGTT TCCTGGCGCT
 61 AGATGCGAGA TCGTGCTGAC ACAGAGCCCT GCTCTGATGG CTGCTTCCCC TGGCGAGAAA
121 GTGAGCATGA CCTGTAGCGT GTCCAGCAGC ATCAGCAGCT CCAACCTGCA CTGGTATCAG
181 CAGAAGTCCG AGACAAGCCC CAAGCCTTGG ATCTACGGCA CCAGCAATCT GGCCAGCGGA
241 GTGCCTGTCA GATTTTCTGG CAGCGGCTCT GGCACCAGCT ACAGCCTGAC AATCAGCAGC
301 ATGGAAGCCG AGGATGCCGC CACCTACTAC TGCCAGCAGT GGTCTAGCTA CCCTCTGACC
361 TTTGGCGGAG GCACCAAGCT GGAAATCAAG CGGACAGTGG CCGCTCCTAG CGTGTTCATC
421 TTTCCACCTA GCGACGAGCA GCTGAAGTCT GGCACAGCCT CTGTCGTGTG CCTGCTGAAC
481 AACTTCTACC CCAGAGAAGC CAAGGTGCAG TGGAAGGTGG ACAACGCCCT GCAGAGCGGC
```

```
541 AATAGCCAAG AGAGCGTGAC CGAGCAGGAC AGCAAGGACT CCACCTATAG CCTGAGCAGC

601 ACCCTGACAC TGAGCAAGGC CGACTACGAG AAGCACAAAG TGTACGCCTG CGAAGTGACC

661 CACCAGGGCC TTTCTAGCCC TGTGACCAAG
``` cDNA sequence coding for chimeric mouse VL and 49G4 human constant
light kappa chain

SEQ ID NO. 65

```
  1 ATGGACATGA GAGTTCCCGC TCAGCTGCTG GGACTGCTGC TGCTTTGGTT TCCTGGCGCT

61 AGATGCGACG TGCTGATGAC CCAGACACCT CTGAGCCTGC CTGTGTCTCT GGGAGATCAG

121 GCCAGCATCA GCTGCAGATC CAGCCAGAGC ATCGTGCACA GCAACGGCAA TACCTACCTG

181 GAATGGTTCC TGCAGAAGCC CGGACAGAGC CCCAAGCTGC TGATCTACAA GGTGTCCAAC

241 CGGTTCAGCG GCGTGCCCGA TAGATTTTCT GGCAGCGGCT CTGGCACCGA CTTCACCCTG

301 AAGATCTCCA GAGTGGAAGC CGAGGACCTG GCCGTGTACT ACTGCTTCCA AGGCTCTCAC

361 GTGCCCCTGA CATTTGGAGC CGGCACCAAG CTGGAACTGA AGAGAACAGT GGCCGCTCCT

421 AGCGTGTTCA TCTTCCCACC TTCCGACGAG CAGCTGAAAA GCGGCACAGC CTCTGTCGTG

481 TGCCTGCTGA ACAACTTCTA CCCCAGAGAA GCCAAGGTGC AGTGGAAGGT GGACAACGCC

541 CTGCAGAGCG GCAATAGCCA AGAGAGCGTG ACCGAGCAGG ACAGCAAGGA CTCTACCTAC

601 AGCCTGAGCA GCACCCTGAC ACTGAGCAAG GCCGACTACG AGAAGCACAA AGTGTACGCC

661 TGCGAAGTGA CCCACCAGGG CCTTTCTAGC

721 TGT
```

Amino acid sequence of chimeric mouse VH 36H12 and human constant
heavy IgG4 chain

SEQ ID NO. 66

```
  1 MELGLSWIFL LAILKGVQCE VQLQQSGAGL VKPGASVKLS CTASGFNIKD TYMHWVRQRP

61 EQGLEWIGRI DPATANTKYD PKFQGKATLT TDTSSNTAYL QLSSLTSEDT AVYYCVTYGY

121 DVSWFAYWGL GALVTVSAAS TKGPSVFPLA PCSRSTSEST AALGCLVKDY FPEPVTVSWN

181 SGALTSGVHT FPAVLQSSGL YSLSSVVTVP SSSLGTKTYT CNVDHKPSNT KVDKRVESKY

241 GPPCPPCPAP EFLGGPSVFL FPPKPKDTLM ISRTPEVTCV VVDVSQEDPE VQFNWYVDGV

301 EVHNAKTKPR EEQFNSTYRV VSVLTVLHQD WLNGKEYKCK VSNKGLPSSI EKTISKAKGQ

361 PREPQVYTLP PSQEEMTKNQ VSLTCLVKGF YPSDIAVEWE SNGQPENNYK TTPPVLDSDG

421 SFFLYSRLTV DKSRWQEGNV FSCSVMHEAL HNHYTQKSLS LSLGK
```

Amino acid sequence of chimeric mouse VH 45H6 and human constant
heavy IgG4 chain

SEQ ID NO. 67

```
  1 MELGLSWIFL LAILKGVQCD VQLVESGGGL VQPGGSRKLS CAASGFTFSS FGMHWVRQAP

61 EKGLEWVAYI SSGNSNIYYV DTVKGRFTIS RDNPKNTLFL QMTSLRSEDT AMYYCARKRA

121 YGDYSGFSMD YWGQGTSVTV SSASTKGPSV FPLAPCSRST SESTAALGCL VKDYFPEPVT

181 VSWNSGALTS GVHTFPAVLQ SSGLYSLSSV VTVPSSSLGT KTYTCNVDHK PSNTKVDKRV

241 ESKYGPPCPP CPAPEFLGGP SVFLFPPKPK DTLMISRTPE VTCVVVDVSQ EDPEVQFNWY

301 VDGVEVHNAK TKPREEQFNS TYRVVSVLTV LHQDWLNGKE YKCKVSNKGL PSSIEKTISK

361 AKGQPREPQV YTLPPSQEEM TKNQVSLTCL VKGFYPSDIA VEWESNGQPE NNYKTTPPVL

421 DSDGSFFLYS RLTVDKSRWQ EGNVFSCSVM HEALHNHYTQ KSLSLSLGK
```

Amino acid sequence of chimeric mouse VH 48H6 and human constant
heavy IgG4 chain

SEQ ID NO. 68

```
  1 MELGLSWIFL LAILKGVQCE VKLVESGGGL VKPGGSLKLS CAASGFTFSG YAMSWVRQTP

61 EKRLEWVASI SSGGSTYYPD SVKGRFTIPR DDARNILYLQ MSSLRSEDTA IYYCARGGHG

121 SSYVYWGQGT TLTVSSASTK GPSVFPLAPC SRSTSESTAA LGCLVKDYFP EPVTVSWNSG
```

```
181 ALTSGVHTFP AVLQSSGLYS LSSVVTVPSS SLGTKTYTCN VDHKPSNTKV DKRVESKYGP

241 PCPPCPAPEF LGGPSVFLFP PKPKDTLMIS RTPEVTCVVV DVSQEDPEVQ FNWYVDGVEV

301 HNAKTKPREE QFNSTYRVVS VLTVLHQDWL NGKEYKCKVS NKGLPSSIEK TISKAKGQPR

361 EPQVYTLPPS QEEMTKNQVS LTCLVKGFYP SDIAVEWESN GQPENNYKTT PPVLDSDGSF

421 FLYSRLTVDK SRWQEGNVFS CSVMHEALHN HYTQKSLSLS LGK
```

Amino acid sequence of chimeric mouse VH 11H7 and human constant heavy IgG4 chain

SEQ ID NO. 69

```
  1 MELGLSWIFL LAILKGVQCQ VQLKQSGPGL VQPSQSLSIT CTVSGFSLTI YGVHWVRQSP

61 GKGLEWLGVI WSGGSTDYNA AFISRLSISK DNSKSQVFFK MNSLQANDTA IYYCARRDYG

121 SRSFYYAMDY WGQGTSVTVS SASTKGPSVF PLAPCSRSTS ESTAALGCLV KDYFPEPVTV

181 SWNSGALTSG VHTFPAVLQS SGLYSLSSVV TVPSSSLGTK TYTCNVDHKP SNTKVDKRVE

241 SKYGPPCPPC PAPEFLGGPS VFLFPPKPKD TLMISRTPEV TCVVVDVSQE DPEVQFNWYV

301 DGVEVHNAKT KPREEQFNST YRVVSVLTVL HQDWLNGKEY KCKVSNKGLP SSIEKTISKA

361 KGQPREPQVY TLPPSQEEMT KNQVSLTCLV KGFYPSDIAV EWESNGQPEN NYKTTPPVLD

421 SDGSFFLYSR LTVDKSRWQE GNVFSCSVMH EALHNHYTQK SLSLSLGK
```

Amino acid sequence of chimeric mouse VH 49G4 and human constant heavy IgG4 chain

SEQ ID NO. 70

```
  1 MELGLSWIFL LAILKGVQCE VQLQQSGAEL VKPGASVKLS CRASGFNIKD TYMHWVKQRP

61 EQGLEWIGRI DPARGNTKYD PKFQGKATIT ADTSSNTAYL QLSSLTSEDT AVYYCASAMD

121 YWGQGTSVTV SSASTKGPSV FPLAPCSRST SESTAALGCL VKDYFPEPVT VSWNSGALTS

181 GVHTFPAVLQ SSGLYSLSSV VTVPSSSLGT KTYTCNVDHK PSNTKVDKRV ESKYGPPCPP

241 CPAPEFLGGP SVFLFPPKPK DTLMISRTPE VTCVVVDVSQ EDPEVQFNWY VDGVEVHNAK

301 TKPREEQFNS TYRVVSVLTV LHQDWLNGKE YKCKVSNKGL PSSIEKTISK AKGQPREPQV

361 YTLPPSQEEM TKNQVSLTCL VKGFYPSDIA VEWESNGQPE NNYKTTPPVL DSDGSFFLYS

421 RLTVDKSRWQ EGNVFSCSVM HEALHNHYTQ KSLSLSLGK
```

Amino acid sequence of chimeric mouse VL 36H12 and human constant light kappa chain

SEQ ID NO. 71

```
  1 MDMRVPAQLL GLLLLWFPGA RCDVLMTQTP LSLPVSLGDQ ASISCRSSQS IVHSNGITYL

61 EWYLQKPGQS PKLLIYKVSN RFSGVPDRFS GSGSGTDFTL KISRVEAEDL GVYYCFQGSH

121 VPLTFGAGTK LELKRTVAAP SVFIFPPSDE QLKSGTASVV CLLNNFYPRE AKVQWKVDNA

181 LQSGNSQESV TEQDSKDSTY SLSSTLTLSK ADYEKHKVYA CEVTHQGLSS PVTKSFNRGE

241 C
```

Amino acid sequence of chimeric mouse VL 45H6 and human constant light kappa chain

SEQ ID NO. 72

```
  1 MDMRVPAQLL GLLLLWFPGA RCDIVMTQSQ KFMSTSVGDR VSVTCKASQN VDTNVAWYQQ

61 KPGQSPKALI YSASYRYSGV PDRFTGSGSG TDFTLTISNV QSEDLAEYFC QQYNKFPLTF

121 GGGTKLEIKR TVAAPSVFIF PPSDEQLKSG TASWCLLNN FYPREAKVQVV KVDNALQSGN

181 SQESVTEQDS KDSTYSLSST LTLSKADYEK HKVYACEVTH QGLSSPVTKS FNRGEC
```

Amino acid sequence of chimeric mouse VL 48H6 and human constant light kappa chain

SEQ ID NO. 73

```
  1 MDMRVPAQLL GLLLLWFPGA RCDIVMSQSP SSLAVSVGEK VTMSCKSSQS LLYSSNQKNY

61 LAWYQQKPGQ SPKLLIYWAS TRESGVPDRF TGSGSGTDFT LTISSVKAED LAVYYCHQYY
```

```
121 SYPLTFGAGT KLELNRTVAA PSVFIFPPSD EQLKSGTASV VCLLNNFYPR EAKVQWKVDN

181 ALQSGNSQES VTEQDSKDST YSLSSTLTLS KADYEKHKVY ACEVTHQGLS SPVTKSFNRG

241 EC
```

Amino acid sequence of chimeric mouse VL 11H7 and human constant light kappa chain

SEQ ID NO. 74

```
  1 MDMRVPAQLL GLLLLWFPGA RCEIVLTQSP ALMAASPGEK VTITCSVSSS ISSSNLHWYQ

61 QKSETSPKPW IYGTSNLASG VPVRFSGSGS GTSYSLTISS MEAEDAATYY CQQWSSYPLT

121 FGGGTKLEIK RTVAAPSVFI FPPSDEQLKS GTASVCLLN NFYPREAKVQ WKVDNALQSG

181 NSQESVTEQD SKDSTYSLSS TLTLSKADYE KHKVYACEVT HQGLSSPVTK SFNRGEC
```

Amino acid sequence of chimeric mouse VL 49G4 and human constant light kappa chain

SEQ ID NO. 75

```
  1 MDMRVPAQLL GLLLLWFPGA RCDVLMTQTP LSLPVSLGDQ ASISCRSSQS IVHSNGNTYL

61 EWFLQKPGQS PKLLIYKVSN RFSGVPDRFS GSGSGTDFTL KISRVEAEDL GVYYCFQGSH

121 VPLTFGAGTK LELKRTVAAP SVFIFPPSDE QLKSGTASVV CLLNNFYPRE AKVQWKVDNA

181 LQSGNSQESV TEQDSKDSTY SLSSTLTLSK ADYEKHKVYA CEVTHQGLSS PVTKSFNRGE

241 C
```

Amino acid sequence of membrane-bound anti-human CD3 scFv (signal peptide followed by OKT3 scFv linked to CH2-CH3 domains of human IgG1 and human CD80 cytoplasmic tail)

SEQ ID NO. 76

```
  1 MKWVTFISLL FLFSSAYSQV QLQQSGAELA RPGASVKMSC KASGYTFTRY TMHWVKQRPG

61 QGLEWIGYIN PSRGYTNYNQ KFKDKATLTT DKSSSTAYMQ LSSLTSEDSA VYYCARYYDD

121 HYCLDYWGQG TTLTVSSGGG GSGGGGSGGG GSQIVLTQSP AIMSASPGEK VTMTCSASSS

181 VSYMNWYQQK SGTSPKRWIY DTSKLASGVP AHFRGSGSGT SYSLTISGME AEDAATYYCQ

241 QWSSNPFTFG SGTKLEINRA AAPSVFLFPP KPKDTLMISR TPEVTCVVVD VSHEDPEVKF

301 NWYVDGVEVH NAKTKPREEQ YNSTYRVVSV LTVLHQDWLN GKEYKCKVSN KALPAPIEKT

361 ISKAKGQPRE PQVYTLPPSR EEMTKNQVSL TCLVKGFYPS DIAVEWESNG QPENNYKTTP

421 PVLDSDGSFF LYSKLTVDKS RWQQGNVFSC SVMHEALHNH YTQKSLSLSP GWAITLISVN

481 GIFVICCLTY CFAPRCRERR RNERLRRESV RPV
``` cDNA sequence coding for membrane-bound anti-human CD3 scFv

SEQ ID NO. 77

```
  1 ATGAAATGGG TCACCTTTAT CTCCCTGCTG TTCCTGTTCT CCAGCGCCTA CTCTCAGGTC

61 CAGTTGCAGC AGTCTGGCGC CGAATTGGCT AGACCTGGCG CCTCCGTGAA GATGTCCTGC

121 AAGGCTTCCG GCTACACCTT CACCAGATAC ACCATGCACT GGGTCAAGCA GAGGCCTGGA

181 CAGGGCCTTG AGTGGATCGG CTACATCAAC CCTTCTCGGG GCTACACCAA CTACAACCAG

241 AAGTTCAAGG ACAAGGCTAC CCTGACAACC GACAAGTCCT CCTCCACCGC CTACATGCAG

301 CTGTCCAGCC TGACCTCTGA GGACTCCGCC GTGTACTACT GTGCCCGGTA CTACGACGAC

361 CACTACTGCC TGGATTATTG GGGCCAGGGC ACCACACTGA CAGTGTCTAG CGGAGGCGGA

421 GGATCTGGTG GTGGTGGATC TGGCGGCGGA GGTTCTCAGA TTGTGCTGAC CCAGTCTCCT

481 GCCATCATGT CCGCTTCTCC CGGCGAGAAA GTGACAATGA CCTGCTCCGC CTCTTCCTCC

541 GTGTCCTACA TGAACTGGTA TCAGCAGAAG TCCGGCACCT CTCCTAAGCG GTGGATCTAC

601 GACACCTCCA AGCTGGCATC TGGCGTGCCC GCTCACTTTA GAGGCTCTGG CTCTGGCACC

661 AGCTACTCCC TGACCATCTC TGGCATGGAA GCCGAGGATG CCGCCACCTA CTATTGCCAG

721 CAGTGGTCTA GCAACCCCTT CACCTTCGGC TCCGGCACCA AGCTGGAAAT CAACAGAGCC

781 GCCGCTCCTT CCGTGTTTCT GTTCCCTCCA AAGCCTAAGG ACACCCTGAT GATCTCTCGG
```

-continued

```
 841 ACCCCTGAAG TGACCTGCGT GGTGGTCGAT GTGTCTCACG AGGACCCAGA AGTGAAGTTC
 901 AATTGGTACG TGGACGGCGT GGAAGTGCAC AACGCCAAGA CCAAGCCTAG AGAGGAACAG
 961 TACAACTCCA CCTACAGAGT GGTGTCCGTG CTGACCGTGC TGCACCAGGA TTGGCTGAAC
1021 GGCAAAGAGT ACAAGTGCAA GGTGTCCAAC AAGGCTCTGC CCGCTCCTAT CGAAAAGACC
1081 ATCTCCAAGG CCAAGGGCCA GCCTAGGGAA CCCCAGGTTT ACACCCTGCC TCCAAGCCGG
1141 GAAGAGATGA CCAAGAACCA GGTGTCCCTG ACCTGCCTGG TCAAGGGCTT CTACCCTTCC
1201 GATATCGCCG TGGAATGGGA GAGCAATGGC CAGCCTGAGA ACAACTACAA GACCACACCT
1261 CCTGTGCTGG ACTCCGACGG CTCATTCTTC CTGTACAGCA AGCTGACAGT GGACAAGTCC
1321 AGATGGCAGC AGGGCAACGT GTTCTCCTGC TCCGTGATGC ACGAGGCCCT GCACAATCAC
1381 TACACACAGA AGTCCCTGTC TCTGTCCCCT GGCTGGGCTA TCACCCTGAT CTCTGTGAAC
1441 GGCATCTTCG TGATCGCTGC CTGACCTAC TGCTTCGCCC CTAGATGCAG AGAGCGGCGG
1501 AGAAACGAAC GGCTGCGGAG AGAATCTGTC CGGCCTGTG
```

---

The invention claimed is:

1. An antibody that binds the extracellular cysteine-rich domain-1 (CRD1) of Herpesvirus entry mediator (HVEM) on HVEM expressing cells, and prevents binding of B- and T-lymphocyte attenuator (BTLA) to HVEM when the antibody is bound to said extracellular part of HVEM, and displaces BTLA bound to said extracellular part of HVEM, wherein the antibody comprises
   (a) a heavy chain variable region with the CDR1, CDR2 and CDR3 sequence of SEQ ID NO: 18-20 and a light chain variable region with the CDR1, CDR2 and CDR3 sequence of SEQ ID NO: 21-23,
   (b) a heavy chain variable region with the CDR1, CDR2 and CDR3 sequence of SEQ ID NO: 26-28 and a light chain variable region with the CDR1, CDR2 and CDR3 sequence of SEQ ID NO: 29-31,
   (c) a heavy chain variable region with the CDR1, CDR2 and CDR3 sequence of SEQ ID NO: 34-36 and a light chain variable region with the CDR1, CDR2 and CDR3 sequence of SEQ ID NO: 37-39,
   (d) a heavy chain variable region with the CDR1, CDR2 and CDR3 sequence of SEQ ID NO: 42-44 and a light chain variable region with the CDR1, CDR2 and CDR3 sequence of SEQ ID NO: 45-47, or
   (e) a heavy chain variable region with the CDR1, CDR2 and CDR3 sequence of SEQ ID NO: 50-52 and a light chain variable region with the CDR1, CDR2 and CDR3 sequence of SEQ ID NO: 53-55.

2. The antibody of claim 1, wherein said antibody does not displace LIGHT bound to said extracellular part of HVEM when said antibody is bound to said extracellular part of HVEM.

3. The antibody of claim 1, wherein the antibody partially prevents binding of CD160 to HVEM when said antibody is bound to said extracellular part of HVEM and partially displaces CD160 bound to said extracellular part of HVEM.

4. The antibody of claim 1 comprising a heavy chain variable region with the amino acid sequence of SEQ ID NO: 24 with 0, 1, 2, 3, 4, 5, 6, 7, 8, 9 or 10 amino acid insertions, deletions, substitutions or additions and a light chain variable region with the amino acid sequence of SEQ ID NO: 25 with 0, 1, 2, 3, 4, 5, 6, 7, 8, 9 or 10 amino acid insertions, deletions, or substitutions, wherein the amino acid insertions, deletions, or substitutions are outside the CDRs of the variable regions.

5. The antibody of claim 1 comprising a heavy chain variable region with the amino acid sequence of SEQ ID NO: 40 with 0, 1, 2, 3, 4, 5, 6, 7, 8, 9 or 10 amino acid insertions, deletions, substitutions or additions and a light chain variable region with the amino acid sequence of SEQ ID NO: 41 with 0, 1, 2, 3, 4, 5, 6, 7, 8, 9 or 10 amino acid insertions, deletions, or substitutions, wherein the amino acid insertions, deletions, or substitutions are outside the CDRs of the variable regions.

6. The antibody of claim 1 comprising a heavy chain variable region with the amino acid sequence of SEQ ID NO: 16 with 0, 1, 2, 3, 4, 5, 6, 7, 8, 9 or 10 amino acid insertions, deletions, substitutions or additions and a light chain variable region with the amino acid sequence of SEQ ID NO: 17 with 0, 1, 2, 3, 4, 5, 6, 7, 8, 9 or 10 amino acid insertions, deletions, or substitutions, wherein the amino acid insertions, deletions, or substitutions are outside the CDRs of the variable regions.

7. The antibody of claim 1, wherein said antibody does not prevent binding of LIGHT to said extracellular part of HVEM when said antibody is bound to said extracellular part of HVEM.

8. The antibody of claim 1, wherein said antibody is selected from the group consisting of a monoclonal antibody, a polyclonal antibody, a humanized antibody, and an antigen-binding fragment thereof.

9. One or more nucleic acid molecules comprising a nucleotide sequence encoding an antibody according to claim 1.

10. A cell comprising one or more nucleic acids according to claim 9, wherein said one or more nucleic acids encode proteins that are capable of assembly into an antibody that binds the extracellular cysteine-rich domain-1 (CRD1) of Herpesvirus entry mediator (HVEM) on HVEM expressing cells, and prevents binding of B- and T-lymphocyte attenuator (BTLA) to HVEM when the antibody is bound to said extracellular part of HVEM, and displaces BTLA bound to said extracellular part of HVEM.

11. A pharmaceutical composition comprising an antibody according to claim 1 or antigen-binding fragment thereof and a pharmaceutically acceptable carrier and/or diluent.

12. A method of modulating HVEM signalling signaling activity, comprising contacting HVEM expressing cells with an antibody according to claim 1 or antigen-binding fragment thereof.

13. A method for the treatment of a human or an animal suffering from a medical indication, said method comprising administering to the human or animal a therapeutically effective amount of an antibody according to claim 1 or antigen-binding fragment thereof.

14. The method of claim 13 comprising administering to a subject in need thereof a therapeutically effective amount of a composition comprising an antibody according to claim 1 or antigen-binding fragment thereof for reducing tumor growth in the subject.

15. The method of claim 13, wherein the medical indication is cancer or an immune-related disorder, the method comprising administering the antibody or antigen-binding fragment thereof as a pharmaceutical composition to a subject in need thereof to treat cancer, an immune-related disorder, or a combination thereof in the subject.

16. The antibody of claim 1, wherein said antibody comprises
 (a) a heavy chain variable region with the CDR1, CDR2 and CDR3 sequence of SEQ ID NO: 18-20 and a light chain variable region with the CDR1, CDR2 and CDR3 sequence of SEQ ID NO: 21-23,
 (b) a heavy chain variable region with the CDR1, CDR2 and CDR3 sequence of SEQ ID NO: 26-28 and a light chain variable region with the CDR1, CDR2 and CDR3 sequence of SEQ ID NO: 29-31, or
 (c) a heavy chain variable region with the CDR1, CDR2 and CDR3 sequence of SEQ ID NO: 42-44 and a light chain variable region with the CDR1, CDR2 and CDR3 sequence of SEQ ID NO: 45-47.

17. The antibody of claim 1, wherein said antibody comprises a heavy chain variable region with the CDR1, CDR2 and CDR3 sequence of SEQ ID NO: 26-28 and a light chain variable region with the CDR1, CDR2 and CDR3 sequence of SEQ ID NO: 29-31.

* * * * *